(12) United States Patent  (10) Patent No.: US 7,570,327 B2
Motoshima et al.  (45) Date of Patent: Aug. 4, 2009

(54) SEMI-TRANSMISSIVE TYPE LIQUID-CRYSTAL DISPLAY DEVICE AND METHOD OF FABRICATING THE SAME

(75) Inventors: Hideto Motoshima, Kanagawa (JP);
Kiyoshi Yanase, Kanagawa (JP);
Yasushi Umihira, Kanagawa (JP);
Tsutomu Hamada, Kanagawa (JP);
Norihiro Sakumichi, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 194 days.

(21) Appl. No.: 11/879,495

(22) Filed: Jul. 18, 2007

(65) Prior Publication Data
US 2008/0049177 A1  Feb. 28, 2008

(30) Foreign Application Priority Data
Jul. 19, 2006  (JP) .............................. 2006-196467

(51) Int. Cl.
*G02F 1/1335*  (2006.01)
(52) U.S. Cl. ...................................... 349/114; 349/113
(58) Field of Classification Search .......... 349/113–114
See application file for complete search history.

(56) References Cited
U.S. PATENT DOCUMENTS
7,450,197 B2 * 11/2008 Lee ............................ 349/113

FOREIGN PATENT DOCUMENTS
JP  10-173191  6/1998
JP  2004-144826  5/2004
JP  2005-266761  9/2005

* cited by examiner

*Primary Examiner*—David Nelms
*Assistant Examiner*—Phu Vu
(74) *Attorney, Agent, or Firm*—McGinn IP Law Group, PLLC

(57) ABSTRACT

A semi-transmissive type liquid-crystal display device suppresses the reduction and corrosion of the transmission or common electrode due to the cell corrosion reaction with a simple method. In each pixel region, the reflection electrode is formed over the glass plate, where the interlayer insulating film and the barrier metal film intervene between them. The reflection electrode is electrically connected to the transmission electrode by way of the barrier metal film. The transmission electrode and the corresponding scanning line thereto are apart from each other at a distance of 2 μm (preferably, 3 μm) or greater. A developer solution penetrating through the crack formed in the barrier metal film does not reach the transmission electrode (or common electrode), preventing the reduction and corrosion of the transmission or common electrode.

20 Claims, 42 Drawing Sheets

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

FIG. 24A
FIRST EMBODIMENT
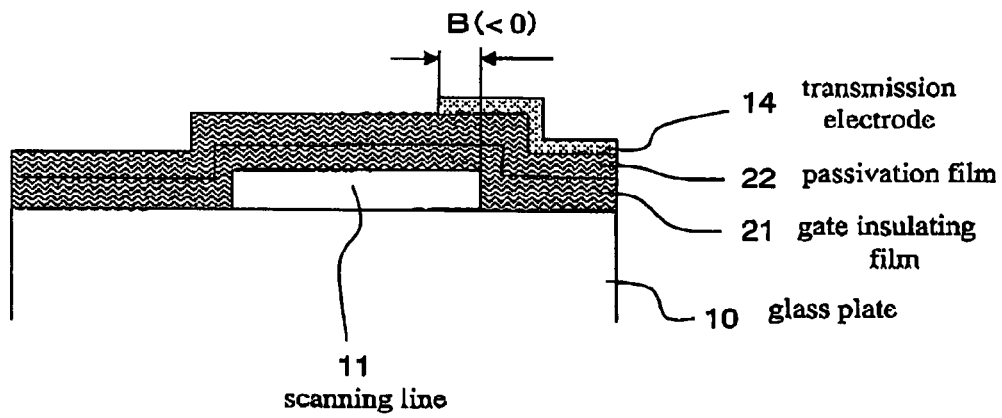
FIG. 24B
FIRST EMBODIMENT
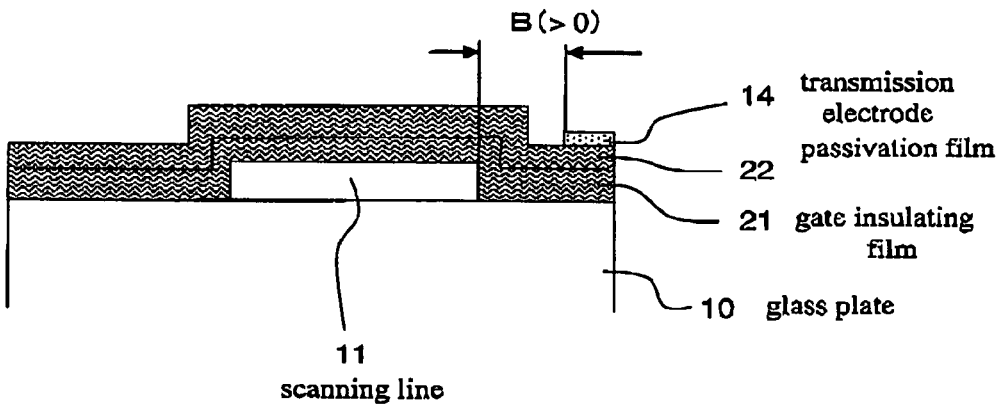
FIG. 24C
FIRST EMBODIMENT
| distance B (μm) | -2 | -1 | 0 | +1 | +2 | +3 |
|---|---|---|---|---|---|---|
| REDUCTION REACTION | YES | YES | YES | YES | NO | NO |

SECOND EMBODIMENT

SECOND EMBODIMENT

SECOND EMBODIMENT

SECOND EMBODIMENT

SECOND EMBODIMENT

THIRD EMBODIMENT

THIRD EMBODIMENT

FOURTH EMBODIMENT

FOURTH EMBODIMENT

FOURTH EMBODIMENT

FIFTH EMBODIMENT

FIFTH EMBODIMENT

FIFTH EMBODIMENT

FIFTH EMBODIMENT

FIFTH EMBODIMENT

FIFTH EMBODIMENT

FIFTH EMBODIMENT

FIFTH EMBODIMENT

SEMI-TRANSMISSIVE TYPE LIQUID-CRYSTAL DISPLAY DEVICE AND METHOD OF FABRICATING THE SAME

BACKGROUND OF THE INVENTION

1. Field of the Invention

The present invention relates to a semi-transmissive (transreflective) type liquid-crystal display (LCD) device and a method of fabricating the same. More particularly, the invention relates to a semi-transmissive type LCD device having pixel regions each of which has a transmission electrode and a reflection electrode, where a barrier metal film is formed between the transmission electrode and the reflection electrode, and a method of fabricating the device.

2. Description of the Related Art

In recent years, subsequent to the diffusion of portable information-processing equipment, the semi-transmissive type LCD device has been developed and used practically. With the device of this type, in a place where the ambient light is insufficient (i.e., a dark place), images are displayed by causing the light emitted from the backlight unit to pass through the liquid crystal layer. On the other hand, in a place where the ambient light is sufficient (i.e., a light place), images are displayed by causing the ambient light reflected by the internal reflection electrodes to pass through the liquid crystal layer.

With the semi-transmissive type LCD device having such the structure as above, the backlight is turned on and the images are displayed in the transmission mode in a dark place, thereby raising the visibility. The backlight is turned off and the images are displayed in the reflection mode in a light place, thereby reducing the power dissipation. Because of such the advantage, this device meets the two inconsistent demands to prolong the operable time and to reduce the weight. Recently, the semi-transmissive type LCD device having such the features has been frequently used for portable information-processing equipment having a middle- or small-sized display screen.

The semi-transmissive type LCD device may have a structure that each of the pixel regions is divided into a transmission region and a reflection region. With this structure, a transmission electrode is placed in the transmission region and a reflection electrode is placed in the reflection region. In other words, each of the pixel electrodes is formed by the transmission electrode and the reflection electrode. The transmission electrode and the reflection electrode are electrically interconnected.

With the semi-transmissive type LCD device whose pixel region is divided into the transmission region and the reflection region, it is known that a problem termed "corrosion of an ITO film due to cell corrosion reaction" occurs because each pixel electrode is formed by the transmission electrode and the reflection electrode, as disclosed in the Patent Document 1 (Japanese Non-Examined Patent Publication No. 2004-144826) (see paragraph 0004 to 0020).

Specifically, it is general that the transmission electrode is formed by a patterned ITO (Indium Tin Oxide) film and the reflection electrode is formed by a patterned aluminum (Al) film. This is because the ITO film has a high transmittance for visible light and the Al film has a high reflectance for visible light. In addition, an Al alloy film may be used for the reflection electrode instead of the Al film; however, the action and advantages in the case where an Al alloy film is used are the same as those in the case where an Al film is used. Thus, the following explanation will be made for the case where the Al film is used for the reflection electrode.

By the way, in the fabrication process sequence of the TFT array substrate where thin-film transistors (TFTs) are arranged in a matrix array on an insulative substrate as the switching elements of the semi-transmissive type LCD device, a positive type photoresist is usually used. This is because a positive type photoresist realizes a higher resolution than that generated by a negative type photoresist. Since a developer solution with high alkalinity is used in the developing process of the positive type photoresist, the Al film, which is soluble in an acidic or alkaline solution, will dissolve into the developer solution during the developing process, where the Al atoms are turned to trivalent Al ions.

On the other hand, the ITO film is insoluble in the developer solution. However, the oxidation-reduction potential of the ITO film is nobler (in a positive side) than that of the Al film, in other words, the oxidation-reduction potential of the Al film is baser (in a negative side) than that of the ITO film, and in addition, the difference between the oxidation-reduction potentials of the Al and ITO films is large. Therefore, if both the ITO film and the Al film exist in the developer solution (which is an electrolytic solution), an electric current circuit is formed between the ITO film and the Al film by way of the developer solution. As a result, electrons emitted by the dissolution of the Al film will flow into the ITO film, thereby reducing and corroding the said ITO film.

Even if the TFT array substrate has a structure that all the surface of the ITO film is covered with the Al film or the photoresist film and therefore, the ITO film will not contact the developer solution, there is a possibility that the developer solution reaches the ITO film through pinholes or the like which are formed locally by the dissolution of the Al film or which have been present in the Al film itself. If so, an electric current circuit is formed in such a way that the Al film serves as a local anode and the ITO film serves as a local cathode. As a result, the dissolution reaction of the Al film and the reduction reaction of the ITO film make progress by using the difference of the oxidation-reduction potentials of the Al and ITO films as a driving force. In this way, the ITO film is corroded. This reaction is termed the "cell corrosion reaction" or "cell reaction".

Moreover, there is a problem that stable electrical contact between the ITO film and the Al film is difficult to be generated. This is due to the following reason. Since the oxide-generating energy of Al is greater than that of In (indium), if the thermal hysteresis of 150° C. or higher occurs after depositing the Al film on the ITO film, or after depositing the ITO film on the Al film whose surface oxide has been removed, Al oxide having high electrical resistivity is likely to be generated on the contact interface of the ITO and Al films prior to the generation of In oxide having low electrical resistivity. As a result, the ITO film and the Al film are likely to be electrically insulated from each other.

It is known that these two problems can be solved by depositing an intermediate film (i.e., a barrier metal film) that suppresses the above-described cell corrosion reaction and that provides stable electrical contact between the Al film and the ITO film. As the intermediate film (the barrier metal film), a film made of molybdenum (Mo), chromium (Cr), or the like is preferably used.

In the above-described Patent Document 1, considering the possibility that the above-described cell corrosion reaction is not suppressed even if the intermediate film (barrier metal film) is deposited between the Al film and the ITO film, the following measure is suggested.

Specifically, after forming an Al film on an interlayer insulating film, the Al film is patterned to form the reflection electrode. Next, a photoresist film for the transmission electrode is formed on the reflection electrode and patterned. On the photoresist film thus patterned, an ITO film for the transmission electrode is formed. Thereafter, the patterned photoresist film is removed by the "lift-off" method and at the same time, the ITO film is patterned to form the transmission electrode (or the reflection electrode). With this method, almost all the Al film is covered with the photoresist film for the transmission electrode even after the patterning process of the Al film, where the remainder of the Al film is covered with the ITO film. Thus, the Al film does not contact the developer solution used for patterning the photoresist film for the transmission electrode. For this reason, the Al film and the ITO film are not simultaneously exposed to the developer solution, which means that disappearance of the Al film and blackening of the ITO film are prevented (see FIGS. 1 to 7, paragraphs 0049 to 0076).

The Patent Document 2 (Japanese Non-Examined Patent Publication No. 2005-266761) discloses a method of preventing the above-described cell corrosion reaction by using a metal film that raises the Al potential in the developer solution as an upper layer of the reflection electrode (Al film) (see FIGS. 1 to 3, paragraph 0027 to 0051), which is another measure.

With the method disclosed in the Patent Document 2, the transmission electrode formed by an ITO film is placed in the pixel region (i.e., in both the transmission region and the reflection region) of the semi-transmissive type LCD device. At the same time, in the reflection region, a reflection film (which contains at least Al) is formed on the transmission electrode (i.e., ITO film) and a metal film that raises the Al potential in the developer solution is formed on the reflection film. In the transmission region, the reflection film and the metal film do not exist and thus, the transmission electrode is exposed. As the metal film, a metal film that contains at least one of Ni, Fe, Pd, Pt, Rh, Re, Ru, Co, In, Nb, V, Mo, W, and Zr is used.

In the process of patterning the reflection film and the metal film, when the photoresist film formed on the metal film is selectively exposed to light and then, is developed with a developer solution, the metal film is placed on the reflection film. Therefore, even if Al is eluted in the developer solution, the potential of Al in the developer solution is kept higher than the corrosion potential of ITO. This means that even if the developer solution reaches the ITO film, the ITO film does not corrode. In this way, the reduction and corrosion of the ITO film due to the elution of Al in the developer solution is prevented (see FIGS. 1 to 3, paragraphs 0027 to 0042).

With the semi-transmissive type LCD device disclosed in the Patent Document 2, the reflection film may be made of Al alloy containing at least one of Ni, Fe, Pd, Pt, Rh, Ru and Co. In this case, the metal film can be cancelled (see paragraph 0050). In addition, a second metal film containing at least one of Cr, Ti, Ta and Mo may be formed below the reflection film (see paragraph 0051).

The Patent Document 3 (Japanese Non-Examined Patent Publication No. 10-173191) discloses a method of preventing the above-described cell corrosion reaction for the source electrode and the drain electrode, not the transmission electrode and the reflection electrode (see FIG. 1, paragraph 0018 to 0022).

With the method disclosed in the Patent Document 3, the source electrode and the drain electrode have a three-layer structure whose uppermost barrier layer is made of a material having a higher reduction potential in the developer solution than that of ITO. Thus, the ITO film for the pixel electrode (which is placed in a lower position of the three-layer structure) is not exposed to the developer solution in the development process of the photoresist film for patterning the three-layer structure. As a result, the above-described cell corrosion reaction is prevented.

Next, an example of the method of fabricating a TFT array substrate used in a prior-art semi-transmissive type LCD device with the structure that each pixel region is divided into the transmission region and the reflection region will be explained below with reference to FIGS. 1 to 11. This LCD device comprises the above-described intermediate film (i.e., the barrier metal film) between the Al film and the ITO film to suppresses the above-described cell corrosion reaction (see the Patent Document 1).

FIGS. 1 to 7 are partial plan views showing the structure of one pixel and its neighborhood of the said LCD device, respectively. FIG. 8 is a partial cross-sectional view along the line VIII-VIII in FIG. 7. FIGS. 9 to 11 are partial cross-sectional views similar to FIG. 8 showing the disconnection or breaking steps of the ITO film (i.e., the transmission electrode), respectively. As shown in FIG. 7, the pixel region P, which corresponds to one pixel, is divided into the transmission region T and the reflection region R.

First, as shown in FIG. 1, a glass plate 110 (see FIG. 8) is used as an insulative transparent substrate. On the glass plate 110, a metal film for gate electrodes 111*a* and scanning lines (gate lines) 111 is formed. For example, a film made of chromium (Cr), aluminum (Al), molybdenum (Mo), or titanium (Ti), or an alloy thereof is formed on the glass plate 110 and then, it is patterned by the photolithography and etching method, thereby forming the gate electrodes 111*a* and the scanning lines 111 which are united with each other. The scanning lines 111, which are extended along the horizontal direction of FIG. 1, are arranged along the vertical direction of FIG. 1 at equal intervals.

Next, a silicon nitride ($SiN_x$) film serving as a gate insulating film 121 (see FIG. 8) is formed on the whole surface of the glass plate 110 by a CVD (Chemical Vapor Deposition) method, thereby covering the gate electrodes 111*a* and the scanning lines 111. Thereafter, a non-doped amorphous silicon (which may be termed "a-Si" later) film and a n-type amorphous silicon film doped with phosphorus (P) are formed in this order and then, these two a-Si films are patterned by the photolithography and etching method, thereby forming island-shaped semiconductor films 112 and 112*a*, as shown in FIG. 2. In the said pixel region P, the patterned semiconductor films 112 overlapped with the gate electrodes 111*a* are used as the active layers of TFTs. The patterned semiconductor films 112*a* overlapped with the scanning lines 111 are located at predetermined positions to be overlapped with signal lines (data lines) 113 which are formed later. The patterned semiconductor films 112*a* are provided to suppress the parasitic capacitance between the scanning lines 111 and the signal lines 113.

Next, a metal film similar to the metal film used for the scanning lines 111 is formed on the semiconductor films 112 and 112*a* and then, it is patterned by the photolithography and etching method, thereby forming the signal lines 113, source electrodes 113*s*, and drain electrodes 113*d*, as shown in FIG. 3. The source electrodes 113*s* and drain electrodes 113*d*, which are partially overlapped with the corresponding semiconductor films 112, constitute TFTs 125 along with the gate electrodes 111*a* and the gate insulating film 121. The drain electrodes 113*d* are unified with the corresponding signal lines 113. The signal lines 113 extending vertically in FIG. 3 are arranged horizontally at equal intervals in the same figure. The signal lines 113 and the scanning lines 111 constitute a matrix array.

Next, a passivation film 122 (see FIG. 8) is formed on the gate insulating film 121 over the whole surface of the glass plate 110, thereby covering the TFTs 125 and the signal lines 113. Thereafter, as shown in FIG. 4, contact holes 122a are formed in the passivation film 122 at the positions overlaid with the source electrodes 113s by an etching method. As the passivation film 122, a SiN$_x$ film is preferably used.

Next, an ITO film is formed on the passivation film 122 and patterned by the photolithography and etching method, thereby forming the transmission electrodes 114, as shown in FIG. 5. At this time, the transmission electrodes 114 are contacted with the corresponding source electrodes 113s by way of the corresponding contact holes 122a of the passivation film 122. In this way, the transmission electrodes 114 are electrically connected to the corresponding source electrodes 113s.

In addition, the end of the transmission electrode 114 is overlapped with the scanning line 111 adjacent to the said pixel region P (which is located on the opposite side to the TFT 125 (on the upper side in FIG. 5)). However, the end of the said transmission electrode 114 is apart from the signal line 113 corresponding to the said pixel region P (which is located on the right side in FIG. 5) and from the signal line 113 adjacent to the said pixel region P (which is located on the left side in FIG. 5), and does not overlap with these two signal lines 113.

Next, a photosensitive organic resin film is formed on the passivation film 122 over the whole surface of the glass plate 110 and is selectively exposed to light and developed, thereby forming photosensitive interlayer insulating films 115 each having protrusions and depressions on its surface, as shown in FIG. 6. In the said pixel region P, the patterned photosensitive interlayer insulating film 115, which has an approximately rectangular planar pattern or shape, covers the whole TFT 125 and the part of the transmission electrode 114 adjacent to the TFT 125. The photosensitive interlayer insulating film 115 covers the part of the scanning line 111 (which is located on the lower side of FIG. 6) corresponding to the said pixel region P as well.

Next, a metal film (for example, which is made of Mo or an alloy of Mo) for the barrier metal film 123 is formed on the passivation film 122 over the whole surface of the glass plate 110. On the metal film thus formed, another metal film (for example, which is made of Al or an alloy of Al) for the reflection electrode 116 is formed over the whole surface of the glass plate 110. Then, after a photoresist film 124 with a predetermined pattern is formed on the metal film for the reflection electrode 116, these two metal films are patterned with the photoresist film 124 as a mask, thereby forming selectively the barrier metal films 123 and the reflection electrodes 116, as shown in FIGS. 7 and 8.

The barrier metal films 123 and the reflection electrodes 116 have planar patterns or shape which are approximately the same as the patterned photosensitive interlayer insulating films 115 and which are slightly smaller in size than the same films 115, respectively. In the pixel region P, the end of the barrier metal film 123, which is close to the transmission electrode 114, is in contact with the transmission electrode 114. Due to this contact, the barrier metal film 123 and the transmission electrode 114 are electrically interconnected. Moreover, the reflection electrode 116, which is formed on the barrier metal film 123, is in contact with the barrier metal film 123. Thus, the reflection electrode 116 is electrically connected to the transmission electrode 114 by way of the barrier metal film 123.

In the above-described way, the TFT array substrate used for the prior-art semi-transmissive type LCD device is completed. The TFT array substrate thus fabricated is joined to an opposite substrate (not shown) and then, a liquid crystal layer is placed in the gap between these two substrates and sealed, resulting in a liquid-crystal panel (or a LCD panel). Furthermore, a backlight unit is built in the panel. In this way, the prior-art semi-transmissive type LCD device is fabricated.

According to the inventor's research, the above-described fabrication method has the following problem.

Specifically, the processes of forming the barrier metal film 123 and the reflection electrode 116 are carried out in such a manner as shown in FIGS. 9 to 11. In these processes, it is usual that the thickness of the barrier metal film 123 is set at a considerably large value, for example, approximately 0.2 μm to 0.4 μm. This is to make the distance between the reflection electrode 116 formed by a metal film (e.g., an Al or Al alloy film) and the transmission electrode 114 formed by an ITO film as much as possible, thereby lowering the possibility of the cell reaction. For this reason, when a metal film 123a (e.g., a Mo or Mo alloy film) for the barrier metal film 123 and a metal film 116a for the reflection electrode 116 (e.g., an Al or Al alloy film) are successively formed on the passivation film 122, cracks 130 are likely to occur in the metal film 123a in the vicinity of the scanning line 111, as shown in FIG. 9. These cracks 130 may occur not only in the metal film 123a but also in the underlying transmission electrode 114, the passivation film 122, and the gate insulating film 121.

When the metal films 123a and 116a are patterned, a photoresist film 124 is formed on the metal film 116a and is selectively exposed to light using an appropriate mask. Then, the photoresist film 124 thus exposed is dipped in a developer solution with high alkalinity or is contacted with the said developer solution by falling it like a shower over the photoresist film 24, thereby selectively removing the exposed portions of the film 124. Thus, the state as shown in FIG. 10 is obtained. At this time, although the meal film 116a made of Al or Al alloy is in contact with the developer solution, the transmission electrode 114 made of ITO ought not to be in contact with the said developer solution. In fact, however, due to the existence of the cracks 130, the said developer solution reaches the transmission electrode 114 also and thus, a cell circuit is formed by the metal film 116a, the transmission electrode 114, and the developer solution. Accordingly, the transmission electrode 114 is reduced and corroded and as a result, a disappeared portion 140 is formed in the transmission electrode 114 in the neighborhood of the scanning line 111.

Therefore, when the reflection electrode 116 and the barrier metal film 123 are formed by selectively etching the metal films 123a and 116a using the photoresist film 124 as the mask, the transmission electrode 114 has the disappeared portion 140. If the disappeared portion 140 becomes large, the transmission electrode 114 is separated from the barrier metal film 123, which leads to failed pixels termed the "point defects". Even if the transmission electrode 114 is not separated from the barrier metal film 123 due to the disappeared portion 140, the optical transmittance property of the transmission electrode 114 degrades. Since the occurrence of the cracks 130 is unable to be avoided in the present circumstances, it is necessary to prevent the formation of the disappeared portion 140 with some measure.

Explanation is made so far for the scanning line 111. However, the transmission electrode 114 is placed close to the signal line 113 in the said pixel region P. Accordingly, a similar problem will occur for the signal line 113.

The cell corrosion reaction can be prevented by the methods disclosed in the above-described Patent Documents 1 to 3. However, any of these methods has a disadvantage that the fabrication processes need to be changed significantly.

In addition, the above-described explanation about the transmission electrodes is applicable to the common electrode of the IPS (In-Plane Switching) type LCD device.

SUMMARY OF THE INVENTION

The present invention was created through the consideration about the above-described points.

An object of the present invention is to provide a semi-transmissive type LCD device, each pixel region of which includes a barrier metal film placed between a reflection electrode and a transmission electrode, that makes it possible to suppress effectively the reduction and corrosion of the transmission electrode or the common electrode due to the cell corrosion reaction with a simple method, and a method of fabricating the device.

The above object together with others not specifically mentioned will become clear to those skilled in the art from the following description.

According to the first aspect of the present invention, a semi-transmissive type LCD device is provided, which comprises:

scanning lines formed to extend along a first direction and arranged at predetermined intervals along a second direction perpendicular to the first direction on a substrate;

signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions; and each of the reflection electrodes being disposed over the substrate in such a way that an interlayer insulating film and a barrier metal film intervene between the said reflection electrode and the substrate, and being electrically connected to the corresponding transmission electrode by way of the barrier metal film;

wherein in each of the pixel regions, one of the transmission electrodes and a corresponding one of the scanning lines are arranged at a distance of 2 μm or greater.

With the semi-transmissive type LCD device according to the first aspect of the invention, as explained above, each of the reflection electrodes is disposed over the substrate in such a way that the interlayer insulating film and the barrier metal film intervene between the said reflection electrode and the substrate, and is electrically connected to the corresponding transmission electrode by way of the barrier metal film. Moreover, in each of the pixel regions, one of the transmission electrodes and the corresponding one of the scanning lines are arranged at a distance of 2 μm or greater. Therefore, in the process of forming the reflection electrodes and the barrier metal films, even if a developer solution reaches the vicinity of the transmission electrodes through the cracks formed in the barrier metal films, the developer solution does not reach the transmission electrodes. This is because the following reason.

According to the inventors' research, it was found that the cracks of the barrier metal films are likely to occur in the neighborhoods of the steps or level differences formed by the scanning lines. Moreover, it was found that if the transmission electrodes are apart from the corresponding scanning lines at a distance of 2 μm or greater, the developer solution does not reach the transmission electrodes and therefore, no cell circuit is formed by using the developer solution, the reflection electrodes and the corresponding transmission electrodes.

Accordingly, the cell corrosion reaction can be prevented by simply changing the shape or pattern of the transmission electrodes, which means that the fabrication processes need not be changed significantly. As a result, the reduction and corrosion of the transmission electrodes due to the cell corrosion reaction can be effectively suppressed with a simple method.

In a preferred embodiment of the device according to the first aspect of the invention, the distance between the one of the transmission electrodes and the corresponding one of the scanning lines is 3 μm or greater. In this case, there is an additional advantage that the certainty of preventing the cell corrosion reaction is increased.

In another preferred embodiment of the device according to the first aspect of the invention, in each of the pixel regions, one of the transmission electrodes and a corresponding one of the signal lines are arranged at a distance of 2 μm (more preferably, 3 μm) or greater as well. The cracks of the barrier metal films may occur in the neighborhoods of the steps or level differences formed by the signal lines. In this case, there is an additional advantage that the cell corrosion reaction can be prevented even if the cracks of the barrier metal films are generated near the steps or level differences formed by the signal lines.

In still another preferred embodiment of the device according to the first aspect of the invention, the interlayer insulating films are formed in such a way as to cover the respective scanning lines, where gaps between the transmission electrodes and the corresponding scanning lines are covered with the interlayer insulating films. In this case, since the vicinities of the steps or level differences formed by the respective scanning lines are covered with the interlayer insulating films, the developer solution can be prevented from reaching the transmission electrodes by the interlayer insulating films. As a result, there is an additional advantage that the certainty of preventing the cell corrosion reaction is increased.

In this embodiment, it is preferred that the interlayer insulating films for the respective pixel regions are united with each other in such a way as to cover the whole substrate except for belt-shaped openings extending along the scanning lines, where each of the openings has a width corresponding to one of transmission regions that expose a corresponding one of the transmission electrodes.

According to a second aspect of the present invention, another semi-transmissive type LCD device is provided, which comprises:

scanning lines formed to extend along a first direction and arranged at predetermined intervals along a second direction perpendicular to the first direction on a substrate;

signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions; and each of the reflection electrodes being disposed over the substrate in such a way that an interlayer insulating film and a barrier metal film intervene between the said reflection electrode and the substrate, and being electrically connected to the corresponding transmission electrode by way of the barrier metal film;

wherein in each of the pixel regions, one of the transmission electrodes and a corresponding one of the scanning lines are arranged to be partially overlapped with each other or arranged at a distance less than 2 μm; and the interlayer insulating films for the respective pixel regions are formed to cover the scanning lines, thereby covering gaps between the scanning lines and the corresponding transmission electrodes.

With the semi-transmissive type LCD device according to the second aspect of the invention, as explained above, the interlayer insulating films for the respective pixel regions are formed to cover the scanning lines, thereby covering gaps between the scanning lines and the corresponding transmission electrodes. Therefore, in the process of forming the reflection electrodes and the barrier metal films, even if a developer solution reaches the vicinity of the transmission electrodes through the cracks formed in the barrier metal films, the developer solution is blocked by the interlayer insulating films. As a result, the developer solution does not reach the transmission electrodes.

Accordingly, even if one of the transmission electrodes and a corresponding one of the scanning lines are arranged to be partially overlapped with each other or arranged at a distance less than 2 μm in each of the pixel regions, the cell corrosion reaction can be prevented by simply changing the shape or pattern of the interlayer insulating films. This means that the fabrication processes need not be changed significantly. As a result, the reduction and corrosion of the transmission electrodes due to the cell corrosion reaction can be effectively suppressed with a simple method.

In a preferred embodiment of the device according to the second aspect of the present invention, the interlayer insulating films for the respective pixel regions are united with each other in such a way as to cover the whole substrate except for windows, where the windows define transmission regions by exposing the corresponding transmission electrodes from the interlayer insulating films united. In this case, there is an additional advantage that the mask pattern for forming the interlayer insulating films can be fabricated easily.

According to a third aspect of the present invention, still another semi-transmissive type LCD device is provided, which comprises:

scanning lines formed to extend along a first direction and arranged at predetermined intervals along a second direction perpendicular to the first direction on a substrate;

signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions;

each of the reflection electrodes being disposed over the substrate in such a way that an interlayer insulating film and a barrier metal film intervene between the said reflection electrode and the substrate, and being electrically connected to the corresponding transmission electrode by way of the barrier metal film;

wherein in each of the pixel regions, a gap between one of the transmission electrodes and a corresponding one of the scanning lines is covered with a semiconductor film; and the semiconductor film is overlapped with the corresponding scanning line and extended along the said scanning line.

With the semi-transmissive type LCD device according to the third aspect of the invention, as explained above, in each of the pixel regions, the gap between one of the transmission electrodes and the corresponding one of the scanning lines is covered with the semiconductor film. The semiconductor film is overlapped with the corresponding scanning line and extended along the said scanning line. Therefore, in the process of forming the reflection electrodes and the barrier metal films, even if a developer solution reaches the vicinity of the transmission electrodes through the cracks formed in the barrier metal films, the developer solution is blocked by the semiconductor films. This means that the developer solution does not reach the transmission electrodes. In addition, the semiconductor films can be formed by using a semiconductor film for forming the TFTs.

Accordingly, even if one of the transmission electrodes and a corresponding one of the scanning lines are arranged to be partially overlapped with each other or arranged at a distance less than 2 μm in each of the pixel regions, the cell corrosion reaction can be prevented by simply changing the shape or pattern of the semiconductor film for the TFTs. This means that the fabrication processes need not be changed significantly. As a result, the reduction and corrosion of the transmission electrodes due to the cell corrosion reaction can be effectively suppressed with a simple method.

In a preferred embodiment of the device according to the third aspect of the present invention, in each of the pixel regions, the interlayer insulating film is formed to overlap with a corresponding one of the scanning lines, thereby covering a corresponding one of the gaps between the transmission electrodes and the scanning lines. In this case, since the gaps between the transmission electrodes and the scanning lines are respectively covered with the interlayer insulating films, there is an additional advantage that the certainty of preventing the cell corrosion reaction is increased.

According to a fourth aspect of the present invention, a further semi-transmissive type LCD device is provided, which comprises:

scanning lines formed to extend along a first direction and arranged at predetermined intervals along a second direction perpendicular to the first direction on a substrate;

common electrode lines formed to be adjacent to the respective scanning lines and to extend along the said scanning lines;

signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions;

a common electrode having first parts extending along the common electrode lines and second parts overlapped with the signal lines and extending along the said signal lines;

each of the reflection electrodes being disposed over the substrate in such a way that an interlayer insulating film and a barrier metal film intervene between the reflection electrodes and the substrate, and being electrically connected to the corresponding transmission electrode by way of the barrier metal film;

wherein the interlayer insulating films for the respective pixel regions are united with each other in such a way as to cover the whole substrate except for windows, through which the transmission electrodes are respectively exposed to define transmission regions; and the interlayer insulating films comprise overlapped regions overlapped with the respective second parts of the common electrode, each of the overlapped regions having a width greater than a width of a corresponding one of the signal lines and equal to or less than a width of the corresponding second part; and the width of the corresponding second part of the common electrode is greater than the width of the corresponding signal line overlapped with the said second part in such a way that a width difference of 2 μm or greater is allocated to each side of the said second part.

With the semi-transmissive type LCD device according to the fourth aspect of the invention, as explained above, the interlayer insulating films for the respective pixel regions are united with each other in such a way as to cover the whole substrate except for the windows, through which the transmission electrodes are respectively exposed to define the transmission regions.

Moreover, the interlayer insulating films comprise the overlapped regions overlapped with the respective second parts of the common electrode, each of the overlapped regions having the width greater than the width of the corresponding one of the signal lines and equal to or less than the width of the corresponding second part. The width of the corresponding second part of the common electrode is greater than the width of the corresponding signal line overlapped with the said second part in such a way that the width difference of 2 μm or greater is allocated to each side of the said second part.

Therefore, in the process of forming the reflection electrodes and the barrier metal films, even if a developer solution reaches the vicinity of the common electrode through the cracks formed in the barrier metal films, the developer solution is blocked by the interlayer insulating films and does not reach the common electrode.

Accordingly, the cell corrosion reaction can be prevented by simply changing the shape or pattern of the common electrode and the interlayer insulating films. This means that the fabrication processes need not be changed significantly. As a result, the reduction and corrosion of the common electrode due to the cell corrosion reaction can be effectively suppressed with a simple method.

According to the fifth aspect of the present invention, a method of fabricating a semi-transmissive type LCD device is provided.

The device comprises:

scanning lines formed to extend along a first direction and arranged at predetermined intervals along a second direction perpendicular to the first direction on a substrate;

signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions; and each of the reflection electrodes being disposed over the substrate in such a way that an interlayer insulating film and a barrier metal film intervene between the said reflection electrode and the substrate, and being electrically connected to the corresponding transmission electrode by way of the barrier metal film.

The method according to the fifth aspect of the invention comprises the steps of:

forming a conductive film for the transmission electrodes on the substrate; and patterning the conductive film in such a way that one of the transmission electrodes and a corresponding one of the scanning lines are arranged at a distance of 2 μm or greater in each of the pixel regions.

With the method of fabricating a semi-transmissive type LCD device according to the fifth aspect of the present invention, as describe above, the conductive film for the transmission electrodes is formed on the substrate and then, the conductive film is patterned in such a way that one of the transmission electrodes and a corresponding one of the scanning lines are arranged at a distance of 2 μm or greater in each of the pixel regions. Therefore, the semi-transmissive type LCD device according to the first aspect of the invention is fabricated.

Moreover, the cell corrosion reaction can be prevented by simply changing the shape or pattern of the transmission electrodes, which means that the fabrication processes need not be changed significantly. As a result, the reduction and corrosion of the transmission electrodes due to the cell corrosion reaction can be effectively suppressed with a simple method.

In a preferred embodiment of the method according to the fifth aspect of the invention, the distance between the one of the transmission electrodes and the corresponding one of the scanning lines is 3 μm or greater. In this case, there is an additional advantage that the certainty of preventing the cell corrosion reaction is increased.

In another preferred embodiment of the method according to the fifth aspect of the invention, in each of the pixel regions, one of the transmission electrodes and a corresponding one of the signal lines are arranged at a distance of 2 μm (more preferably, 3 μm) or greater as well. In this case, there is an additional advantage that the cell corrosion reaction can be prevented even if the cracks of the barrier metal films are generated near the steps or level differences formed by the signal lines.

In still another preferred embodiment of the method according to the fifth aspect of the invention, a step of forming the interlayer insulating film to cover a corresponding one of the scanning lines, thereby covering gaps between the transmission electrodes and the corresponding scanning lines with the interlayer insulating films is additionally provided. In this case, since the vicinities of the steps or level differences formed by the scanning lines are covered with the interlayer insulating films, the developer solution can be prevented from reaching the transmission electrodes by the interlayer insulating films. As a result, there is an additional advantage that the certainty of preventing the cell corrosion reaction is increased.

In this embodiment, it is preferred that in the step of forming the interlayer insulating film to cover a corresponding one of the scanning lines, the interlayer insulating film is patterned to have a width corresponding to one of transmission regions that expose the transmission electrodes and to have belt-shaped openings extending along the scanning lines.

According to the sixth aspect of the present invention, another method of fabricating a semi-transmissive type LCD device is provided.

The device comprises:

scanning lines formed to extend along a first direction and arranged at predetermined intervals along a second direction perpendicular to the first direction on a substrate;

signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions; and each of the reflection electrodes being disposed over the substrate in such a way that an interlayer insulating film and a barrier metal film intervene between the said reflection electrode and the substrate, and being electrically connected to the corresponding transmission electrode by way of the barrier metal film.

The method according to the sixth aspect of the invention comprises the steps of:

forming a conductive film for the transmission electrodes on the substrate;

patterning the conductive film in such a way that one of the transmission electrodes and a corresponding one of the scanning lines are arranged to be partially overlapped with each other or arranged at a distance less than 2 μm in each of the pixel regions; and forming the interlayer insulating films for the respective pixel regions to cover the scanning lines, thereby covering gaps between the scanning lines and the corresponding transmission electrodes.

With the method of fabricating a semi-transmissive type LCD device according to the sixth aspect of the present invention, as describe above, the conductive film for the transmission electrodes is formed on the substrate and thereafter, the conductive film is patterned in such a way that one of the transmission electrodes and a corresponding one of the scanning lines are arranged to be partially overlapped with each other or arranged at a distance less than 2 μm in each of the pixel regions. Moreover, the interlayer insulating films for the respective pixel regions are formed to cover the scanning lines, thereby covering the gaps between the scanning lines and the corresponding transmission electrodes. Accordingly, the semi-transmissive type LCD device according to the second aspect of the invention is fabricated.

In addition, the cell corrosion reaction can be prevented by simply changing the shape or pattern of the transmission electrodes and the interlayer insulating films, which means that the fabrication processes need not be changed significantly. As a result, the reduction and corrosion of the transmission electrodes due to the cell corrosion reaction can be effectively suppressed with a simple method.

In a preferred embodiment of the method according to the sixth aspect of the invention, the interlayer insulating films for the respective pixel regions are united with each other in such a way as to cover the whole substrate except for windows, where the windows define transmission regions by exposing the corresponding transmission electrodes from the interlayer insulating films united. In this case, there is an additional advantage that the mask pattern for forming the interlayer insulating films can be formed easily.

According to the seventh aspect of the present invention, still another method of fabricating a semi-transmissive type LCD device is provided.

The device comprises:

scanning lines formed to extend along a first direction and arranged at predetermined intervals along a second direction perpendicular to the first direction on a substrate;

signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions; and each of the reflection electrodes being disposed over the substrate in such a way that an interlayer insulating film and a barrier metal film intervene between the said reflection electrode and the substrate, and being electrically connected to the corresponding transmission electrode by way of the barrier metal film.

The method according to the seventh aspect of the invention comprises the steps of:

forming a semiconductor film on the substrate; and patterning the semiconductor film in such a way that in each of the pixel regions, a gap between one of the transmission electrodes and a corresponding one of the scanning lines is covered with the semiconductor film and that the semiconductor film is overlapped with the corresponding scanning line and extended along the said scanning line.

With the method of fabricating a semi-transmissive type LCD device according to the seventh aspect of the present invention, as describe above, after forming the semiconductor film on the substrate, the semiconductor film is patterned in such a way that in each of the pixel regions, a gap between one of the transmission electrodes and a corresponding one of the scanning lines is covered with the semiconductor film and that the semiconductor film is overlapped with the corresponding scanning line and extended along the said scanning line. Therefore, the semi-transmissive type LCD device according to the third aspect of the invention is fabricated.

Moreover, since the semiconductor film can be formed by using a semiconductor film for TFTs, the cell corrosion reaction can be prevented by simply changing the shape or pattern of the semiconductor film for TFTs. This means that the fabrication processes need not be changed significantly. As a result, the reduction and corrosion of the transmission electrodes due to the cell corrosion reaction can be effectively suppressed with a simple method.

In a preferred embodiment of the method according to the seventh aspect of the invention, a step of forming the interlayer insulating film to overlap with a corresponding one of the scanning lines in each of the pixel regions, thereby covering a corresponding one of the gaps between the transmission electrodes and the scanning lines, is additionally provided. In this case, since the gaps between the transmission electrodes and the scanning lines are covered with the interlayer insulating films, there is an additional advantage that the certainty of preventing the cell corrosion reaction is increased.

According to the eighth aspect of the present invention, a further method of fabricating a semi-transmissive type LCD device is provided.

The device comprises:

scanning lines formed to extend along a first direction and arranged at predetermined intervals along a second direction perpendicular to the first direction on a substrate;

common electrode lines formed to be adjacent to the respective scanning lines and to extend along the said scanning lines;

signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions;

a common electrode having first parts extending along the common electrode lines and second parts overlapped with the signal lines and extending along the said signal lines;

each of the reflection electrodes being disposed over the substrate in such a way that an interlayer insulating film and a barrier metal film intervene between the reflection electrodes and the substrate, and being electrically connected to the corresponding transmission electrode by way of the barrier metal film.

The method according to the eighth aspect of the present invention comprises the steps of:

forming a conductive film for the common electrode on or over the substrate;

patterning the conductive film for the common electrode in such a way that the common electrode has first parts extending along the common electrode lines and second parts overlapped with the signal lines and extending along the said signal lines;

forming an insulating film for the interlayer insulating films over the substrate; and patterning the insulating film for the interlayer insulating films in such a way as to cover the whole substrate except for windows through which the transmission electrodes are respectively exposed to define transmission regions;

wherein in the step of patterning the conductive film for the common electrode, the interlayer insulating films comprise overlapped regions overlapped with the respective second parts of the common electrode, each of the overlapped regions having a width greater than a width of a corresponding one of the signal lines and equal to or less than a width of the corresponding second part; and in the step of patterning the insulating film for the interlayer insulating film, the width of the corresponding second part of the common electrode is greater than the width of the corresponding signal line overlapped with the said second part in such a way that a width difference of 2 µm or greater is allocated to each side of the said second part.

With the method of fabricating a semi-transmissive type LCD device according to the eighth aspect of the present invention, as describe above, after forming the conductive film for the common electrode on or over the substrate, the said conductive film is patterned in such a way that the common electrode has the first parts extending along the common electrode lines and the second parts overlapped with the signal lines and extending along the said signal lines. Moreover, the insulating film for the interlayer insulating film is formed over the substrate and thereafter, the said insulating film is patterned in such a way as to cover the whole substrate except for windows through which the transmission electrodes are respectively exposed to define transmission regions.

Furthermore, in the step of patterning the conductive film for the common electrode, each of the overlapped regions is formed to have the width greater than the width of the corresponding one of the signal lines and equal to or less than the width of the corresponding second part. In the step of patterning the insulating film for the interlayer insulating films, the width of one of the second parts of the common electrode is set to be greater than the width of the corresponding one of the signal lines in such a way that the width difference of 2 µm or greater is allocated to each side of the one of the second parts.

Therefore, the semi-transmissive type LCD device according to the fourth aspect of the invention is fabricated.

Moreover, the cell corrosion reaction can be prevented by simply changing the shape or pattern of the common electrode and the interlayer insulating films, which means that the fabrication processes need not be changed significantly. As a result, the reduction and corrosion of the common electrode due to the cell corrosion reaction can be effectively suppressed with a simple method.

BRIEF DESCRIPTION OF THE DRAWINGS

In order that the present invention may be readily carried into effect, it will now be described with reference to the accompanying drawings.

FIGS. 24A and 24B are explanatory views showing the calculation or measuring method of the distance B between the edge of the scanning line and the nearby edge of the transmission electrode in the method of fabricating the TFT array substrate used for the LCD device according to the first embodiment of the invention, respectively.

FIG. 24C is a table showing the relationship between the distance B and the presence or absence of occurrence of the reduction action in the method of fabricating the TFT array substrate used for the LCD device according to the first embodiment of the invention.

DETAILED DESCRIPTION OF THE PREFERRED EMBODIMENTS

Figure 1:
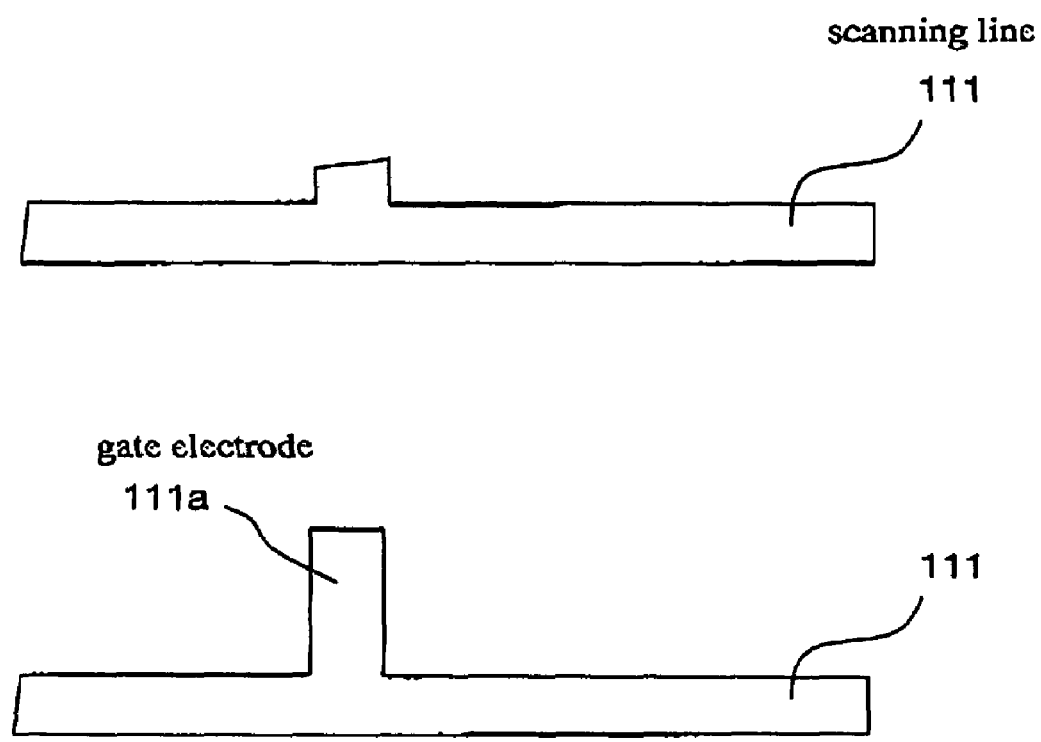
FIG. 1 is a partial plan view showing a method of fabricating the TFT array substrate used for a prior-art semi-transmissive type LCD device.
Figure 2:
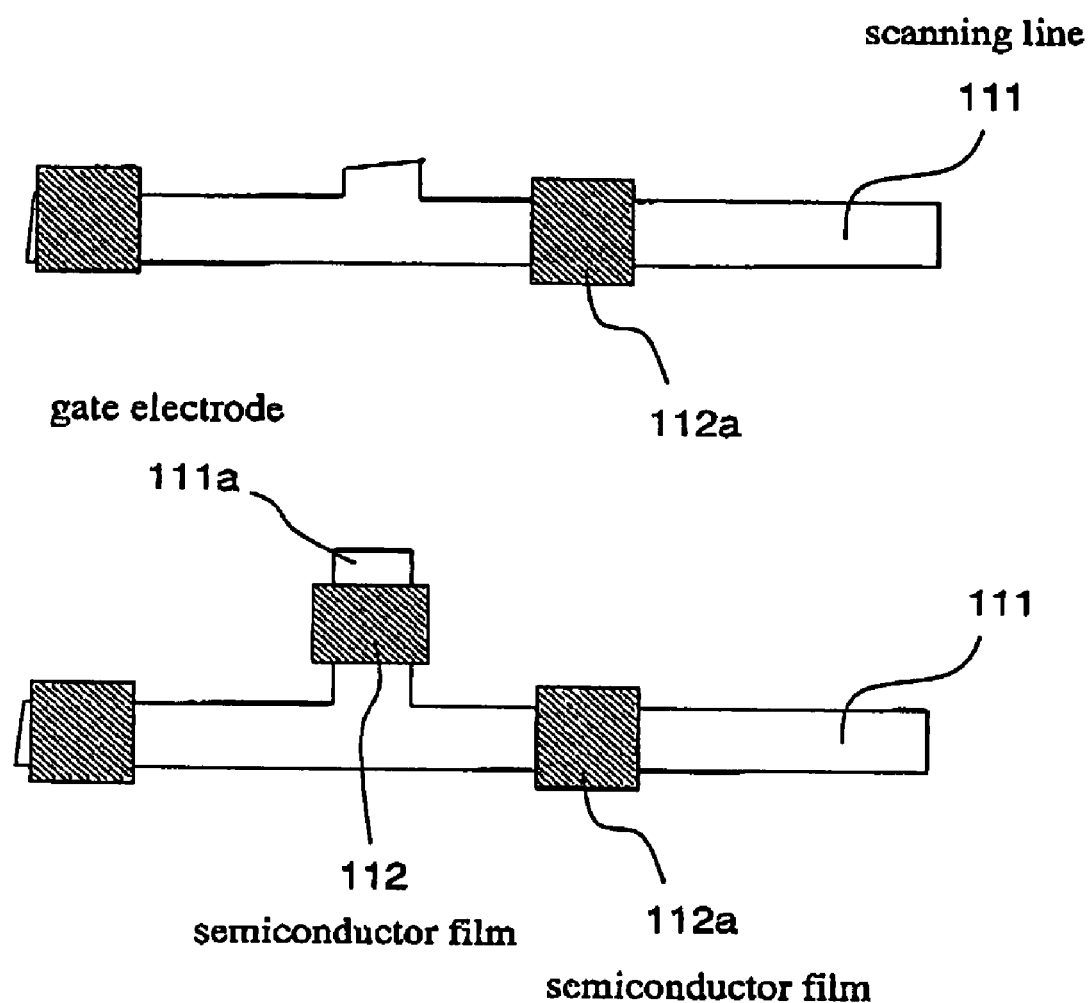
FIG. 2 is a partial plan view showing the method of fabricating the TFT array substrate used for the prior-art semi-transmissive type LCD device, which is subsequent to the step of FIG. 1.
Figure 3:
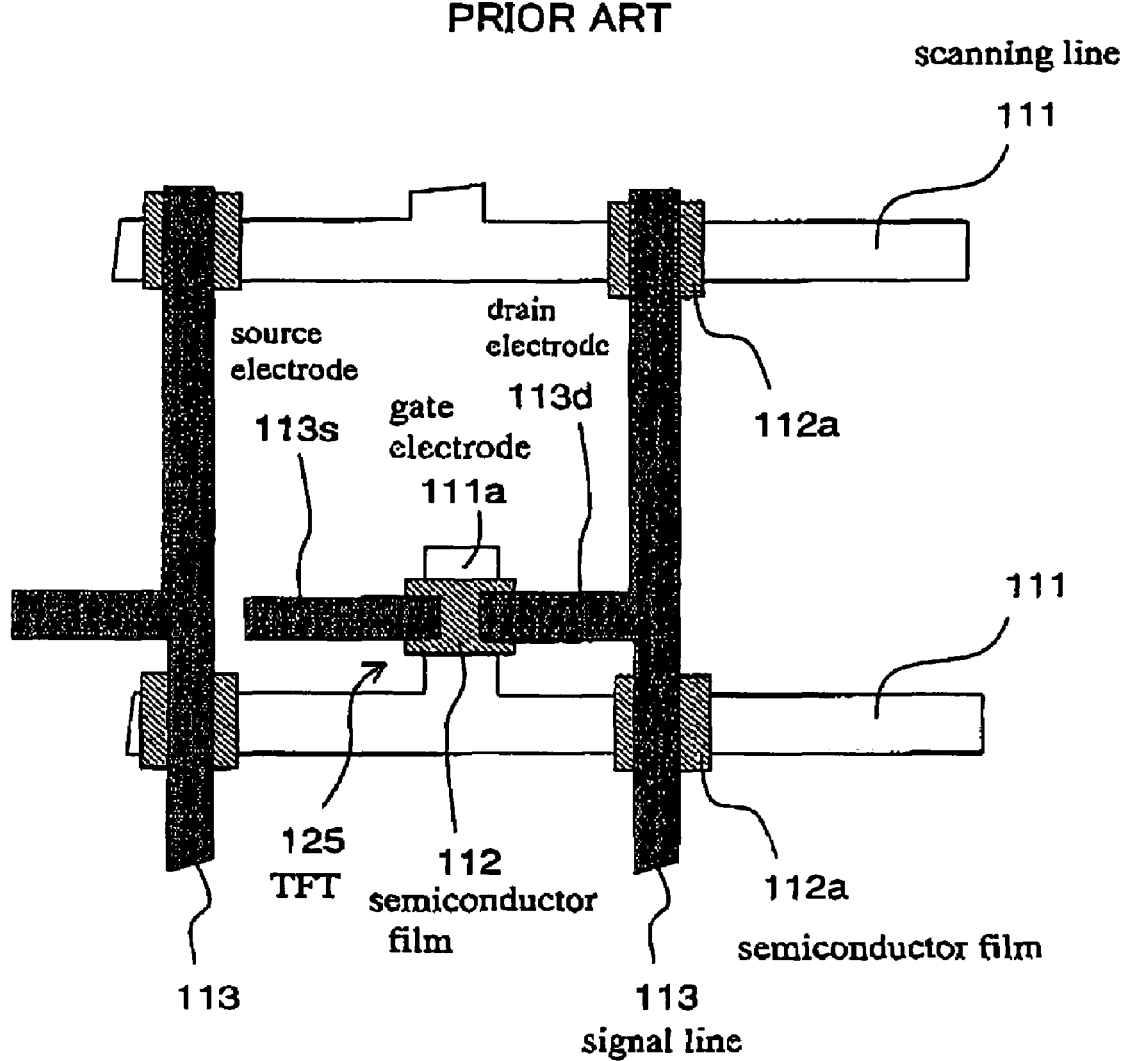
FIG. 3 is a partial plan view showing the method of fabricating the TFT array substrate used for the prior-art LCD device, which is subsequent to the step of FIG. 2.
Figure 4:
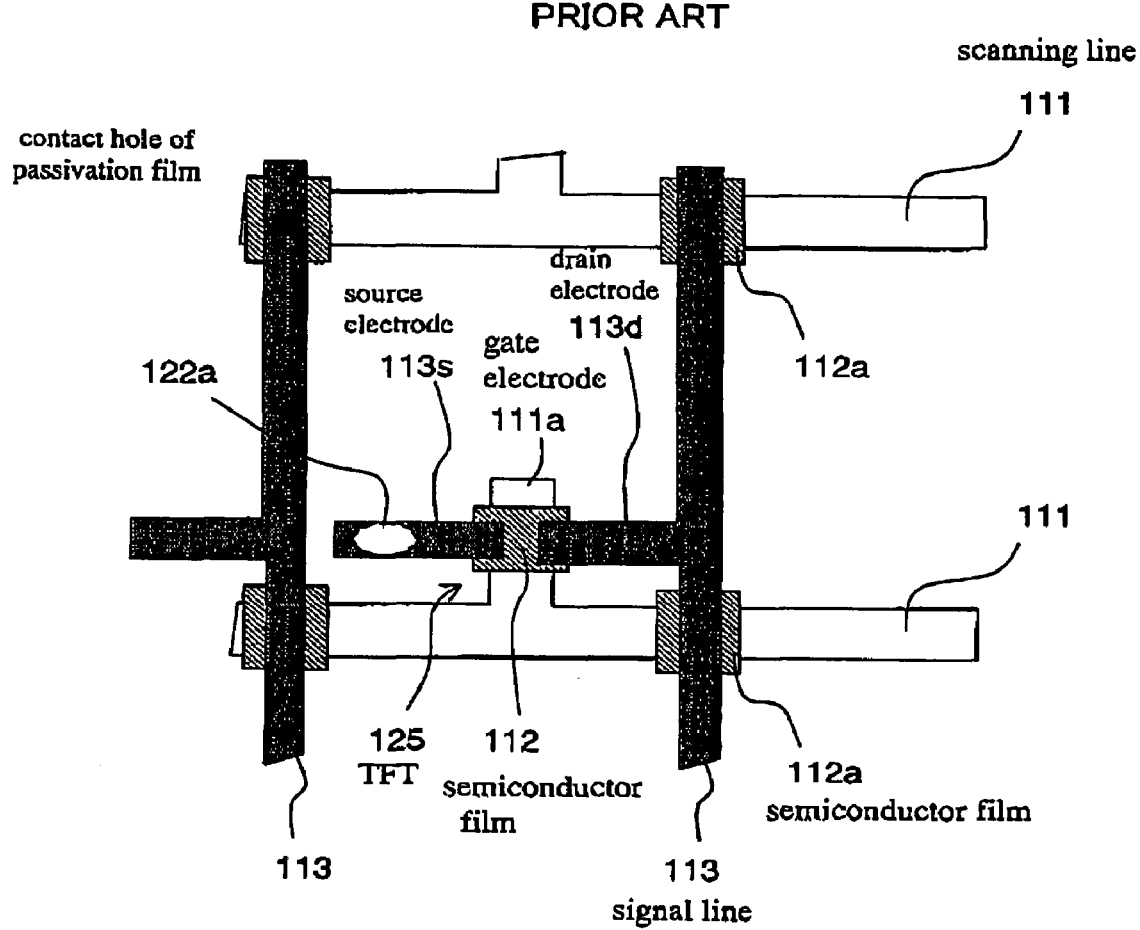
FIG. 4 is a partial plan view showing the method of fabricating the TFT array substrate used for the prior-art LCD device, which is subsequent to the step of FIG. 3.

Preferred embodiments of the present invention will be described in detail below while referring to the drawings attached.

First Embodiment

Figure 12:
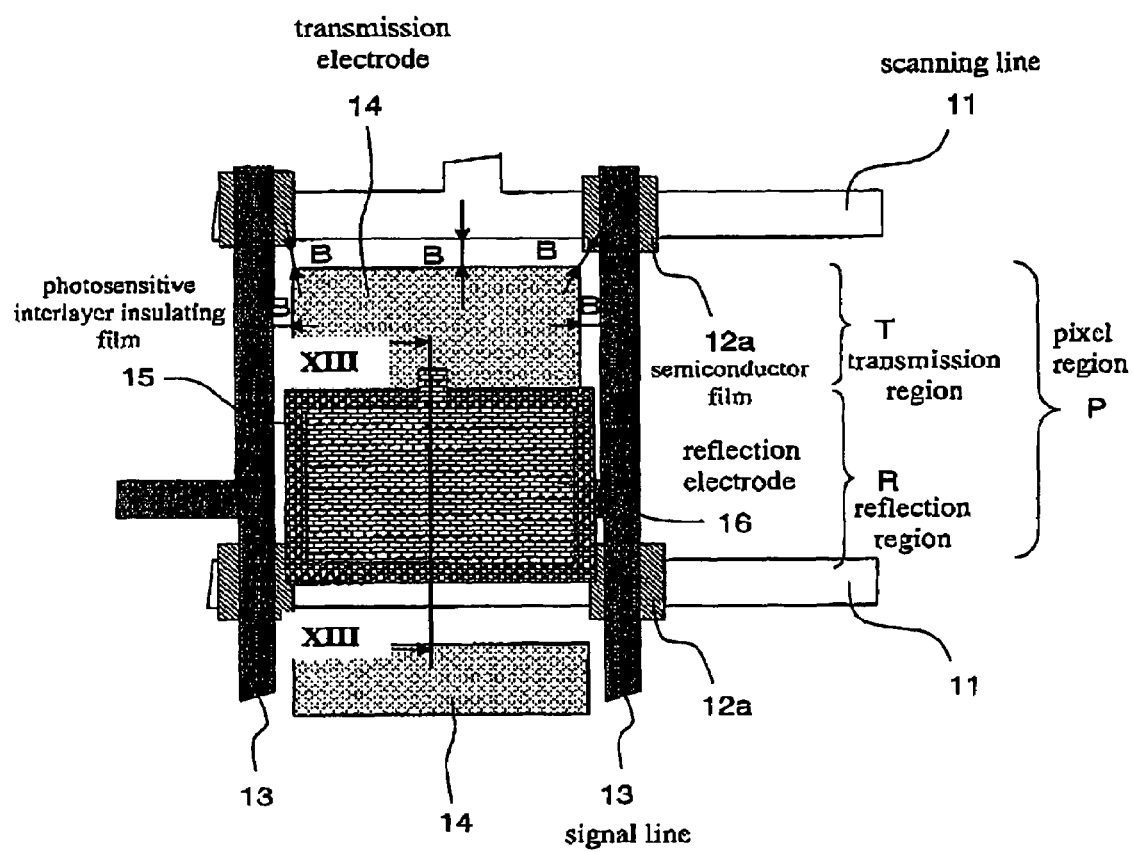
FIG. 12 is a partial plan view showing the schematic structure of the TFT array substrate used for a semi-transmissive type LCD device according to a first embodiment of the invention.
Figure 13:
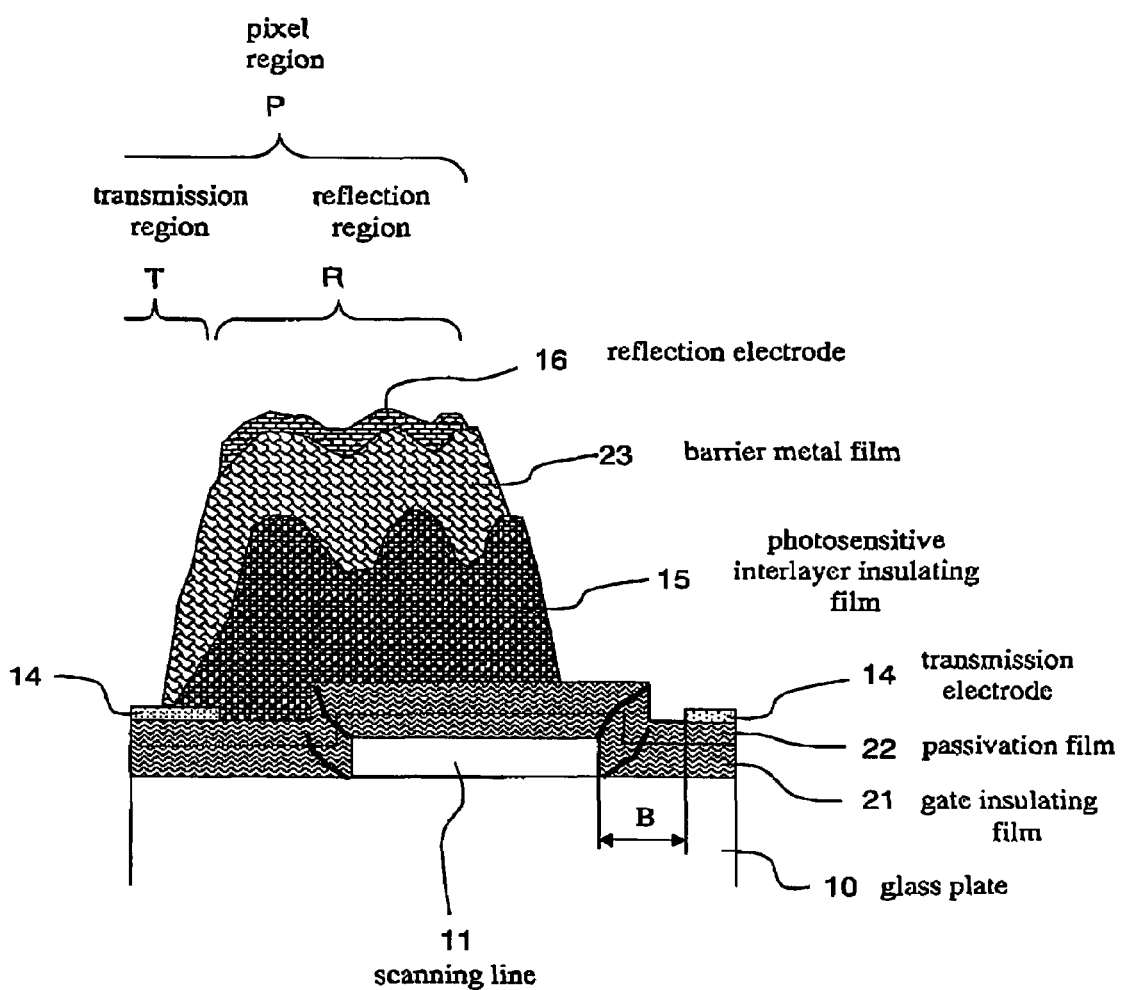
FIG. 13 is a partial cross-sectional view along the line XIII-XIII in FIG. 12.

The schematic structure of the TFT array substrate used for a semi-transmissive type LCD device according to a first embodiment of the invention is shown in FIG. 12, and the cross-sectional structure thereof along the line XIII-XIII in FIG. 12 is shown in FIG. 13. These figures show the pixel structure of one of the pixel regions P arranged in a matrix array.

As shown in FIGS. 12 and 13, the TFT array substrate used for the semi-transmissive type LCD device according to the first embodiment of the invention comprises a glass plate 10 serving as an insulative transparent substrate. On the glass plate 10, scanning lines 11 and signal lines 13 are formed. The scanning lines 11, which are extended along the horizontal direction of FIG. 12, are arranged along the vertical direction of FIG. 12 at equal intervals. The scanning lines 11 and gate electrodes are covered with a gate insulating film 21. The signal lines 13, which are extended along the vertical direction of FIG. 12, are arranged along the horizontal direction of FIG. 12 at equal intervals. The signal lines 13 are covered with a passivation film 22.

The pixel region P corresponding to one pixel is one of the approximately rectangular regions defined by the scanning lines 11 and the signal lines 13. The pixel region P is divided into a transmission region T and a reflection region R, where a transmission electrode 14 with an approximately rectangular pattern is formed (exposed) in the transmission region T and a reflection electrode 16 with an approximately rectangular pattern is formed in the reflection region R.

Therefore, the transmission electrode 14 and the reflection electrode 16 constitute the pixel electrode of the pixel region P.

In the reflection region R, a photosensitive interlayer insulating film 15, which has an approximately rectangular planar shape or pattern, is formed on the passivation film 22. A conductive barrier metal film 23, which has an approximately rectangular planar shape or pattern, is formed on the photosensitive interlayer insulating film 15. The reflection electrode 16, which has an approximately rectangular planar shape or pattern, is formed on the barrier metal film 23.

The lower end of the barrier metal film 23 near the transmission electrode 14 is in contact with the transmission electrode 14. The upper surface of the barrier metal film 23 is in contact with the reflection electrode 16. Thus, the transmission electrode 14 and the reflection electrode 16 are electrically interconnected by way of the barrier metal film 23.

In the reflection region R, a TFT is formed below the reflection electrode 16. (The TFT will be referred to later in the subsequent explanation about the fabrication method of the LCD device.) Island-shaped semiconductor films 12a located at the respective intersections of the scanning lines 11 and the signal lines 13 are to reduce the parasitic capacitance between the scanning and signal lines 11 and 13 opposite to each other by way of the gate insulating film 21. As explained later, the semiconductor films 12a are made of the same semiconductor material as that of semiconductor films 12 serving as the active layers of the TFTs.

As clearly shown in FIG. 12, the transmission electrode 14 exposed from the reflection electrode 16 is apart from the two scanning lines 11 and the two signal lines 13 that define the pixel region P and that extend along the edges of the transmission electrode 14. Specifically, the transmission electrode 14 is apart from the scanning line 11 extending along the horizontal edge of the transmission electrode 14 (which is located above in FIG. 12) at a distance B. At the same time, the said transmission electrode 14 is apart from the two signal lines 13 (which are located at each side in FIG. 12) at distances B. Furthermore, the said transmission electrode 14 is apart from the semiconductor films 12a at distances B. Here, the distances B are set at 2 μm or greater. However, it is more preferred that the distances B are set at 3 μm or greater.

Next, a method of fabricating the TFT array substrate of the semi-transmissive type LCD device according to the first embodiment having the above-described structure will be explained below with reference to FIGS. 14 to 23.

Figure 14:
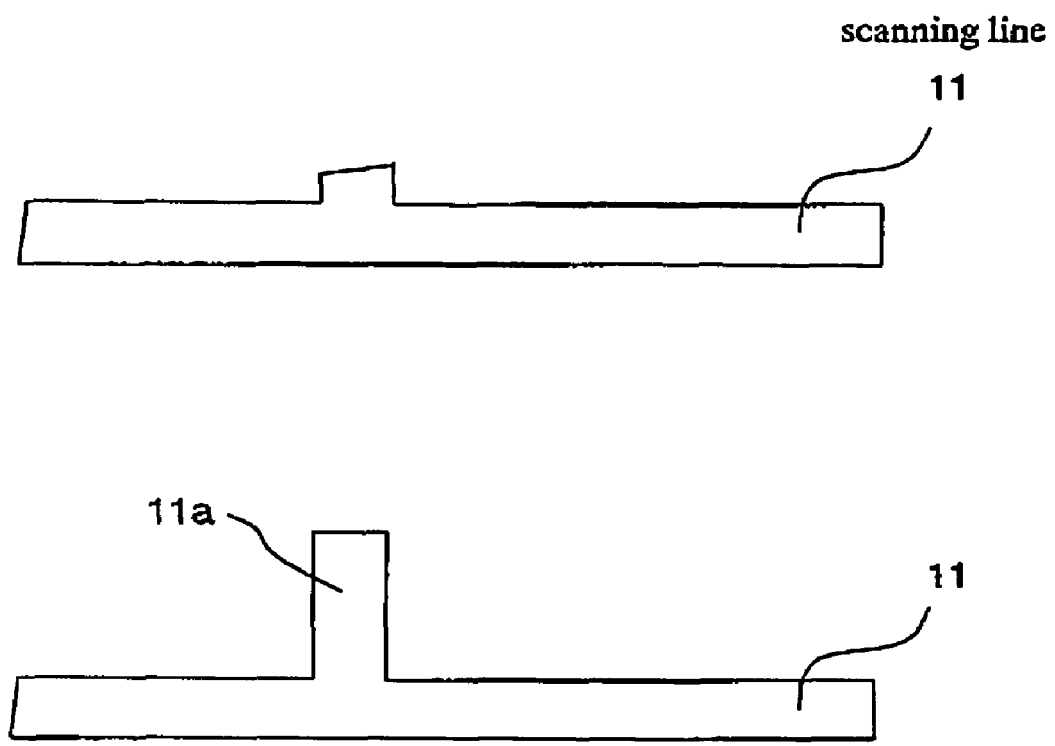
FIG. 14 is a partial plan view showing a method of fabricating the TFT array substrate used for the semi-transmissive type LCD device according to the first embodiment of the invention.

First, as shown in FIG. 14, the gate electrodes 11a and the scanning lines (gate lines) 11 are formed directly on or indirectly by way of an appropriate insulating film over the glass plate 10. For example, a film made of Cr, Al, Mo, Ti, or copper (Cu) or an alloy thereof is formed and then, it is patterned by the photolithography and etching method, thereby forming the gate electrodes 11a and the scanning lines 11 which are united with each other. The scanning lines 11, which are extended along the horizontal direction of FIG. 14, are arranged along the vertical direction of FIG. 14 at equal intervals.

Figure 15:
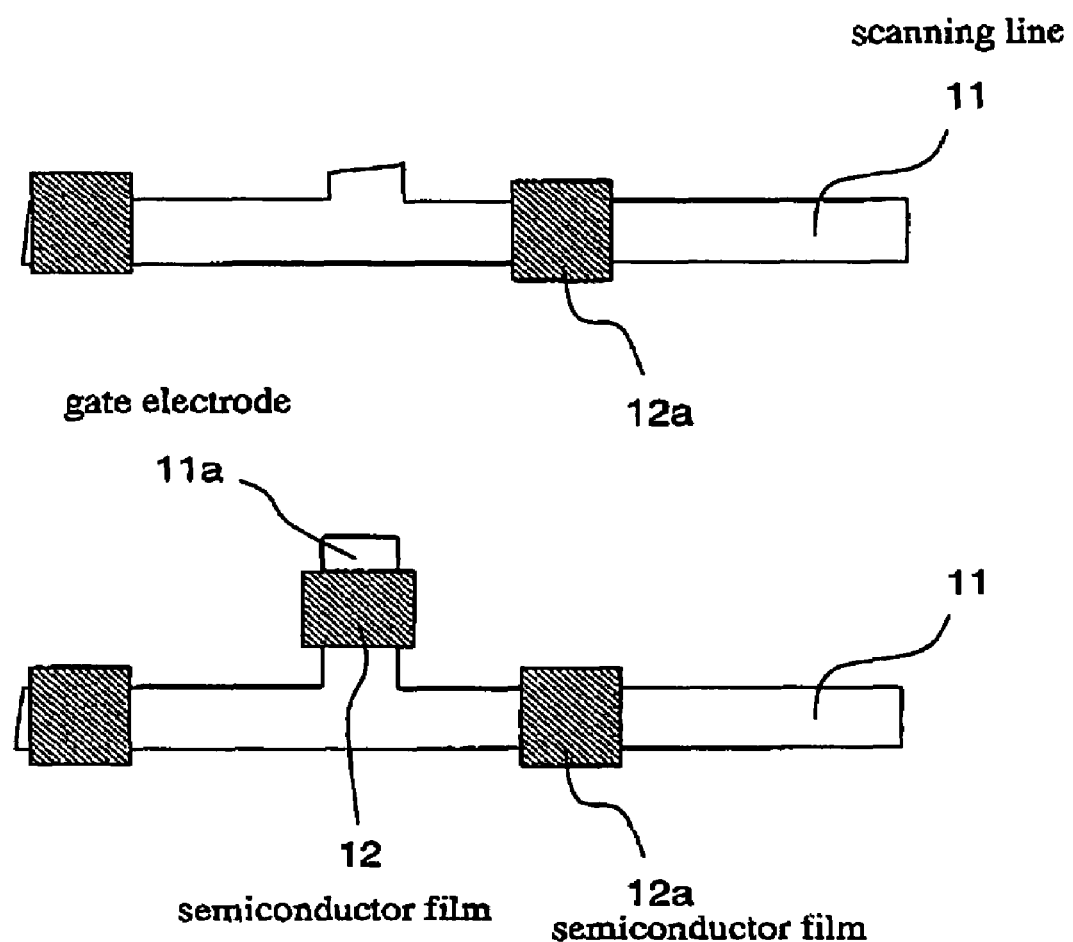
FIG. 15 is a partial plan view showing the method of fabricating the TFT array substrate used for the LCD device according to the first embodiment of the invention, which is subsequent to the step of FIG. 14.

Next, a SiN$_x$ film serving as the gate insulating film 21 (see FIG. 13) is formed on the whole surface of the glass plate 10 by a CVD method, thereby covering the gate electrodes 11a and the scanning lines 11. Thereafter, a non-doped a-Si film and a n-type a-Si film doped with P are formed in this order over the whole surface of the glass plate 10 and then, these two a-Si films are patterned by the photolithography and etching method, thereby forming the island-shaped semiconductor films 12 and 12a, as shown in FIG. 15.

In the said pixel region P, the semiconductor films 12 overlapped with the gate electrodes 11a are used as the active layers of TFTs. The semiconductor films 12a overlapped with the scanning lines 11 are located at predetermined positions to be overlapped with signal lines (data lines) 13 which will be formed later. Since the semiconductor films 12a are provided to suppress the parasitic capacitance between the scanning lines 11 and the signal lines 13, they may be cancelled.

Figure 16:
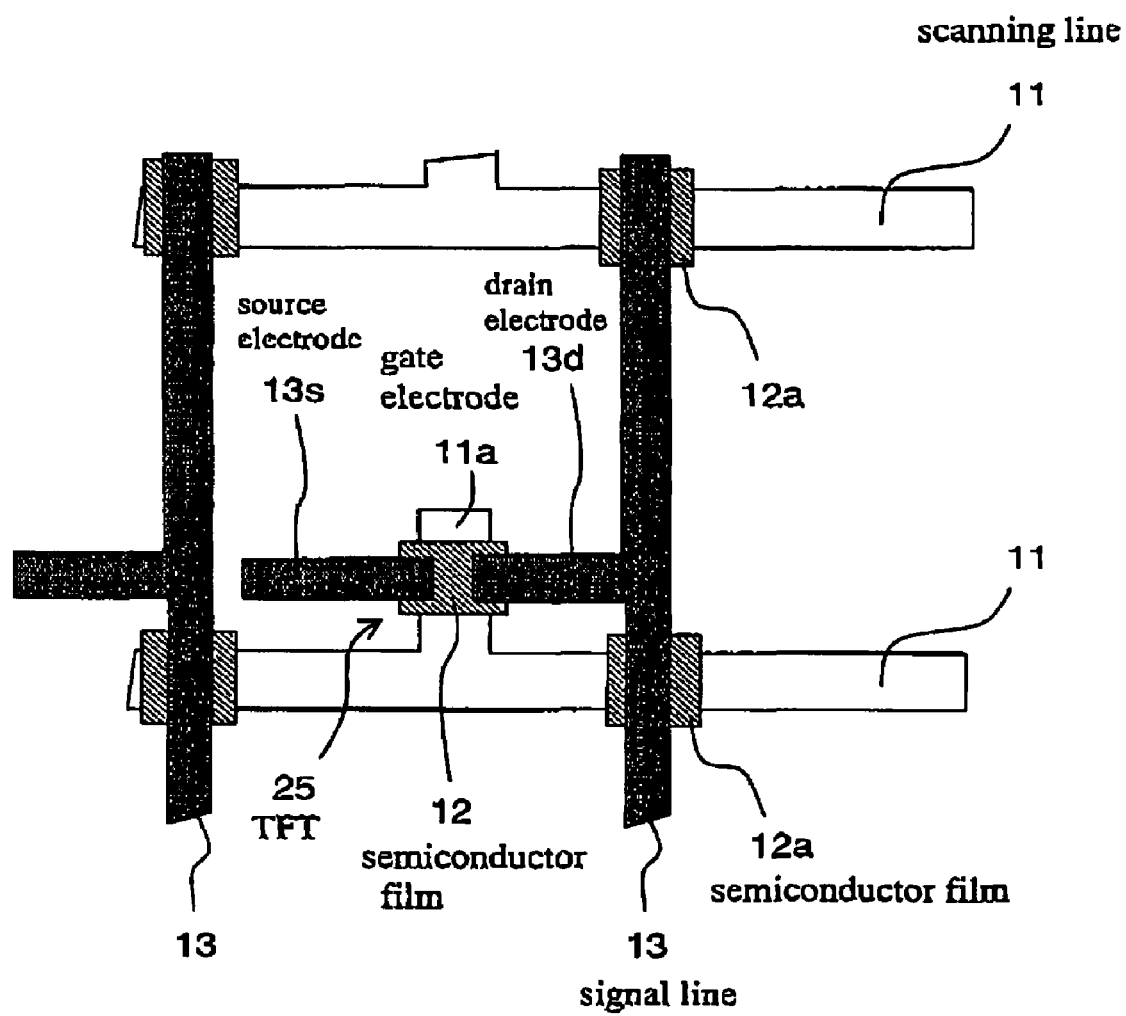
FIG. 16 is a partial plan view showing the method of fabricating the TFT array substrate used for the LCD device according to the first embodiment of the invention, which is subsequent to the step of FIG. 15.

Subsequently, metal film similar to the metal film used for the scanning lines 11 is formed on the semiconductor films 12 and 12a and then, it is patterned by the photolithography and etching method, thereby forming signal lines 13, source electrodes 13s, and drain electrodes 13d, as shown in FIG. 16. The source electrodes 13s and the drain electrodes 13d are partially overlapped with the corresponding semiconductor films 12. The source electrodes 13s and the drain electrodes 13d constitute TFTs 25 along with the gate electrodes 11a and the gate insulating film 21. The drain electrodes 13d are unified with the corresponding signal lines 13 to the pixel region P. The signal lines 13 extending vertically in FIG. 16 are arranged horizontally at equal intervals in FIG. 16. The signal lines 13 and the scanning lines 11 constitute a matrix array.

Figure 17:
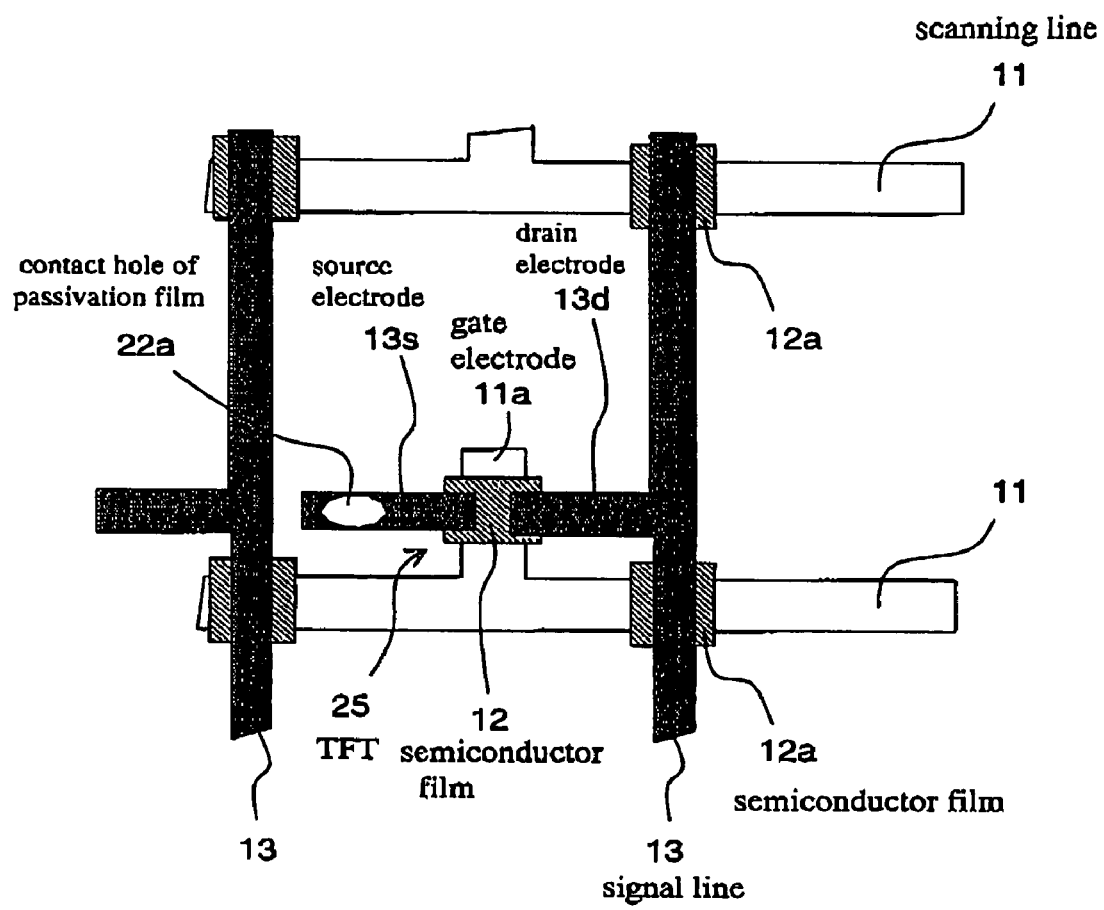
FIG. 17 is a partial plan view showing the method of fabricating the TFT array substrate used for the LCD device according to the first embodiment of the invention, which is subsequent to the step of FIG. 16.

A passivation film 22 (see FIG. 13) is then formed on the gate insulating film 21 over the whole surface of the glass plate 10, thereby covering the TFTs 25 and the signal lines 13. Thereafter, as shown in FIG. 17, contact holes 22a are formed in the passivation film 22 at the positions overlaid with the source electrodes 13s by an etching method. As the passivation film 22, for example, a SiN$_x$ film may be preferably used.

Figure 5:
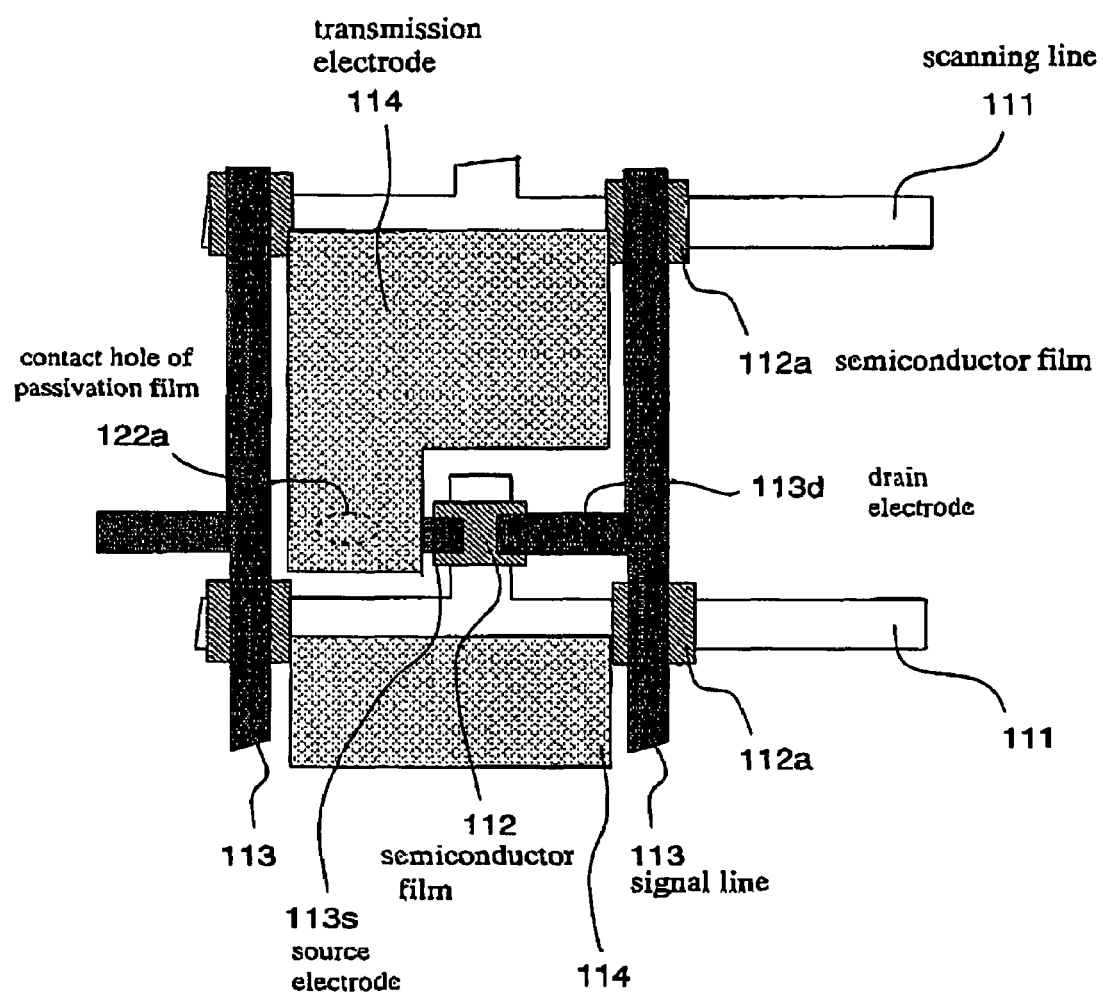
FIG. 5 is a partial plan view showing the method of fabricating the TFT array substrate used for the prior-art LCD device, which is subsequent to the step of FIG. 4.
Figure 6:
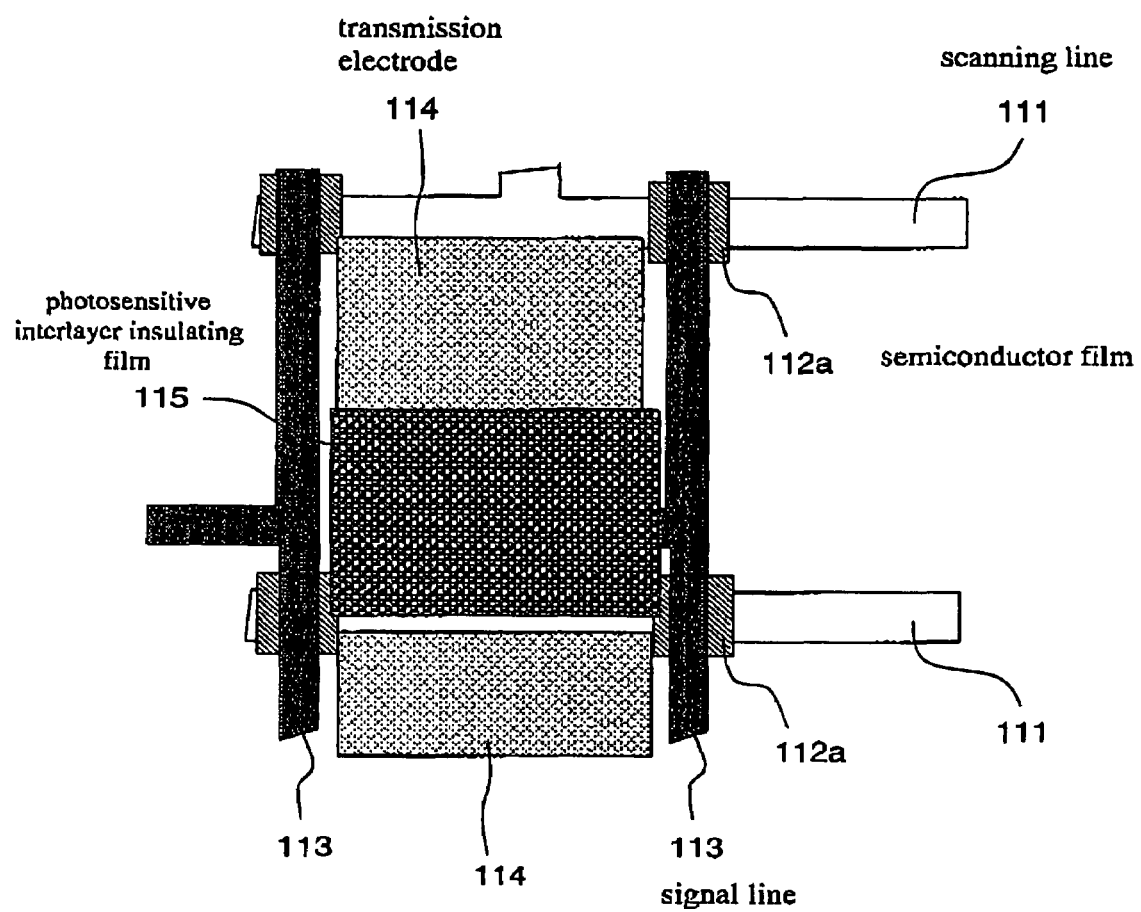
FIG. 6 is a partial plan view showing the method of fabricating the TFT array substrate used for the prior-art LCD device, which is subsequent to the step of FIG. 5.
Figure 7:
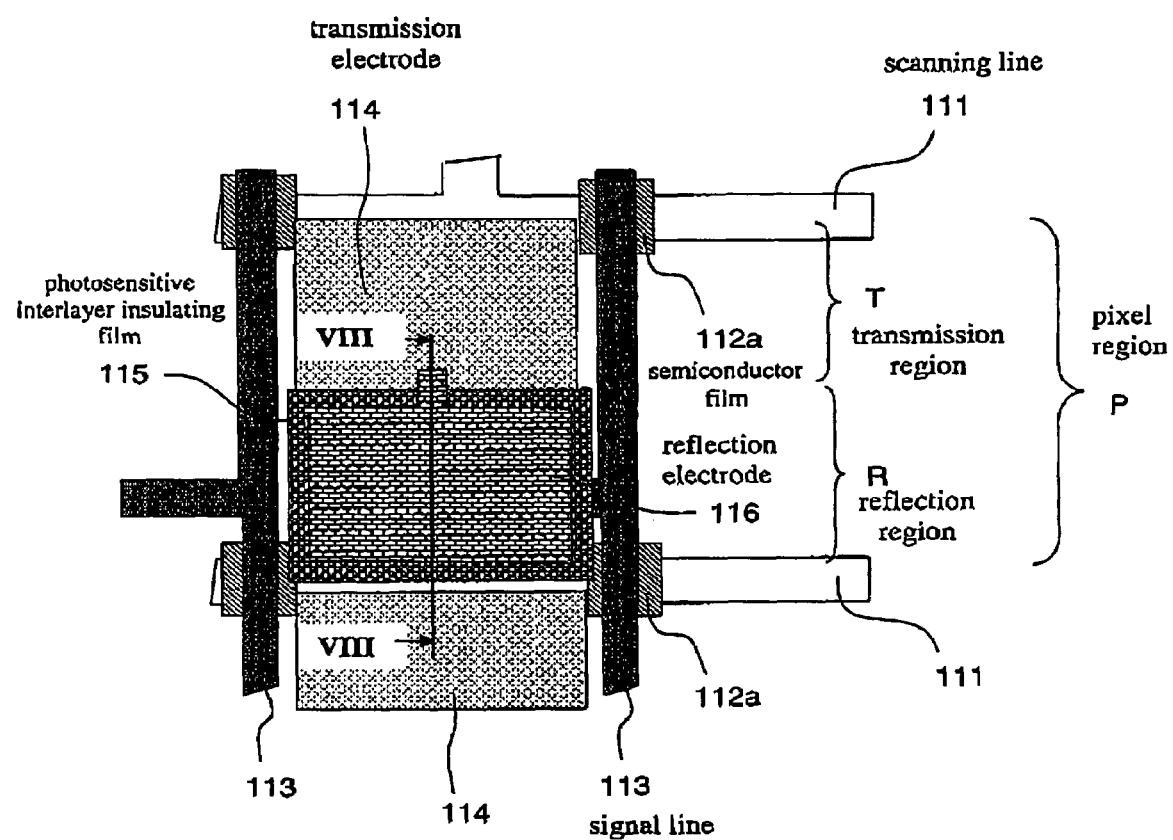
FIG. 7 is a partial plan view showing the method of fabricating the TFT array substrate used for the prior-art LCD device, which is subsequent to the step of FIG. 6.
Figure 8:
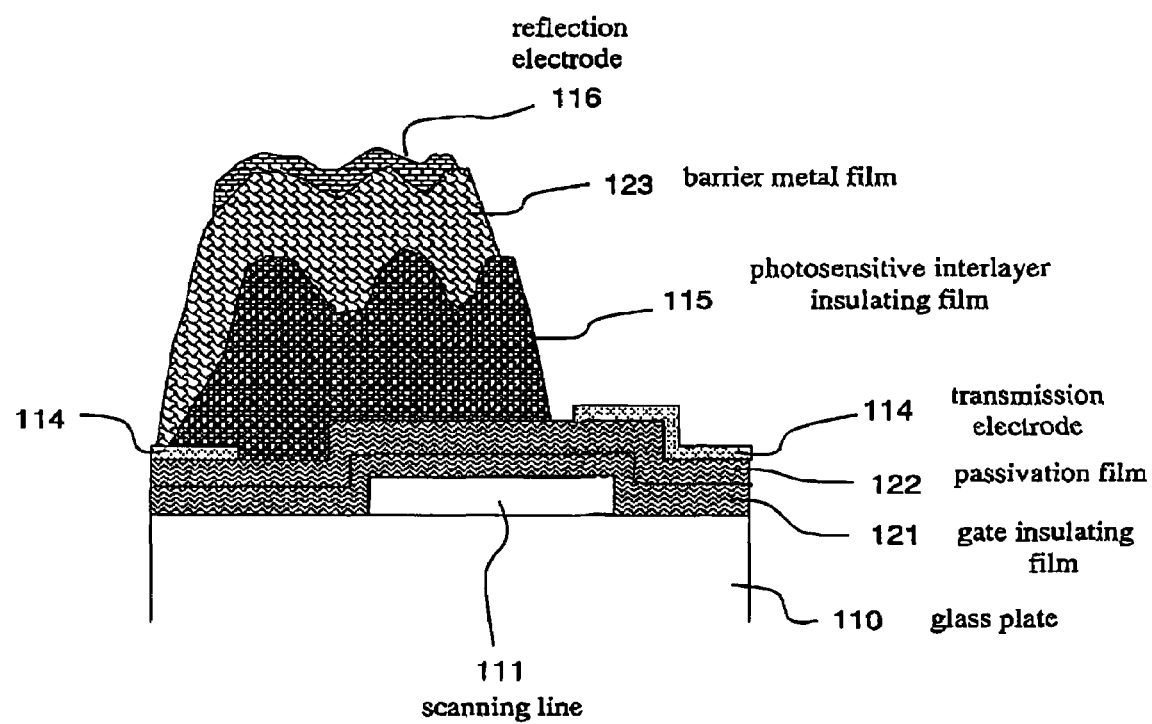
FIG. 8 is a partial cross-sectional view along the line VIII-VIII in FIG. 7.
Figure 9:
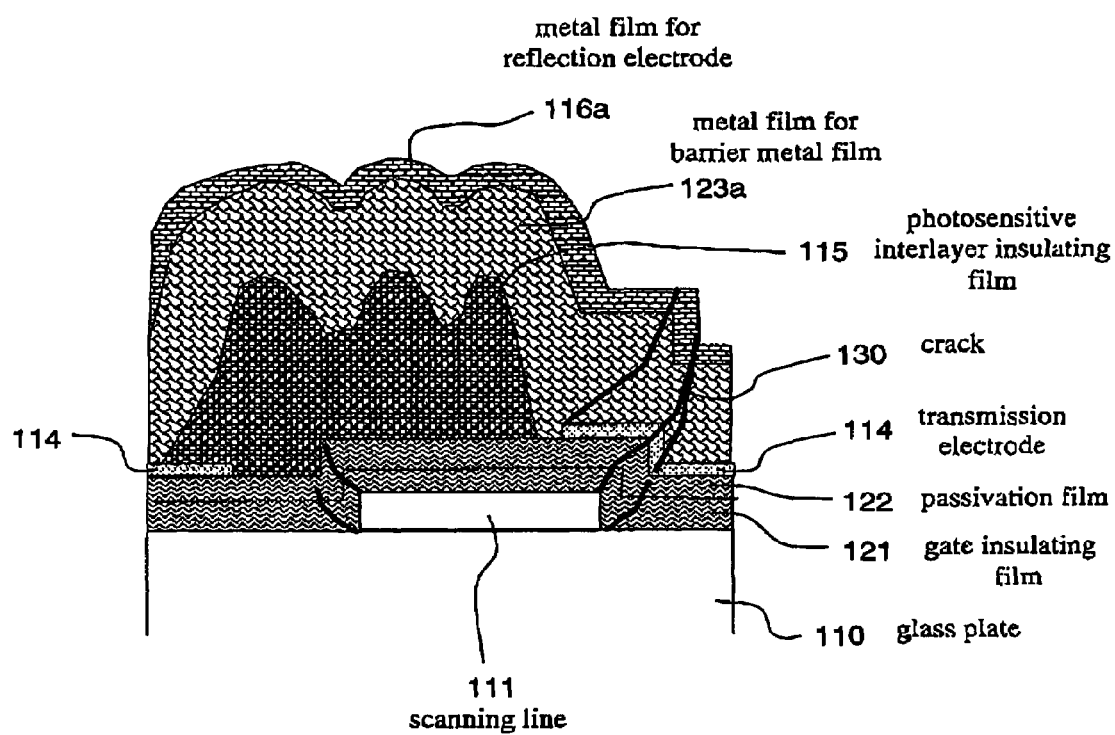
FIG. 9 is a partial cross-sectional view showing the disconnection or breaking process of the ITO film (the transmission electrode) in the method of fabricating the TFT array substrate used for the prior-art LCD device.
Figure 10:
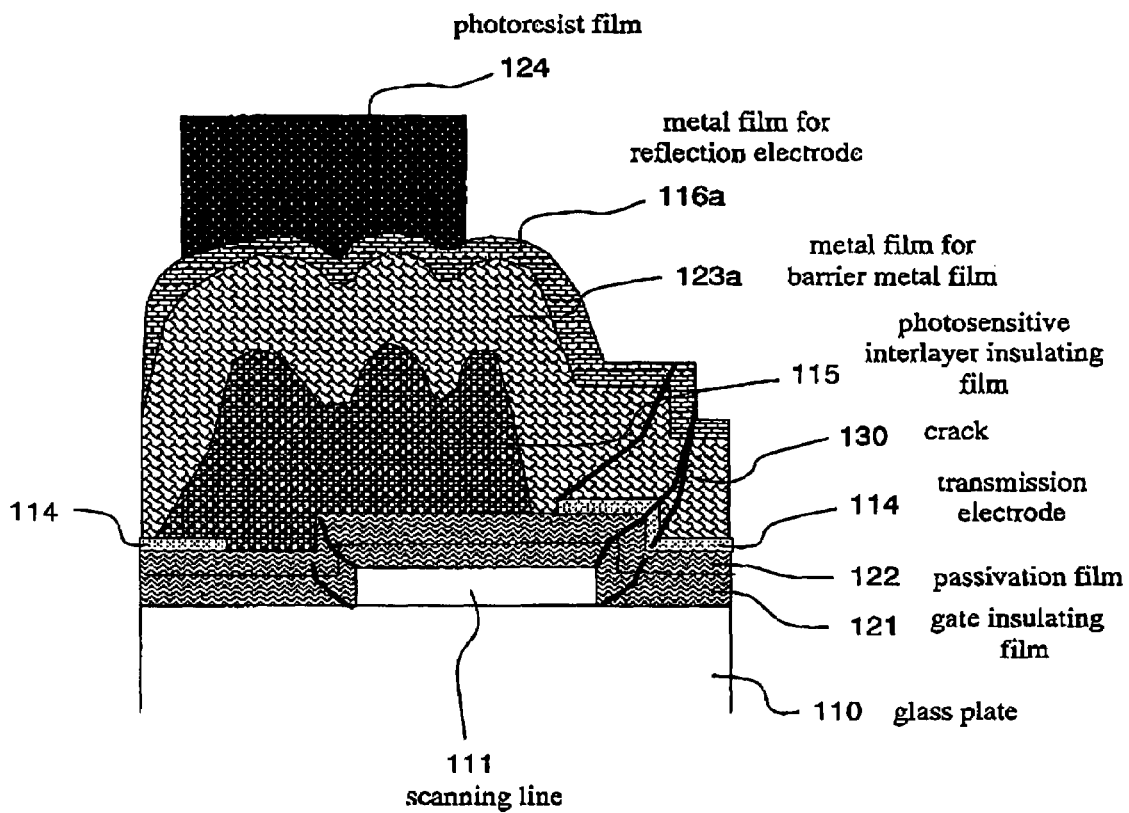
FIG. 10 is a partial cross-sectional view showing the disconnection or breaking process of the ITO film (the transmission electrode) in the method of fabricating the TFT array substrate used for the prior-art LCD device, which is subsequent to the step of FIG. 9.
Figure 11:
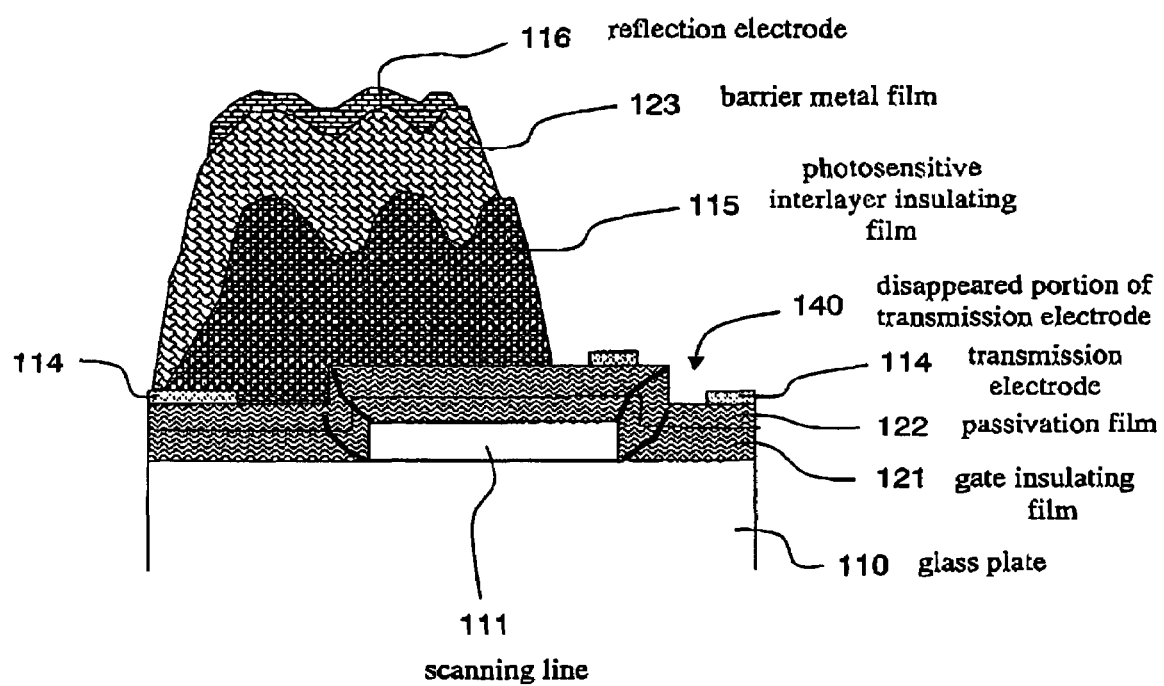
FIG. 11 is a partial cross-sectional view showing the disconnection or breaking process of the ITO film (the transmission electrode) in the method of fabricating the TFT array substrate used for the prior-art LCD device, which is subsequent to the step of FIG. 10.
Figure 18:
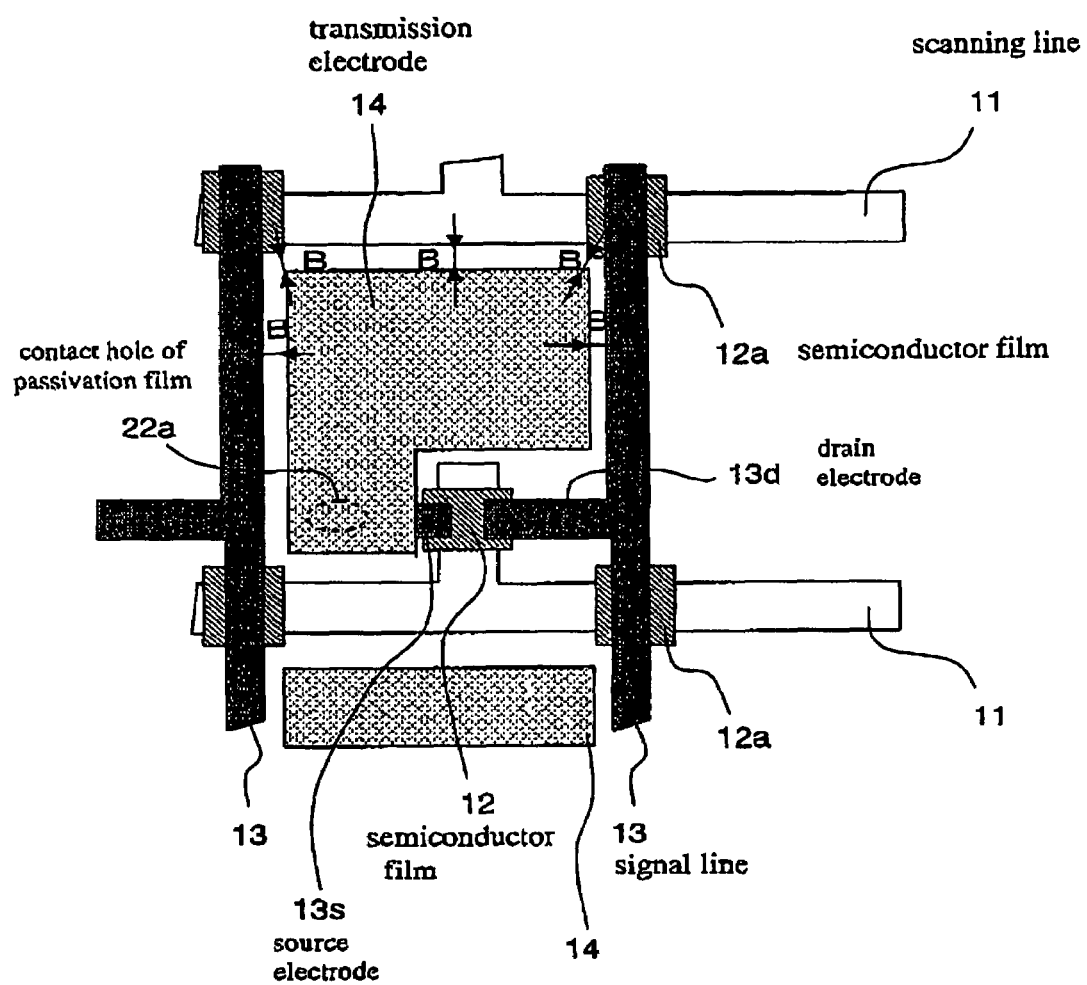
FIG. 18 is a partial plan view showing the method of fabricating the TFT array substrate used for the LCD device according to the first embodiment of the invention, which is subsequent to the step of FIG. 17.

Next, an ITO film is formed on the passivation film 22 thus formed and patterned by the photolithography and etching method, thereby forming the transmission electrodes 14, as shown in FIG. 18. At this time, the transmission electrodes 14 are contacted with the corresponding source electrodes 13s by way of the corresponding contact holes 22a of the passivation film 22. In this way, the transmission electrodes 14 are electrically connected to the corresponding source electrodes 13s. At this time, in the pixel region P, the end of the transmission electrode 14 is apart from the scanning line 11 adjacent to the said pixel region P (which is located on the opposite side to the TFT 125 (on the upper side in FIG. 18)) and from the two semiconductor films 12a adjacent to the said pixel region P at the distances B, respectively. This means that the transmission electrode 14 in the said pixel region P does not overlap with the said scanning line 11 and the said semiconductor films 12a. This point is different from the prior-art semi-transmissive type LCD device shown in FIG. 5.

Moreover, the end of the said transmission electrode 14 is apart from the signal line 13 corresponding to the said pixel region P (which is located on the right side in FIG. 18) and the signal line 13 adjacent to the said pixel region P (which is located on the left side in FIG. 18) at the distances B, respectively. This means that the said transmission electrode 14 in the said pixel region P does not overlap with the said two signal lines 13. This point is the same as the prior-art semi-transmissive type LCD device shown in FIG. 5.

Figure 19:
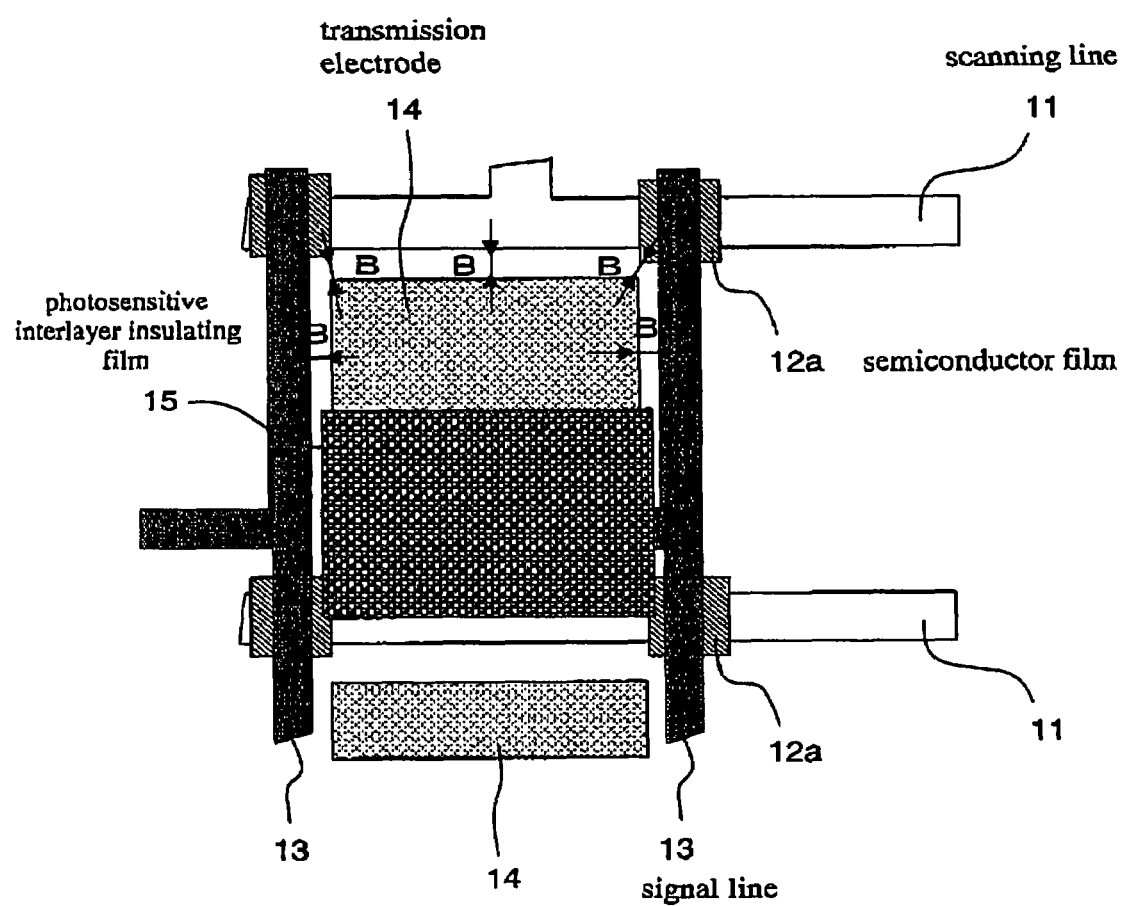
FIG. 19 is a partial plan view showing the method of fabricating the TFT array substrate used for the LCD device according to the first embodiment of the invention, which is subsequent to the step of FIG. 18.

Next, a photosensitive organic resin film (e.g., a photosensitive acrylic resin film) is formed on the passivation film 22 over the whole surface of the glass plate 10 and then, it is selectively exposed to light and developed, thereby forming photosensitive interlayer insulating films 15 each having protrusions and depressions on its surface, as shown in FIG. 19. In the said pixel region P, the photosensitive interlayer insulating film 15 has an approximately rectangular planar pattern and covers the whole TFT 25 and the adjacent part of the transmission electrode 14 to the TFT 25. Furthermore, the photosensitive interlayer insulating film 15 covers partially the scanning line 11 (which is located on the lower side of FIG. 19) corresponding to the said pixel region P as well.

Figure 20:
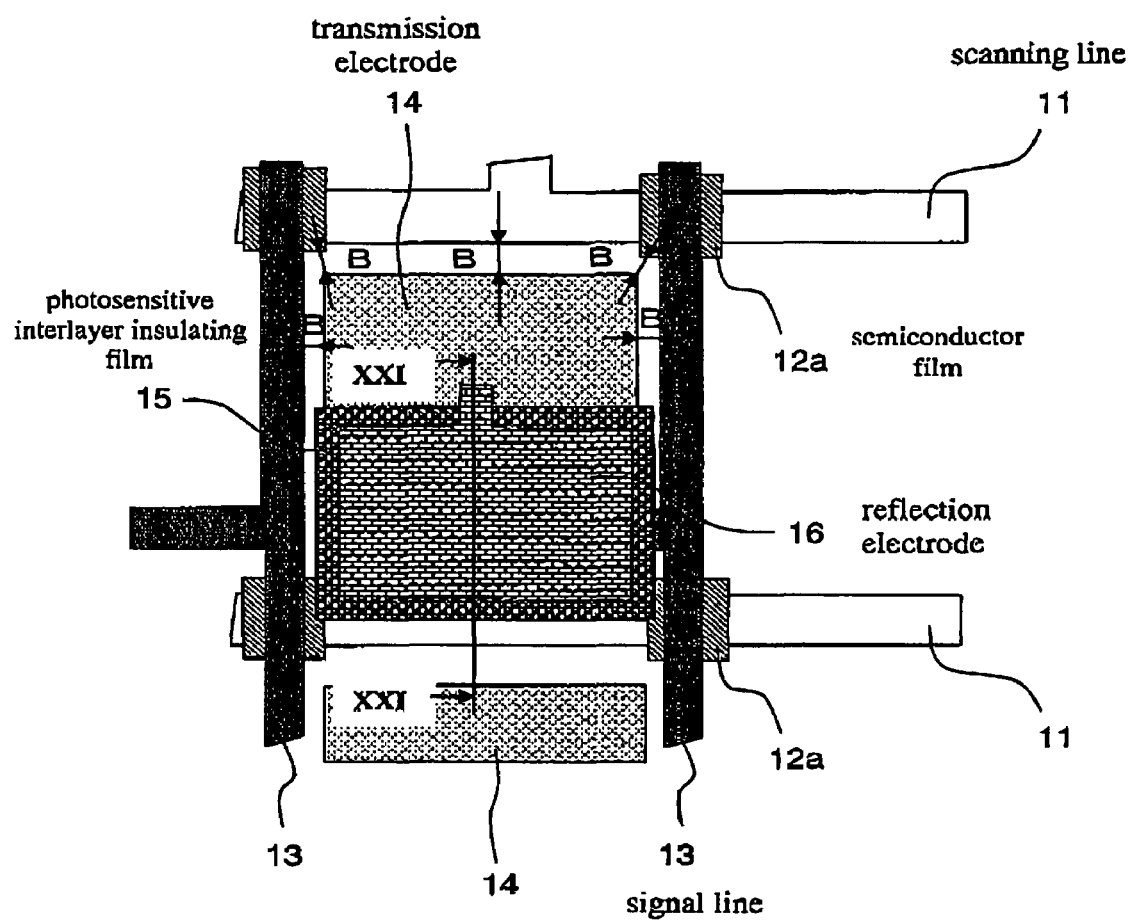
FIG. 20 is a partial plan view showing the method of fabricating the TFT array substrate used for the LCD device according to the first embodiment of the invention, which is subsequent to the step of FIG. 19.
Figure 21:
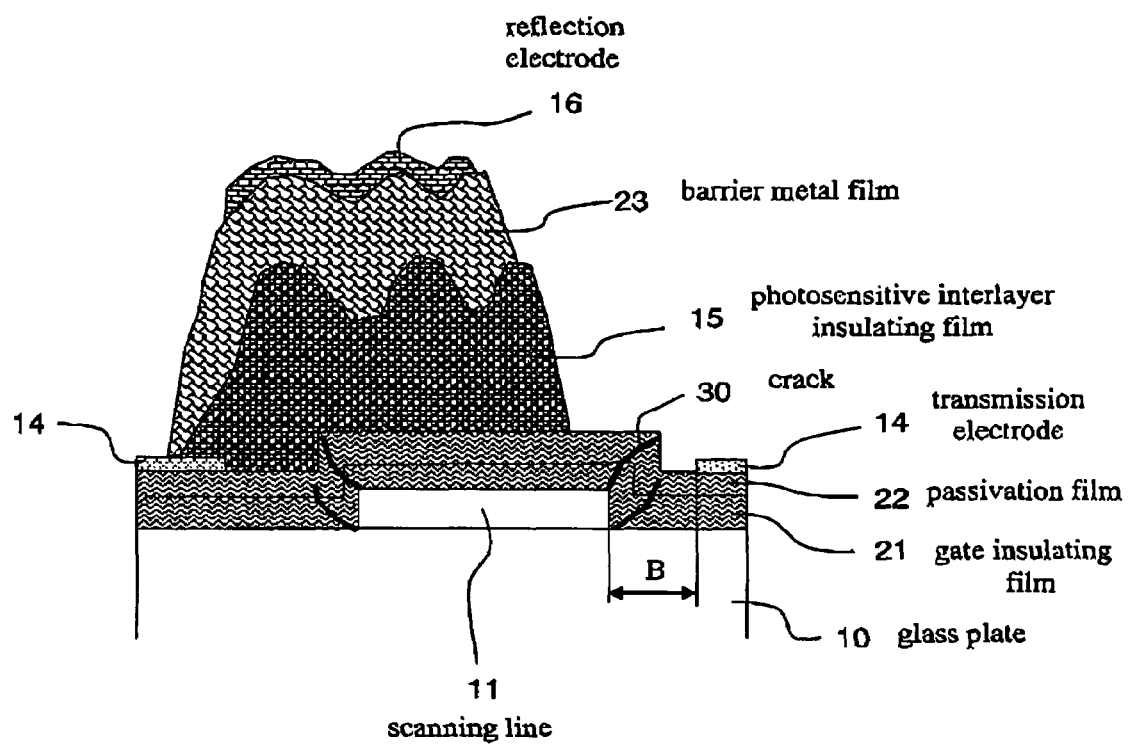
FIG. 21 is a partial cross-sectional view along the line XXI-XXI in FIG. 20, which shows the method of fabricating the TFT array substrate used for the LCD device according to the first embodiment of the invention.

Following this, a metal film (for example, which is made of Mo or Mo alloy) for the barrier metal films 23 is formed on the passivation film 22 over the whole surface of the glass plate 10. On the metal film thus formed, another metal film (for example, which is made of Al or Al alloy) for the reflection electrodes 16 is formed over the whole surface of the glass plate 10. Then, after a photoresist film with a predetermined pattern is formed on the metal film for the reflection electrodes 16, these two metal films are successively patterned with the photoresist film as a mask, thereby forming selectively the barrier metal films 23 and the reflection electrodes 16, as shown in FIGS. 20 and 21.

The barrier metal films 23 and the reflection electrodes 16 have planar patterns which are approximately the same as that of the photosensitive interlayer insulating films 15 and which are slightly smaller in size than the same films 15, respectively. In the said pixel region P, the end of the barrier metal film 23, which is close to the transmission electrode 14, is in contact with the transmission electrode 14. Due to this contact, the barrier metal film 23 and the transmission electrode 14 are electrically interconnected. Moreover, the reflection electrode 16, which is formed on the barrier metal film 23, is in contact with the barrier metal film 23. Thus, the reflection electrode 16 is electrically connected to the transmission electrode 14 by way of the barrier metal film 23.

Since protrusions and depressions are formed on the surface of the photosensitive interlayer insulating film 15, as shown in FIG. 13, each of the reflection electrodes 16 has protrusions and depressions in accordance with the protrusions and depressions of the film 15. The protrusions and depressions of the reflection electrode 16 are provided to enhance the reflection effect to the incident light.

In the above-described manner, the TFT array substrate used for the semi-transmissive type LCD device according to the first embodiment is completed. The TFT array substrate thus fabricated is joined to an opposite substrate (not shown) and then, a liquid crystal layer is placed in the gap between these two substrates and sealed, resulting in a liquid-crystal panel (which may be termed the "LCD panel"). Furthermore, a backlight unit is built in the panel. In this way, the semi-transmissive type LCD device according to the first embodiment is fabricated.

With the semi-transmissive type LCD device according to the first embodiment, a signal voltage is applied across the pixel electrode (i.e., the transmission electrode 14 and the reflection electrode 16) and the opposite electrode to change the alignment direction of the liquid crystal molecules in the liquid crystal layer, thereby displaying desired images. In the transmission mode, images are displayed by causing the light emitted from the backlight unit to pass through the liquid crystal layer by way of the transmission electrodes 14. In the reflection mode, images are displayed by causing the ambient light reflected by the reflection electrodes 16 to pass through the liquid crystal layer. Therefore, the distances of the light propagating through the liquid crystal layer (i.e., the optical path lengths) in the transmission and reflection modes are different. However, with this LCD device, a level difference (which is equal to a height difference from the glass plate 10) is formed between the transmission electrode 14 and the reflection electrode 16. Therefore, the optical path lengths in these two modes can be equalized by the level difference.

Figure 22:
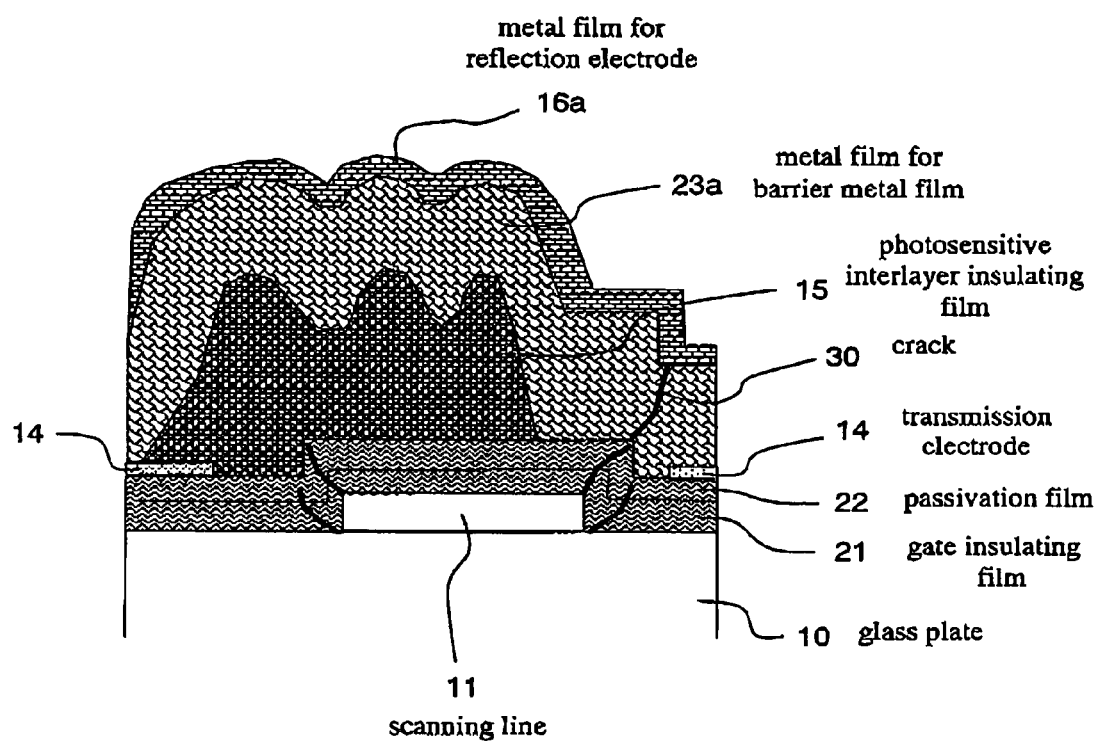
FIG. 22 is a partial cross-sectional view along the line XXI-XXI in FIG. 20, which shows the steps of forming the barrier metal film and the reflection electrode in the method of fabricating the TFT array substrate used for the LCD device according to the first embodiment of the invention.
Figure 23:
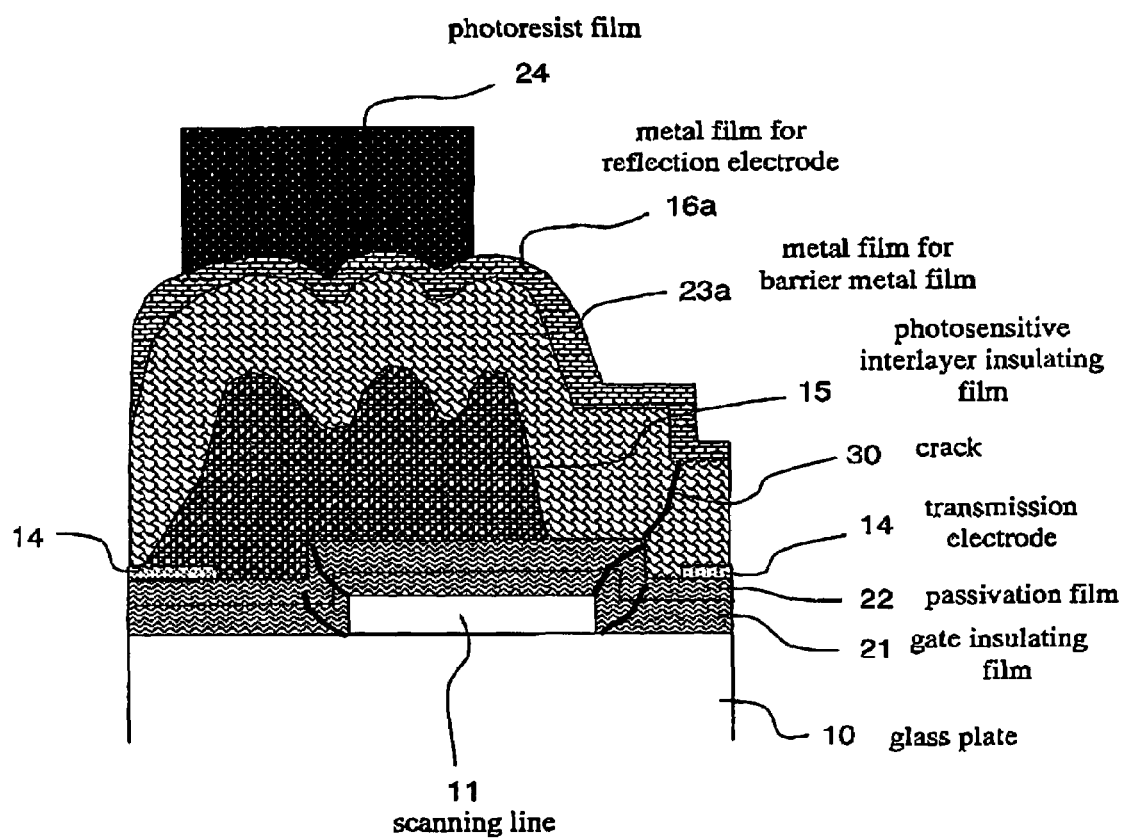
FIG. 23 is a partial cross-sectional view along the line XXI-XXI in FIG. 20, which shows the steps of forming the barrier metal film and the reflection electrode in the method of fabricating the TFT array substrate used for the LCD device according to the first embodiment of the invention, which is subsequent to the step of FIG. 22.

On the other hand, the processes of forming the barrier metal films 23 and the reflection electrodes 16 are carried out in such a way as shown in FIGS. 22 and 23. In these processes, it is usual that the thickness of the barrier metal films 23 is set at a considerably large value, such as approximately 0.2 μm to 0.4 μm. This is to make the distance between the reflection electrodes 16 formed by an Al or Al alloy film and the corresponding transmission electrodes 14 formed by an ITO film as much as possible, thereby lowering the possibility of the cell reaction. For this reason, when a metal film 23a (e.g., a Mo or Mo alloy film) for the barrier metal films 23 and a metal film 16a for the reflection electrodes 16 (e.g., an Al or Al alloy film) are successively formed on the passivation film 22, cracks 30 are likely to occur in the metal film 23a in the vicinities of the scanning lines 11 (in other words, in the vicinities of the steps or level differences formed on the glass plate 10 due to the scanning lines 11), as shown in FIG. 22. The cracks 30 may occur not only in the metal film 23a but also in the overlying metal film 16a and the underlying transmission electrodes 14, the passivation film 22, and the gate insulating film 21.

Subsequently, when the metal films 23a and 16a are patterned to form the barrier metal films 23 and the reflective electrodes 16, a photoresist film 24 is formed on the metal film 16a and is selectively exposed to light using an appropriate mask, as shown in FIG. 23. Thereafter, the photoresist film 24 thus exposed is dipped in a developer solution with high alkalinity or is contacted with the said developer solution by falling it like a shower over the photoresist film 24, thereby selectively removing the exposed portions of the film 24. In this way, the state as shown in FIG. 23 is obtained. At this time, although the meal film 16a made of Al or Al alloy is in contact with the developer solution, the transmission electrodes 14 made of ITO ought not to be in contact with the said developer solution. In fact, however, with the prior-art semi-transmissive type LCD device, the said developer solution reaches the transmission electrodes 14 through the cracks 30.

However, with the semi-transmissive type LCD device according to the first embodiment of the invention, the end of the transmission electrode 14 is apart from the corresponding scanning and signal lines 11 and 13 at the distances B. Therefore, even if the developer solution reaches the passivation film 22 through the cracks 30, it does not contact the transmission electrode 14 because the transmission electrode 14 does not exist there. This means that there is no possibility that a cell circuit is formed by the developer solution, the metal film 16a, and the transmission electrode 14. As a result, the reduction and corrosion of the transmission electrodes 14 is prevented and thus, failed pixels termed the "point defects" do not arise.

FIGS. 24A and 24B show the measuring method of the distance B between the transmission electrode 14 and the corresponding scanning line 11 (or the signal line 13) adjacent and opposite thereto. In the case where the transmission electrode 14 is not overlapped with the said scanning line 11 (or the said signal line 13), it is defined that the distance B has a positive (+) value. On the other hand, in the case where the transmission electrode 14 is overlapped with the said scanning line 11 (or the said signal line 13), it is defined that the distance B has a negative (−) value. According to the inventors' research, it was found that the reduction reaction of the transmission electrode 14 was observed when the distance B was in the range of −2 μm to +1 μm, and that the reduction reaction of the transmission electrode 14 was not observed when the distance B was set at +2 μm and +3 μm, as shown in FIG. 24C. Thus, it was found that the reduction reaction of the transmission electrode 14 was avoided when the distance B was +2 μm or greater.

As explained above, with the TFT array substrate used for the semi-transmissive type LCD device according to the first embodiment of the invention, the end of the transmission electrode 14 is apart from the corresponding scanning and signal lines 11 and 13 at the distances B (which is equal to +2 μm or greater) in the pixel region P. Therefore, even if the developer solution reaches the passivation film 22 through the cracks 30, it does not contact the transmission electrode 14 there. This means that there is no possibility that a cell circuit is formed by the developer solution, the metal film 16a (the reflection electrode 16), and the transmission electrode 14. As a result, the reduction and corrosion of the transmission electrode 14 is surely prevented and thus, the formation of failed pixels termed the "point defects" is surely prevented.

In addition, although the transmission electrodes 14 are made of ITO in the first embodiment of the invention, the invention is not limited to this. The invention is applicable to the cases where any other transparent conductive material that induces a cell reaction than ITO, such as IZO (Indium Zinc Oxide), is used for forming the transmission electrodes 14. This is applicable to other embodiments and variations of the invention explained below.

Second Embodiment

Figure 27:
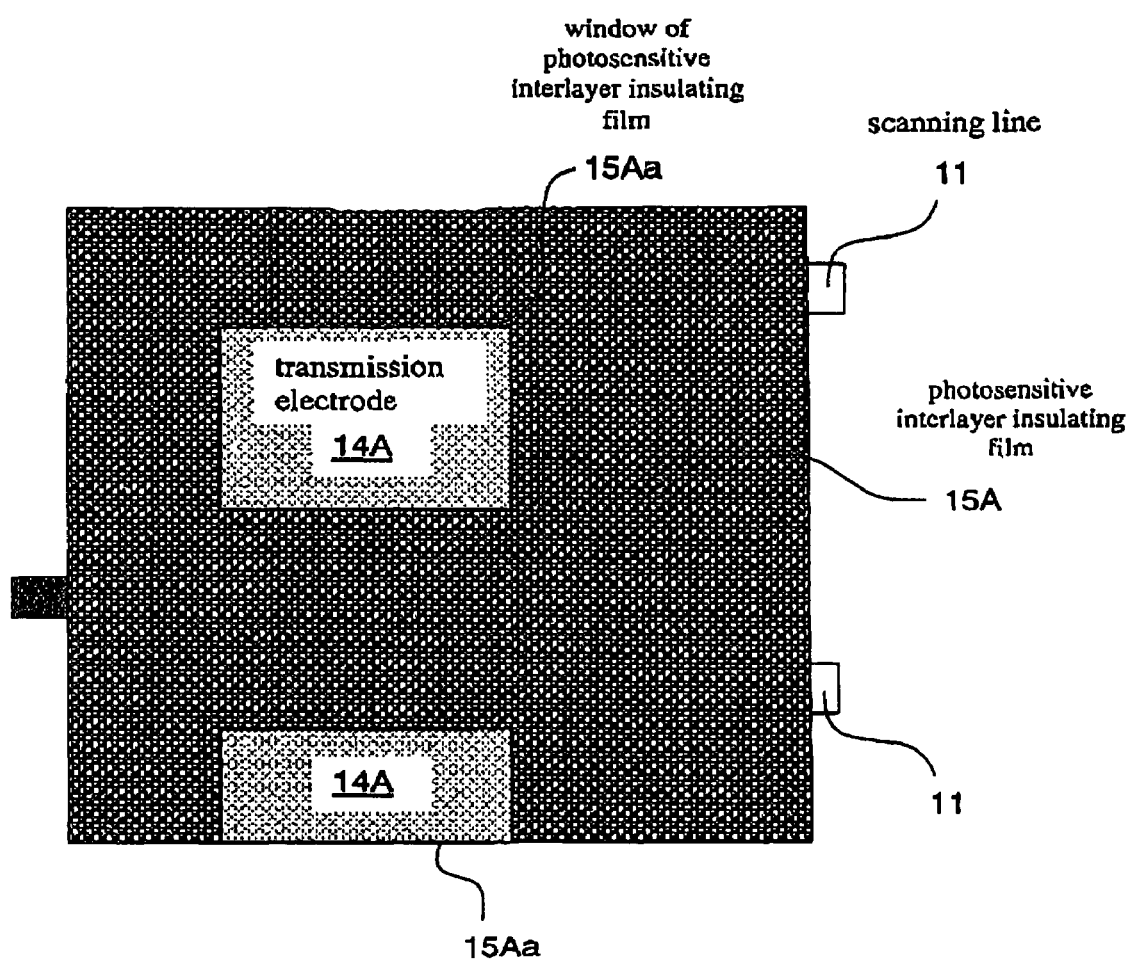
FIG. 27 is a partial plan view showing the method of fabricating the TFT array substrate used for the LCD device according to the second embodiment of the invention, which is subsequent to the step of FIG. 26.
Figure 28:
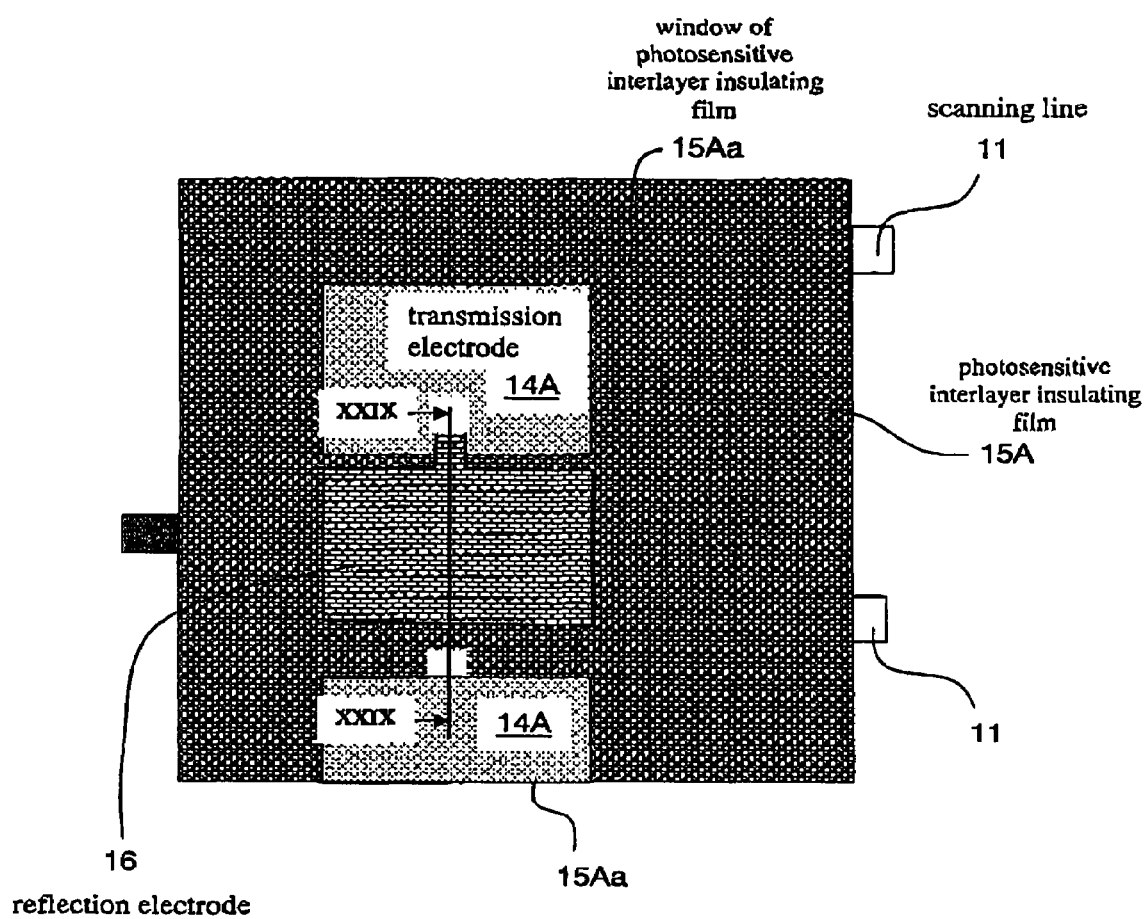
FIG. 28 is a partial plan view showing the method of fabricating the TFT array substrate used for the LCD device according to the second embodiment of the invention, which is subsequent to the step of FIG. 27.
Figure 29:
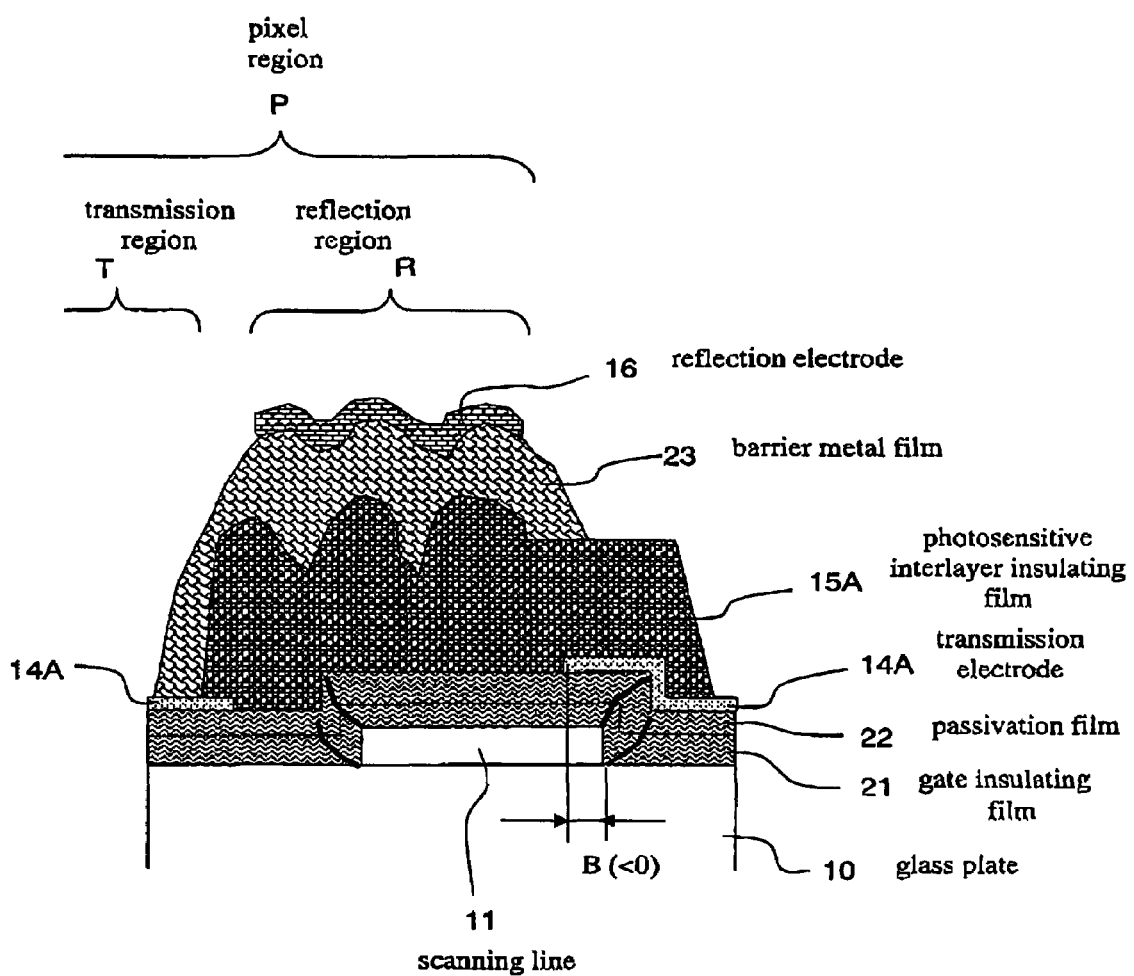
FIG. 29 is a partial cross-sectional view along the line XXIX-XXIX in FIG. 28.

FIGS. 25 to 28 are partial plan views showing a method of fabricating the TFT array substrate used for a semi-transmissive type LCD device according to a second embodiment of the invention, respectively. FIG. 29 is a partial cross-sectional view along the line XXIX-XXIX in FIG. 28. These figures show the pixel structure of one of the pixel regions P arranged in a matrix array.

With the semi-transmissive type LCD device according to the first embodiment of the invention, as explained above, the end of the transmission electrode 14 is apart from the corresponding scanning and signal lines 11 and 13 at the distances B (which is equal to +2 μm or greater). However, there are cases where the distances B between the end of the transmission electrode 14 and the corresponding scanning and signal lines 11 and 13 must be less than +2 μm and where the end of the transmission electrode 14 must be overlapped with the corresponding scanning and signal lines 11 and 13. The semi-transmissive type LCD device according to the second embodiment of the invention can be advantageously applied to these cases.

Figure 25:
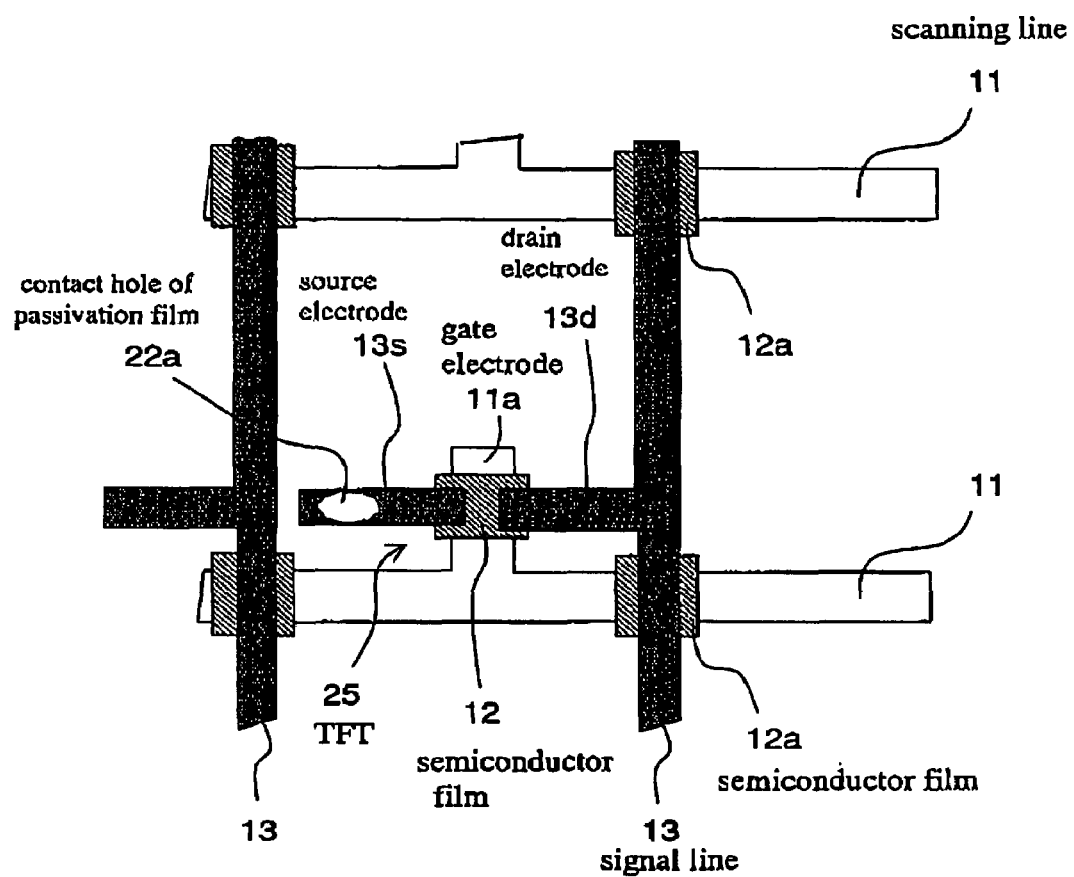
FIG. 25 is a partial plan view showing a method of fabricating the TFT array substrate used for a semi-transmissive type LCD device according to a second embodiment of the invention.

First, in the same way as the fabrication method of the first embodiment, the gate electrodes 11a and the scanning lines 11, which are united with each other, are formed on the glass plate 10. Then, the gate insulating film 21 is formed over the whole surface of the glass plate 10, thereby covering the gate electrodes 11a and the scanning lines 11. Thereafter, the island-shaped semiconductor films 12 and 12a are formed on the gate insulating film 21. On the island-shaped semiconductor films 12 and 12a thus formed, the source electrodes 13s and the drain electrodes 13d, and the signal lines 13 united with the corresponding drain electrodes 13d are formed. Then, the passivation film 22 is formed on the gate insulating film 21 over the whole surface of the glass plate 10, thereby covering the TFTs 25 and the signal lines 13. The contact holes 22a are formed in the passivation film 22 at the positions overlaid with the source electrodes 13s. The state at this stage is shown in FIG. 25 (which is the same as FIG. 17).

Figure 26:
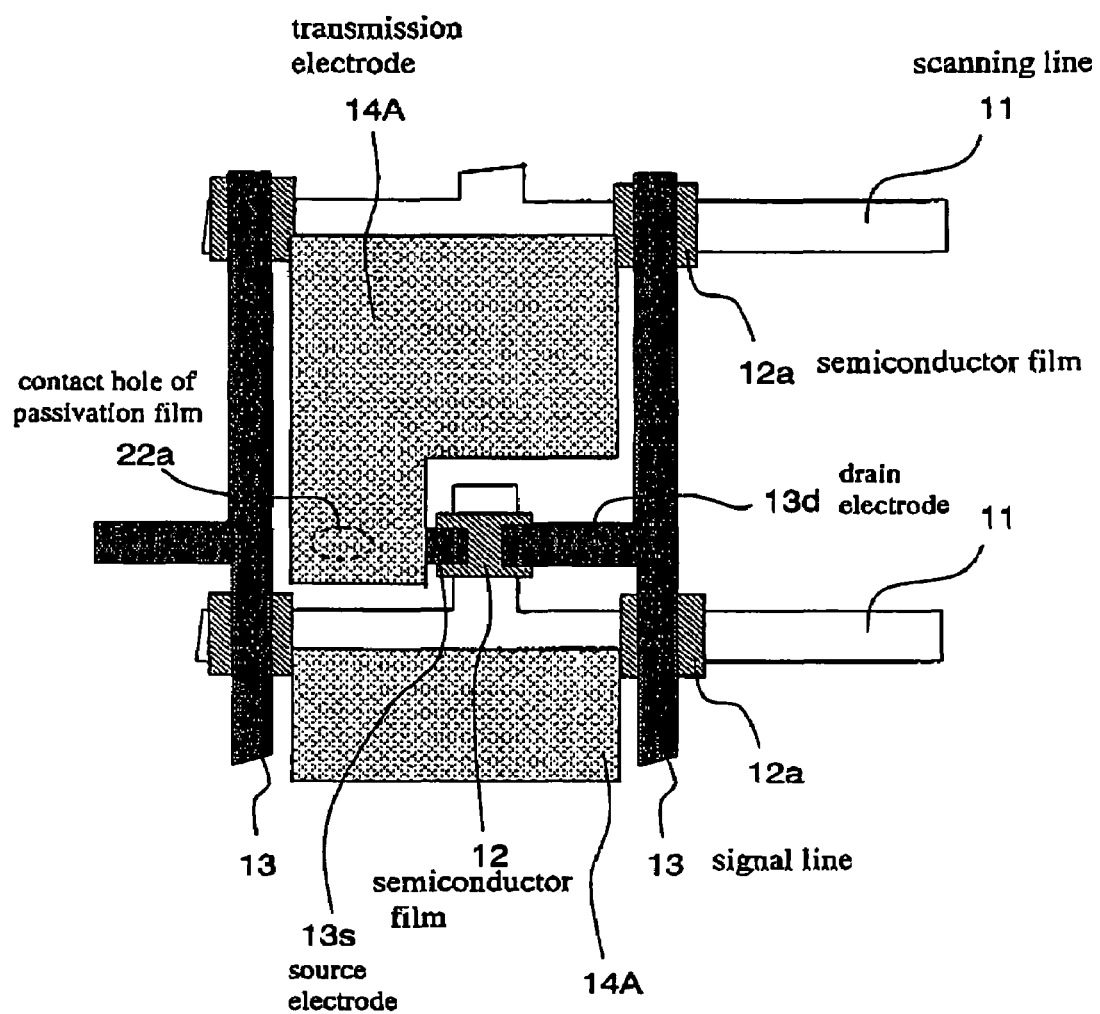
FIG. 26 is a partial plan view showing the method of fabricating the TFT array substrate used for the LCD device according to the second embodiment of the invention, which is subsequent to the step of FIG. 25.

Next, an ITO film is formed on the passivation film 22 and patterned by the photolithography and etching method, thereby forming the transmission electrodes 14A, as shown in FIG. 26. The transmission electrodes 14A are contacted with the corresponding source electrodes 13s by way of the corresponding contact holes 22a, thereby electrically connecting the transmission electrodes 14A to the corresponding source electrodes 13s. At this time, in the pixel region P, the end of the transmission electrode 14A is partially overlapped with the scanning line 11 adjacent to the said pixel region P (which is opposite to the TFT 25) (which is located on the upper side of FIG. 26). This structure is the same as that of the prior-art LCD structure shown in FIG. 5.

The end of the transmission electrode 14A is apart from the corresponding signal line 13 (which is located on the right side of FIG. 26) and the adjoining signal line 13 (which is located on the left side of FIG. 26) thereto. The transmission electrode 14A does not overlap with these two signal lines 13. The distances of the transmission electrode 14A from the signal lines 13 are the same as those of the prior-art LCD device shown in FIG. 5.

Subsequently, a photosensitive organic resin film is formed on the passivation film 22 over the whole surface of the glass plate 10 and it is selectively exposed to light and developed, thereby forming a patterned photosensitive interlayer insulating film 15A having protrusions and depressions on its surface, as shown in FIG. 27. Unlike the island-shaped photosensitive interlayer insulating films 15 of the LCD device of the first embodiment, the photosensitive interlayer insulating film 15A covers the whole surface of the glass plate 10 (which includes the scanning lines 11, semiconductor films 12a, signal lines 13, and TFTs 25) except for approximately rectangular windows 15Aa. The transmission electrodes 15A are exposed from the respective windows 15Aa in the respective pixels P, thereby defining the transmittance regions T.

It may be said that the photosensitive interlayer insulating film 15A in the second embodiment corresponds to the combination of the island-shaped parts of the film 15A prepared for the respective pixel regions P, where each of the parts has the window 15Aa. In other words, the island-shaped photosensitive interlayer insulating films formed for the respective pixel regions P, each of which has the window 15Aa, are united with each other in such a way as to cover the whole plate 10 except for the window 15Aa, resulting in the photosensitive interlayer insulating film 15A.

The subsequent processes are the same as those of the first embodiment. Specifically, a metal film 23a (for example, which is made of Mo or Mo alloy) for the barrier metal films 23 is formed on the passivation film 22 over the whole surface of the glass plate 10. On the metal film 23a thus formed, another metal film 16a (for example, which is made of Al or Al alloy) for the reflection electrodes 16 is formed over the whole surface of the glass plate 10. Thereafter, a photoresist film 24 with a predetermined pattern is formed on the metal film 16a and these metal films 23a and 16a are selectively etched with the photoresist film 24 as a mask, thereby forming selectively the barrier metal films 23 and the reflection electrodes 16, as shown in FIGS. 28 and 29.

In the first embodiment, the barrier metal films 23 and the reflection electrodes 16 are approximately rectangular, and the island-shaped photosensitive interlayer insulating films 15 are approximately rectangular as well. On the other hand, in the second embodiment, the barrier metal films 23 and the reflection electrodes 16 are quite different in shape from the photosensitive interlayer insulating film 15A. However, the other structure of the LCD device of the second embodiment is the same as that of the first embodiment.

Specifically, in the said pixel region P, the end of the barrier metal film 23, which is near to the transmission electrode 14A, is in contact with the transmission electrode 14A. Due to this contact, the barrier metal film 23 and the corresponding transmission electrode 14A are electrically interconnected. Moreover, the reflection electrode 16, which is formed on the barrier metal film 23, is in contact with the barrier metal film 23. Thus, the reflection electrode 16 is electrically connected to the corresponding transmission electrode 14A by way of the barrier metal film 23. Since protrusions and depressions are formed on the surface of the photosensitive interlayer insulating film 15A, each of the barrier metal films 23 and each of the reflection electrodes 16 have similar protrusions and depressions for enhancing the reflection effect to the incident light in accordance with the protrusions and depressions of the film 15A.

In the above-described manner, the TFT array substrate used for the semi-transmissive type LCD device according to the second embodiment is completed. The TFT array substrate thus fabricated is joined to an opposite substrate (not shown) and then, a liquid crystal layer is placed in the gap between these two substrates and sealed, resulting in a liquid-crystal panel. Furthermore, a backlight unit is built in the panel. In this way, the semi-transmissive type LCD device according to the second embodiment is fabricated.

With the semi-transmissive type LCD device according to the second embodiment, unlike the LCD device according to the first embodiment, the photosensitive interlayer insulating film 15A covers the whole surface of the glass plate 10 except for the approximately rectangular windows 15Aa, where the transmission electrode 14A is exposed from the corresponding window 15Aa to define the transmission region T. In other words, the film 15A covers not only the reflection regions R but also the parts of the transmission electrodes 14A that are close to the scanning lines 11. In this case, the thick photosensitive interlayer insulating film 15A (which is usually 1 μm to 3 μm in thickness) is present below the barrier metal films 23 (see FIG. 29). Therefore, the developer solution penetrated through the cracks 30 of the barrier metal film 23 toward the transmission electrode 14A is surely blocked by the film 15A. Accordingly, even if the transmission electrode 14A is present on or near the steps of the glass plate 10 (the steps are formed on the surface of the plate 10 by the scanning lines 11), there is no danger that a cell reaction occurs by way of the developer solution.

In this way, with the semi-transmissive type LCD device according to the second embodiment, even in the case that the end of the transmission electrode 14 cannot be separated from the steps formed by the corresponding scanning and signal lines 11 and 13 at a distance of +2 μm or greater (in other words, the value of the distance B is negative, as shown in FIG. 29), there is no possibility that a cell circuit is formed by the reflection and transmission electrodes 16 and 14A and the developer solution. As a result, the reduction and corrosion of the transmission electrodes 14A is surely prevented and thus, the formation of failed pixels termed the "point defects" is surely prevented.

In addition, the photosensitive interlayer insulating film 15A used in the said second embodiment may be applied to the case where the end of the transmission electrode 14 can be separated from the steps due to the corresponding scanning and signal lines 11 and 13 at distances of +2 μm or greater.

Third Embodiment

Figure 30:
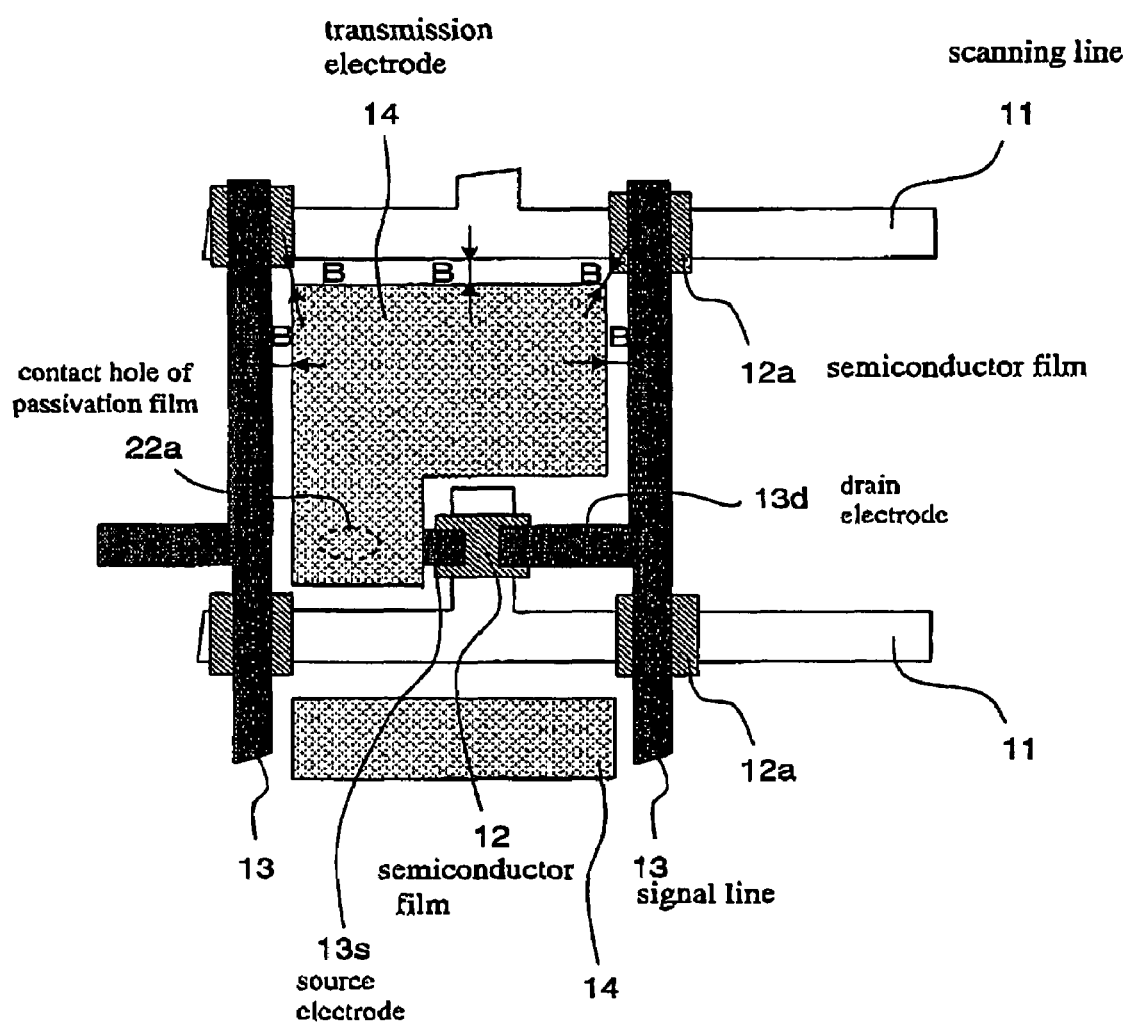
FIG. 30 is a partial plan view showing a method of fabricating the TFT array substrate used for a semi-transmissive type LCD device according to a third first embodiment of the invention.
Figure 31:
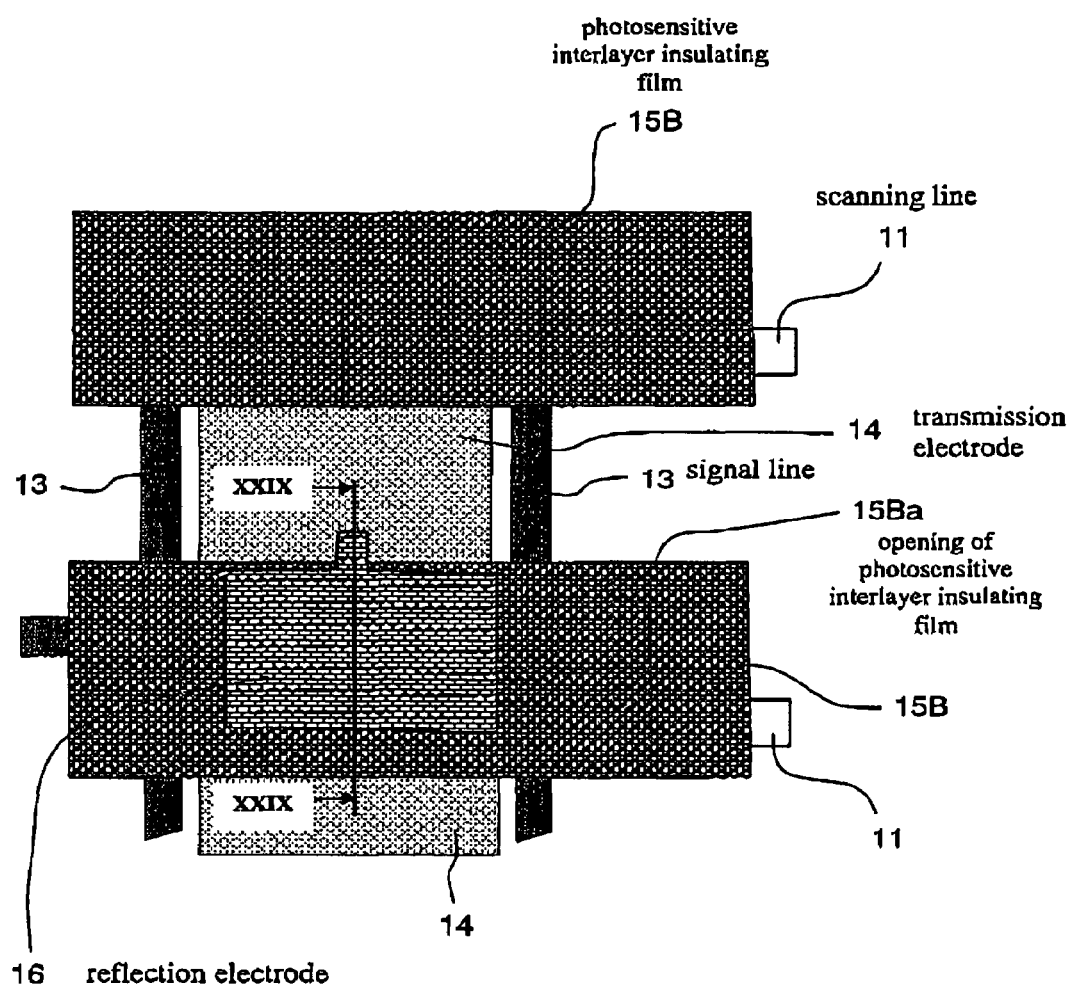
FIG. 31 is a partial plan view showing a method of fabricating the TFT array substrate used for the LCD device according to the third first embodiment of the invention, which is subsequent to the step of FIG. 30.

FIGS. 30 and 31 are partial plan views showing a method of fabricating the TFT array substrate used for a semi-transmissive type LCD device according to a third embodiment of the invention, respectively. These figures show the pixel structure of one of the pixel regions P arranged in a matrix array.

The third embodiment corresponds to a variation example of the second embodiment; however, it may be said that the third embodiment corresponds to a variation example of the first embodiment.

First, in the same way as the fabrication method of the first embodiment, the structure of FIG. 30 (which is the same as FIG. 18) is obtained. Subsequently, a photosensitive organic resin film is formed on the passivation film 22 over the whole surface of the glass plate 10 and is selectively exposed to light and developed, thereby forming a photosensitive interlayer insulating film 15B having protrusions and depressions on its surface, as shown in FIG. 31.

Unlike the photosensitive interlayer insulating film 15A in the second embodiment, the photosensitive interlayer insulating film 15B has belt-shaped openings or windows 15Ba extending along the horizontal direction of FIG. 31 (i.e., along the scanning lines 11). The openings 15Ba are formed to expose the corresponding transmission electrodes 14. The openings 15Ba have the same width as that of the approximately rectangular windows 15Aa of the photosensitive interlayer insulating film 15A. Thus, not only the transmission electrodes 14 but also the signal lines 13 are partially exposed from the film 15B.

Subsequently, in the same way as the first embodiment, the barrier metal films 23 and the reflection electrodes 16 are formed on the photosensitive interlayer insulating film 15B. The state at this stage is shown in FIG. 31. The cross section along the line XXIX-XXIX in FIG. 31 is the same as that of FIG. 29, except that the transmission electrodes 14 are apart from the corresponding scanning lines 11, as shown in FIG. 21. Therefore, the cross-sectional view in FIG. 31 is omitted here.

In the third embodiment also, the barrier metal films 23 and the reflection electrodes 16 are quite different in shape from the photosensitive interlayer insulating film 15B. However, the other structure of the LCD device of the third embodiment is the same as that of the first embodiment.

Specifically, in the pixel region P, the end of the barrier metal film 23, which is close to the transmission electrode 14, is in contact with the transmission electrode 14. Due to this contact, the barrier metal film 23 and the corresponding transmission electrode 14 are electrically interconnected. Moreover, the reflection electrode 16, which is formed on the barrier metal film 23, is in contact with the barrier metal film 23. Thus, the reflection electrode 16 is electrically connected to the corresponding transmission electrode 14 by way of the barrier metal film 23. Since protrusions and depressions are formed on the surface of the photosensitive interlayer insulating film 15B, each of the barrier metal films 23 and each of the reflection electrodes 16 have similar protrusions and depressions for enhancing the reflection effect to the incident light in accordance with the protrusions and depressions of the film 15B.

In the above-described manner, the TFT array substrate used for the semi-transmissive type LCD device according to the third embodiment is completed. The following steps are the same as those of the first embodiment. In this way, the semi-transmissive type LCD device according to the third embodiment is fabricated.

With the semi-transmissive type LCD device according to the third embodiment, as explained above, the end of the transmission electrode 14 is apart from the two scanning lines 11 and the two signal lines 13 that define the pixel region P and that extend along the edges of the transmission electrode 14. Specifically, the end of the transmission electrode 14 is apart from the scanning line 11 that extends along the horizontal edge of the transmission electrode 14 and that is located above in FIG. 30 at the distance B (=2 μm or greater)

Moreover, the vicinities of the scanning lines 11 (where the degradation and/or disappearance of the transmission electrode 14 is/are likely to occur) are covered with the photosensitive interlayer insulating film 15B. Accordingly, there is an additional advantage that a cell reaction is more difficult to occur than the first embodiment.

In addition, as seen from the photosensitive interlayer insulating film 15B used in the third embodiment, it is unnecessary that the plan shape (pattern) of the photosensitive interlayer insulating film 15B is island-shaped similar to the photosensitive interlayer insulating films 15 of the first embodiment. The plan shape or pattern of the photosensitive interlayer insulating film 15B may be changed to any one other than the island-like shape according to the necessity.

Fourth Embodiment

Figure 32:
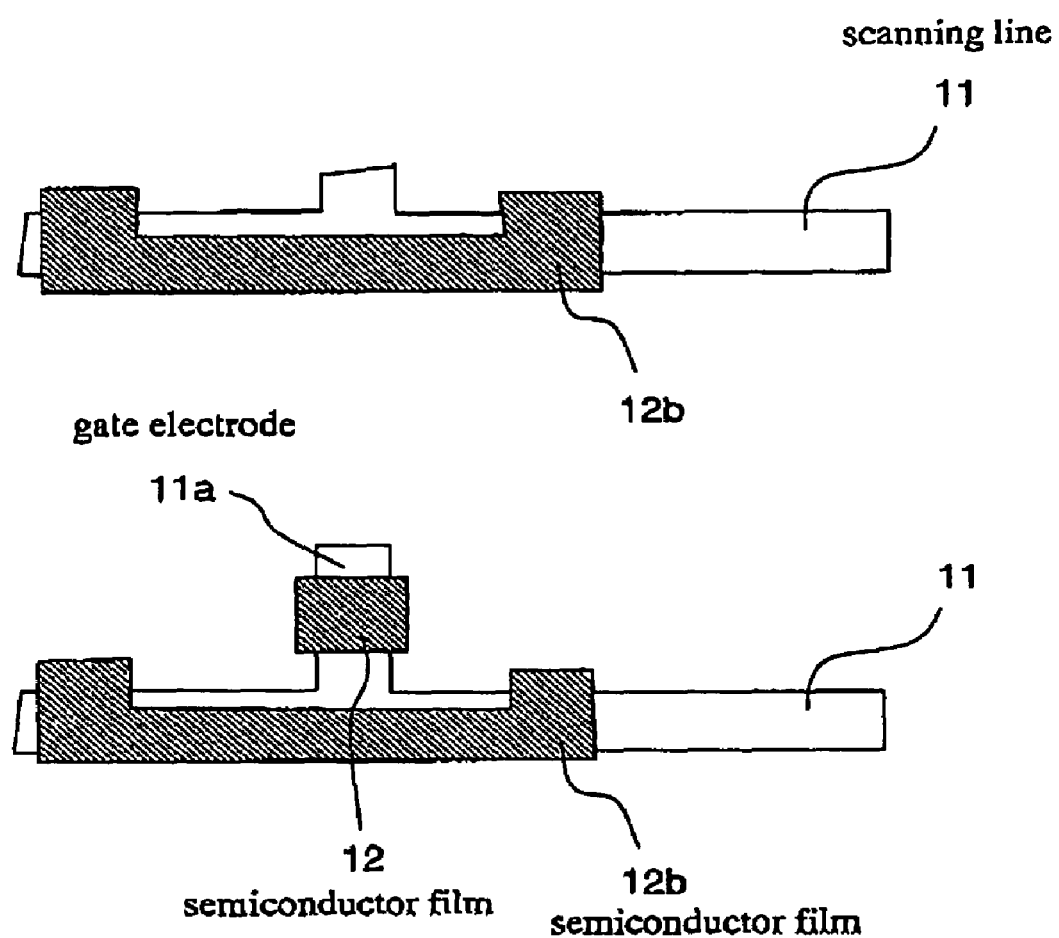
FIG. 32 is a partial plan view showing a method of fabricating the TFT array substrate used for a semi-transmissive type LCD device according to a fourth first embodiment of the invention.
Figure 33:
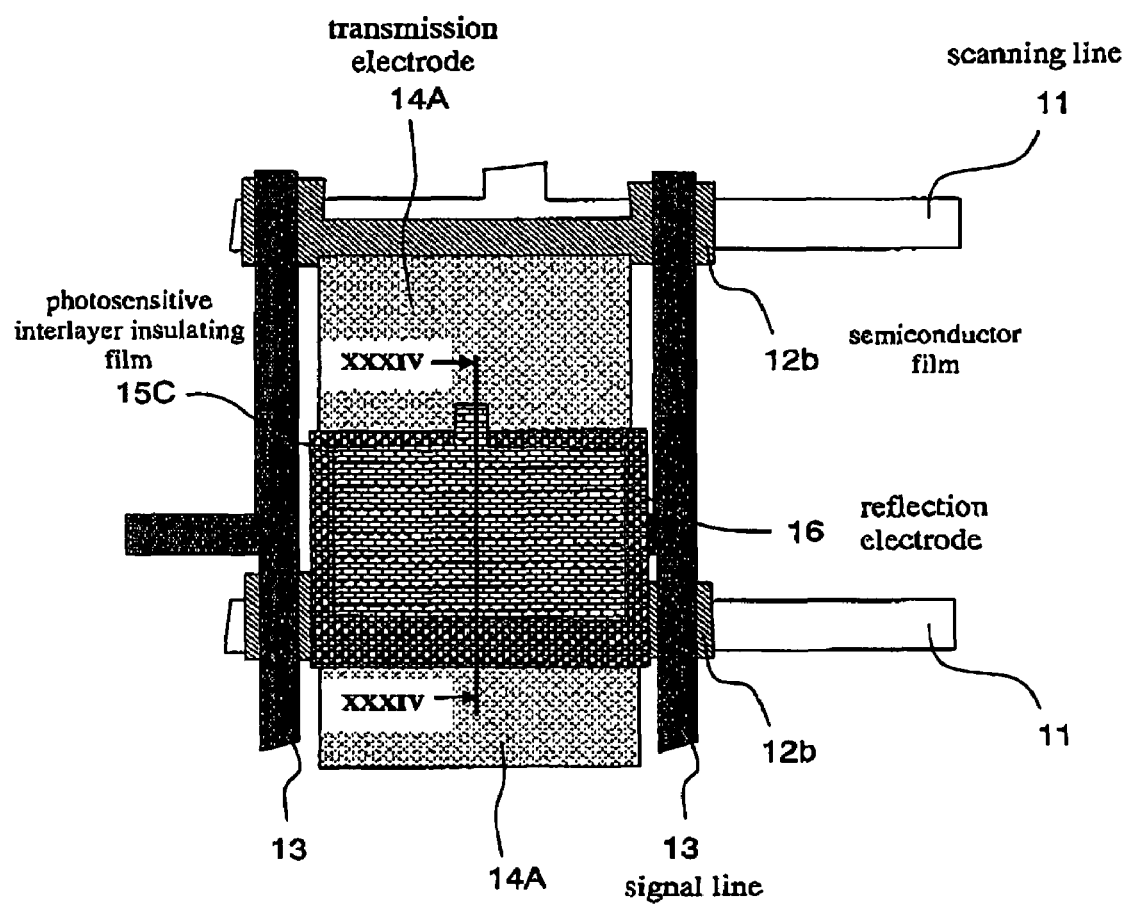
FIG. 33 is a partial plan view showing a method of fabricating the TFT array substrate used for the LCD device according to the fourth first embodiment of the invention, which is subsequent to the step of FIG. 32.
Figure 34:
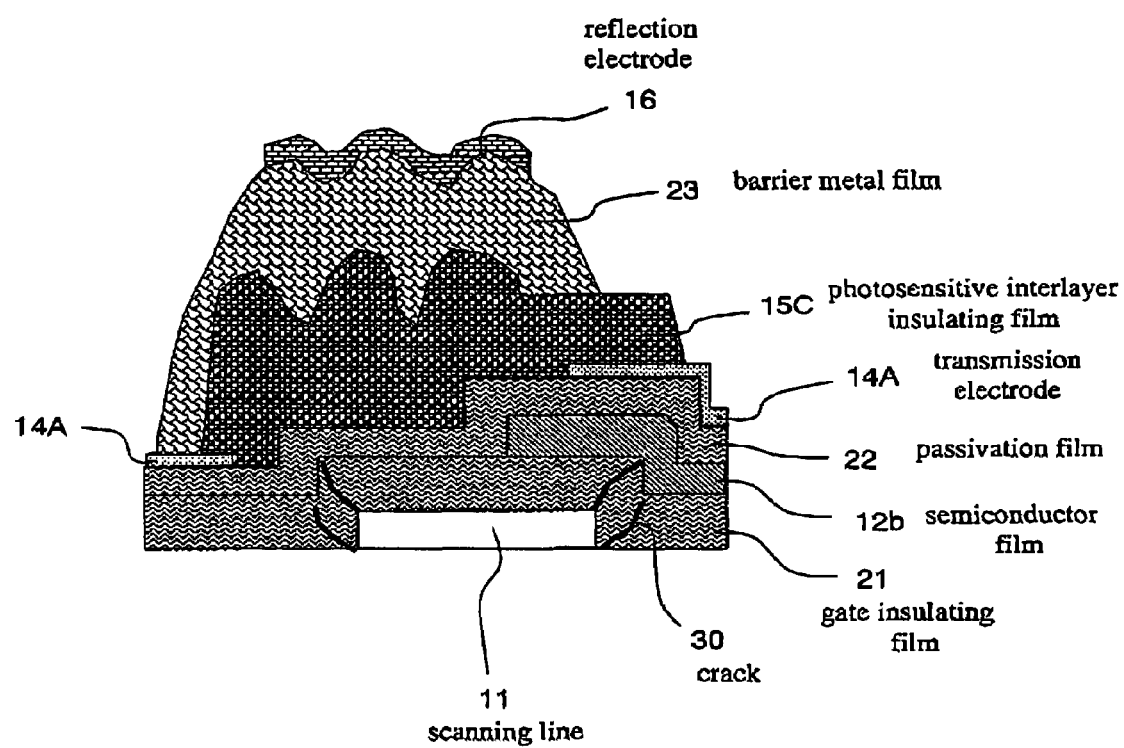
FIG. 34 is a partial cross-sectional view along the line XXXIV-XXXIV in FIG. 33.

FIGS. 32 and 33 are partial plan views showing a method of fabricating the TFT array substrate used for a semi-transmissive type LCD device according to a fourth embodiment of the invention, respectively. FIG. 34 is a partial cross-sectional view along the line XXXIV-XXXIV in FIG. 33. These figures show the pixel structure of one of the pixel regions P arranged in a matrix array.

The structure of the semi-transmissive type LCD device according to the fourth embodiment is the same as that of the first embodiment except that the vicinities of the scanning lines 11 (where the cracks 30 are likely to occur) are covered with corresponding island-shaped semiconductor films 12b. The semiconductor films 12b are formed by utilizing the island-shaped semiconductor films 12a arranged at the intersections of the scanning lines 11 and the signal lines 13 in the first embodiment. Thus, the different points from the first embodiment will be chiefly explained here.

First, in the same way as the fabrication method of the first embodiment, the gate electrodes 11a and the scanning lines 11, which are united with each other, are formed on the glass plate 10. Then, the gate insulating film 21 is formed over the whole surface of the glass plate 10, thereby covering the gate electrodes 11a and the scanning lines 11. Thereafter, the island-shaped semiconductor films 12 and 12b are formed on the gate insulating film 21. As shown in FIG. 32, the semiconductor film 12b corresponds to a belt-shaped one obtained by interconnecting the two adjacent island-shaped semiconductor films 12a corresponding to the said pixel region P which are arranged at the two intersections of the scanning and signal lines 11 and 13 in the first embodiment.

Next, on the island-shaped semiconductor films 12 and 12b, the source electrodes 13s and the drain electrodes 13d, and the signal lines 13 united with the corresponding drain electrodes 13d are formed. Thereafter, the passivation film 22 is formed on the gate insulating film 21 over the whole surface of the glass plate 10, thereby covering the TFTs 25 and the signal lines 13. The contact holes 22a are formed in the passivation film 22 at the positions overlaid with the source electrodes 13s.

In the pixel region P, the semiconductor film 12b covers the corresponding scanning line 11 over its full length between the two adjoining signal lines 13. The part of the semiconductor film 12b located at the intersection of the scanning and signal lines 11 and 13 corresponds to the semiconductor film 12a in the first embodiment. In the remaining part of the semiconductor film 12b, which does not correspond to the semiconductor film 12a, the width of the semiconductor film 12b is smaller than that of the corresponding scanning line 11, thereby exposing partially the said scanning line 11 from the semiconductor film 12b.

Next, an ITO film is formed on the passivation film 22 and patterned, thereby forming the transmission electrodes 14A. At this time, the transmission electrode 14A is contacted with the corresponding source electrode 13s by way of the corresponding contact hole 22a of the passivation film 22. Thus, the transmission electrode 14A is electrically connected to the corresponding source electrode 13s. In this sate, unlike the first embodiment, the end of the transmission electrode 14A is partially overlapped with the scanning line 11 adjacent to the said pixel region P. Thus, this structure is the same as that of the prior-art LCD structure shown in FIG. 5.

The end of the transmission electrode 14A is apart from the corresponding signal line 13 (which is located on the right side of FIG. 33) to the pixel region P and from the adjoining signal line 13 (which is located on the left side of FIG. 33) thereto. The said transmission electrode 14A does not overlap with these two signal lines 13. The distances of the transmission electrode 14A from these signal lines 13 are the same as those of the prior-art LCD device shown in FIG. 5.

Subsequently, a photosensitive organic resin film is formed on the passivation film 22 over the whole surface of the glass plate 10, and is selectively exposed to light and developed, thereby forming photosensitive interlayer insulating films 15C each having protrusions and depressions on its surface, as shown in FIGS. 33 and 34. Like the photosensitive interlayer insulating films 15 of the first embodiment, the photosensitive interlayer insulating films 15C are island-shaped. One end of the photosensitive interlayer insulating film 15C is overlaid on the corresponding semiconductor film 12b and the corresponding transmission electrode 14A.

The subsequent processes are the same as those of the first embodiment. Specifically, a metal film 23a (for example, which is made of Mo or Mo alloy) for the barrier metal films 23 is formed on the passivation film 22 over the whole surface of the glass plate 10. On the metal film 23a thus formed, another metal film 16a (for example, which is made of Al or Al alloy) for the reflection electrodes 16 is formed over the whole surface of the glass plate 10. A photoresist film 24 with a predetermined pattern is then formed on the metal film 16a. Thereafter, these two metal films 23a and 16a are selectively etched using the photoresist film 24 as a mask, thereby forming selectively the barrier metal films 23 and the reflection electrodes 16 on the island-shaped photosensitive interlayer insulating films 15C.

In the fourth embodiment also, similar to the second embodiment, the barrier metal films 23 and the reflection electrodes 16 are different in shape from the photosensitive interlayer insulating film 15C; however, the other structure of the LCD device of the fourth embodiment is the same as that of the first embodiment.

Specifically, in the said pixel region P, the end of the barrier metal film 23, which is close to the transmission electrode 14A, is in contact with the transmission electrode 14A. Due to this contact, the barrier metal film 23 and the corresponding transmission electrode 14A are electrically interconnected. Moreover, the reflection electrode 16, which is formed on the barrier metal film 23, is in contact with the barrier metal film 23. Thus, the reflection electrode 16 is electrically connected to the corresponding transmission electrode 14A by way of the barrier metal film 23. Since protrusions and depressions are formed on the surface of the photosensitive interlayer insulating film 15C, each of the barrier metal films 23 and each of the reflection electrodes 16 have similar protrusions and depressions for enhancing the reflection effect to the incident light in accordance with the protrusions and depressions of the film 15C.

In the above-described manner, the TFT array substrate used for the semi-transmissive type LCD device according to the fourth embodiment is completed. The TFT array substrate thus fabricated is joined to an opposite substrate (not shown) and then, a liquid crystal layer is placed in the gap between these two substrates and sealed, resulting in a liquid-crystal panel. Furthermore, a backlight unit is built in the panel. In this way, the semi-transmissive type LCD device according to the fourth embodiment is fabricated.

With the semi-transmissive type LCD device according to the fourth embodiment, similar to the LCD device according to the second embodiment, the photosensitive interlayer insulating film 15C covers not only the reflection regions R but also the ends or vicinities of the transmission electrodes 14A near the scanning lines 11. In this case, the thick photosensitive interlayer insulating films 15C (which is usually 1 μm to 3 μm in thickness) are present below the corresponding barrier metals 23. Therefore, even if the cracks 30 are formed in the barrier metal films 23 in the vicinities of the scanning lines 11, the developer solution penetrated through the cracks 30 of the barrier metal film 23 is surely blocked by the film 15C. Accordingly, even if the transmission electrodes 14A are present on or near the steps of the glass plate 10 (the steps are formed on the surface of the plate 10 by the scanning lines 11), there is no danger that a cell reaction occurs by way of the developer solution.

In this way, with the semi-transmissive type LCD device according to the fourth embodiment, even in the case that the end of the transmission electrode 14A cannot be separated from the steps due to the corresponding scanning and signal lines 11 and 13 at distances of +2 μm or greater (in other words, the value of the distance B is negative, as shown in FIG. 29), there is no possibility that a cell circuit is formed by the reflection and transmission electrode 16 and 14A and the developer solution. As a result, the reduction and corrosion of the transmission electrodes 14A is surely prevented and thus, the formation of failed pixels termed the "point defects" is surely prevented.

Moreover, the semiconductor films 12b are formed to overlap with the corresponding scanning lines 11, and the transmission electrodes 14A and the photosensitive interlayer insulating film 15C are formed on the semiconductor films 12b. Therefore, the fourth embodiment is effective for the case where the scanning line 11 has a bad taper angle.

In addition, the photosensitive interlayer insulating film 15C used in the fourth embodiment may be applied to the case where the end of the transmission electrode 14A can be separated from the steps due to the corresponding scanning and signal lines 11 and 13 at distances of +2 μm or greater like the first embodiment.

Fifth Embodiment

Figure 35:
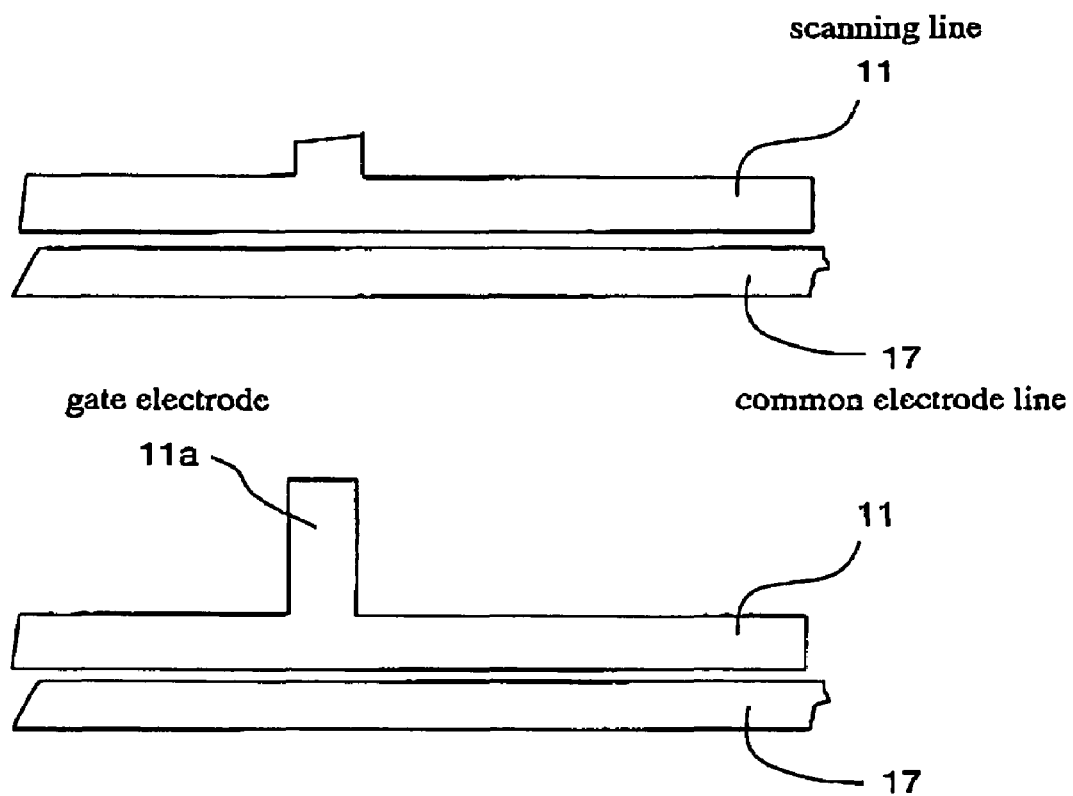
FIG. 35 is a partial plan view showing a method of fabricating the TFT array substrate used for a semi-transmissive type LCD device according to a fifth embodiment of the invention.
Figure 41:
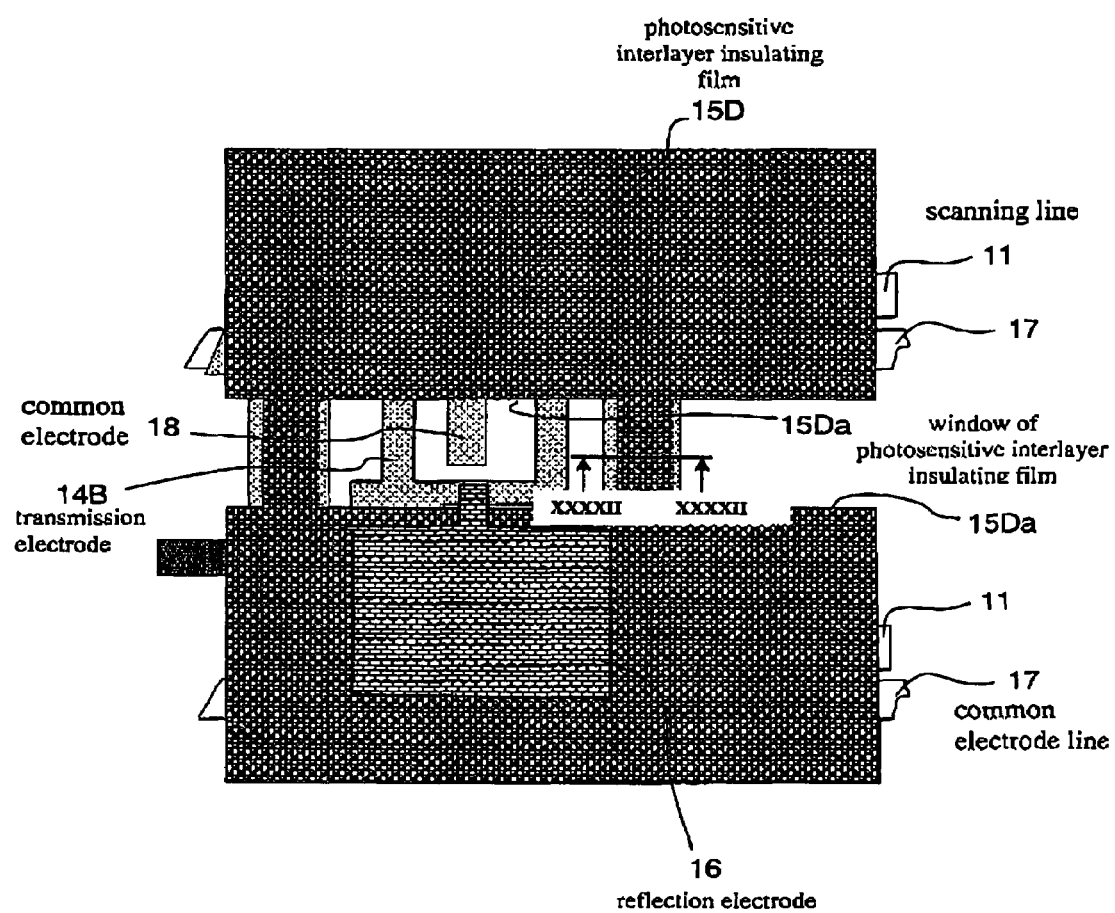
FIG. 41 is a partial plan view showing the method of fabricating the TFT array substrate used for the LCD device according to the fifth embodiment of the invention, which is subsequent to the step of FIG. 40.
Figure 42:
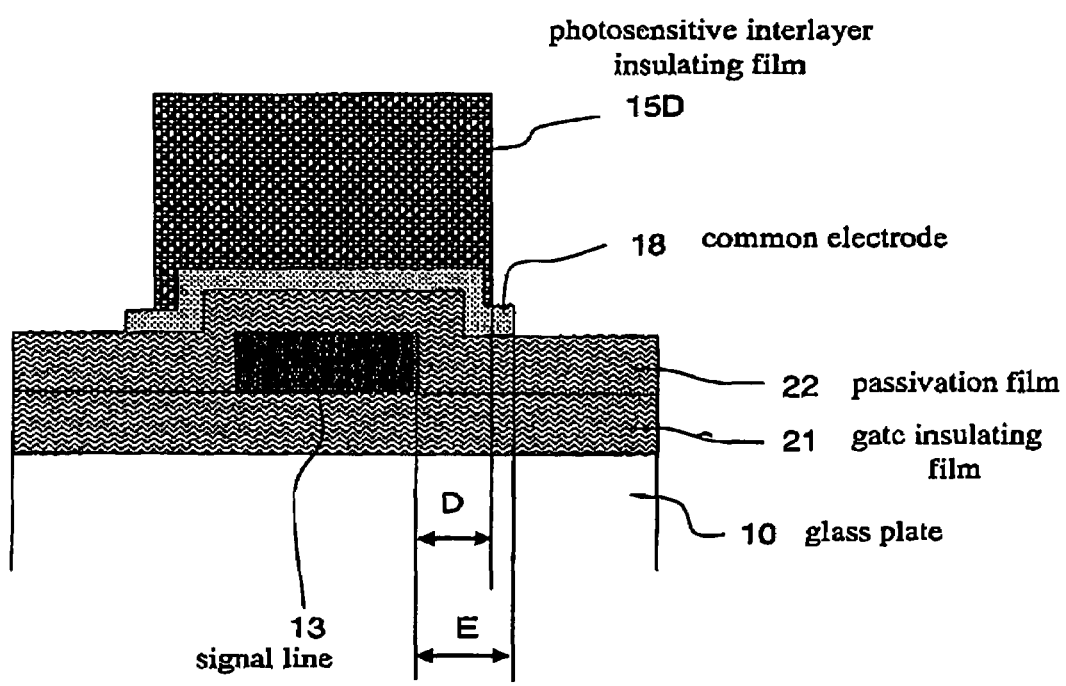
FIG. 42 is a partial cross-sectional view along the line XXXXII-XXXXII in FIG. 41.

FIGS. 35 to and 41 are partial plan views showing a method of fabricating the TFT array substrate used for a semi-transmissive type LCD device according to a fifth embodiment of the invention, respectively. FIG. 42 is a partial cross-sectional view along the line XXXXII-XXXXII in FIG. 41. These figures show the pixel structure of one of the pixel regions P arranged in a matrix array.

The fifth embodiment is different in type from the above-described first to fourth embodiments, because the fifth embodiment is of the IPS (In-Plane Switching) type (which may be termed the lateral electric-field type).

First, as shown in FIG. 35, gate electrodes 11a, scanning lines (gate lines) 11, and common electrode lines 17 are formed on a glass plate 10. For example, a film made of Cr, Al, Mo, Ti, or Cu, or an alloy thereof is formed on the glass plate 10 and then, it is patterned by the photolithography and etching method, thereby forming the gate electrodes 11a and the scanning lines 11 which are united with each other, and the common electrode lines 17. The scanning lines 11 and the common electrode lines 17, which are extended along the horizontal direction of FIG. 35, are arranged along the vertical direction of FIG. 35 at equal intervals.

Figure 36:
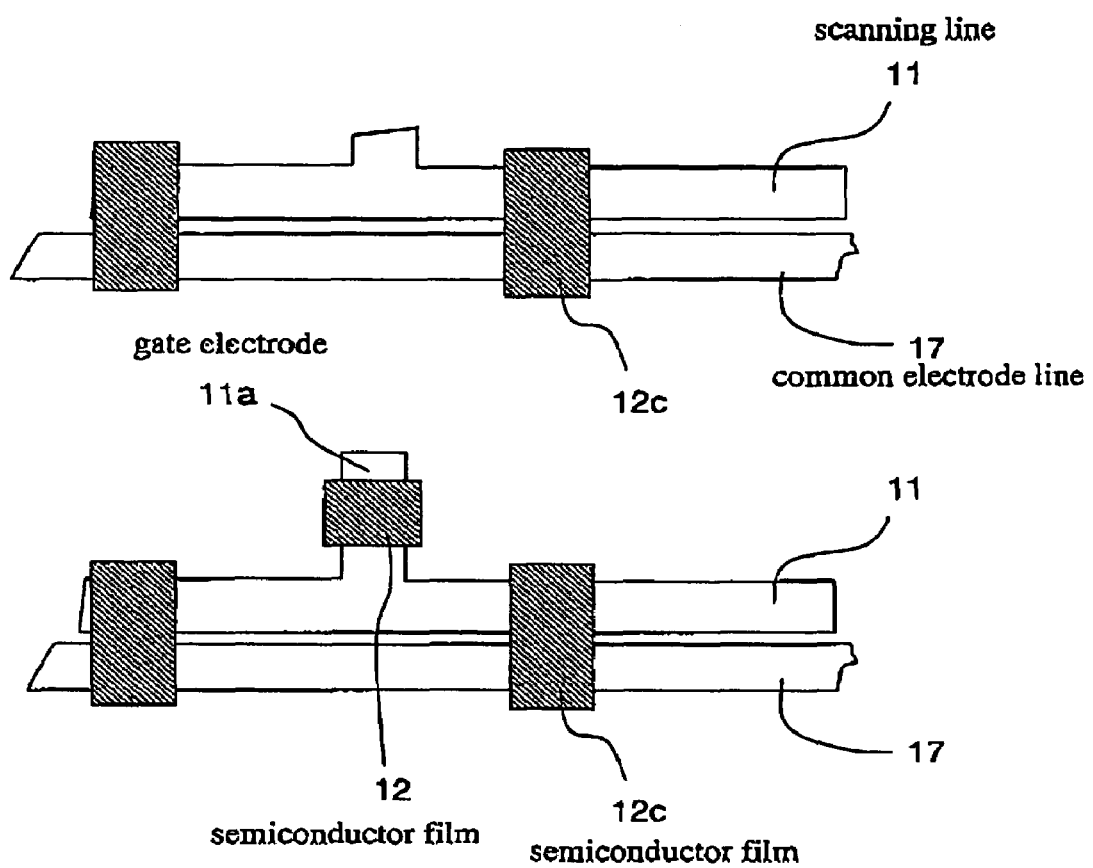
FIG. 36 is a partial plan view showing the method of fabricating the TFT array substrate used for the LCD device according to the fifth embodiment of the invention, which is subsequent to the step of FIG. 35.

Next, a $SiN_n$ film serving as a gate insulating film 21 is formed on the whole surface of the glass plate 10 by a CVD method, thereby covering the gate electrodes 11a, the scanning lines 11, and the common electrode lines 17. Thereafter, a non-doped a-Si film and a n-type a-Si film doped with P are formed in this order and then, these two a-Si films are patterned by the photolithography and etching method, thereby forming island-shaped semiconductor films 12 and 12c, as shown in FIG. 36. In the pixel region P, the semiconductor films 12 overlapped with the gate electrodes 11a are used as the active layers of TFTs. The semiconductor films 12c overlapped with the scanning lines 11 are located at predetermined positions to be overlapped with signal lines (data lines) 13 which are formed later. The semiconductor films 12c are overlapped with the scanning lines 11 and the common electrode lines 17. Since the semiconductor films 12c are provided to suppress the parasitic capacitance between the scanning lines 11 and the common electrode lines 17, and the signal lines 13, the films 12c may be cancelled.

Figure 37:
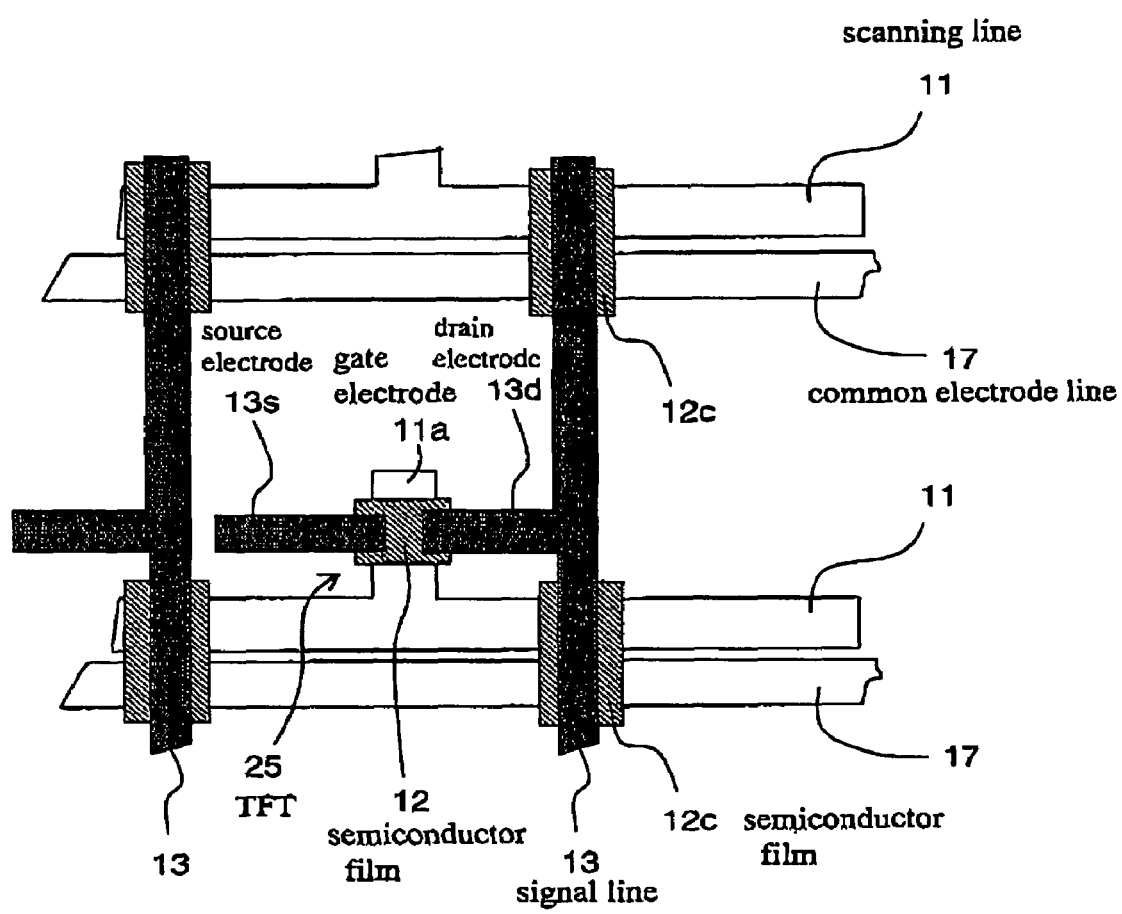
FIG. 37 is a partial plan view showing the method of fabricating the TFT array substrate used for the LCD device according to the fifth embodiment of the invention, which is subsequent to the step of FIG. 36.

Thereafter, a metal film similar to the metal film used for the scanning lines 11 is formed on the semiconductor films 12 and 12c and then, is patterned by the photolithography and etching method, thereby forming signal lines 13, source electrodes 13s, and drain electrodes 13d, as shown in FIG. 37. The source electrodes 13s and drain electrodes 13d, which are partially overlapped with the corresponding semiconductor films 12, constitute TFTs 25 along with the gate electrodes 11a and the gate insulating film 21. The drain electrodes 13d are unified with the corresponding signal lines 13. The signal lines 13 extending vertically in FIG. 37 are arranged horizontally at equal intervals. The signal lines 13 and the scanning lines 11 constitute a matrix array.

Figure 38:
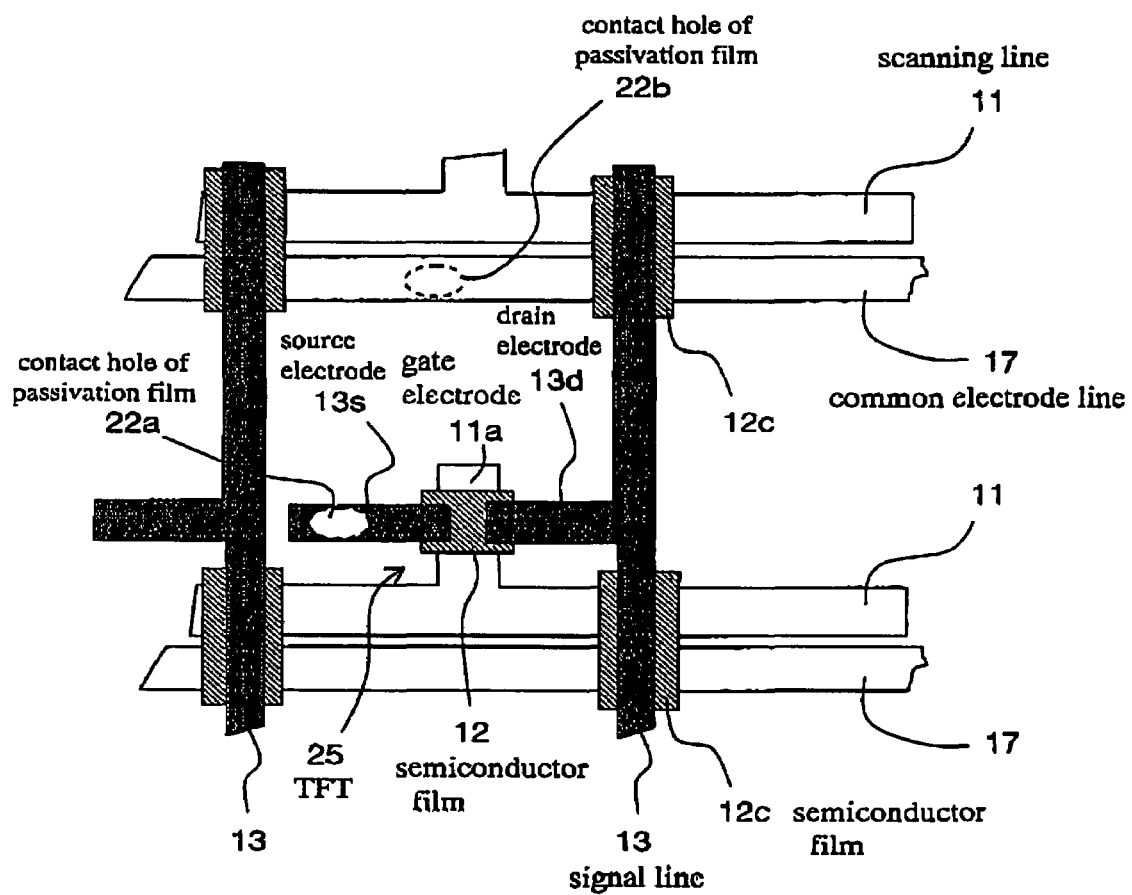
FIG. 38 is a partial plan view showing the method of fabricating the TFT array substrate used for the LCD device according to the fifth embodiment of the invention, which is subsequent to the step of FIG. 37.

Following this, a passivation film 22 is formed on the gate insulating film 21 over the whole surface of the glass plate 10, thereby covering the TFTs 25 and the signal lines 13. Thereafter, as shown in FIG. 38, contact holes 22a and 22b are formed in the passivation film 22 at the positions overlaid with the source electrodes 13s and the common electrode lines 17 by an etching method, respectively. The contact holes 22a are overlaid on the corresponding source electrodes 13s.

The contact holes 22b are overlaid on the corresponding common electrode lines 17. As the passivation film 22, a $SiN_n$ film may be preferably used.

Figure 39:
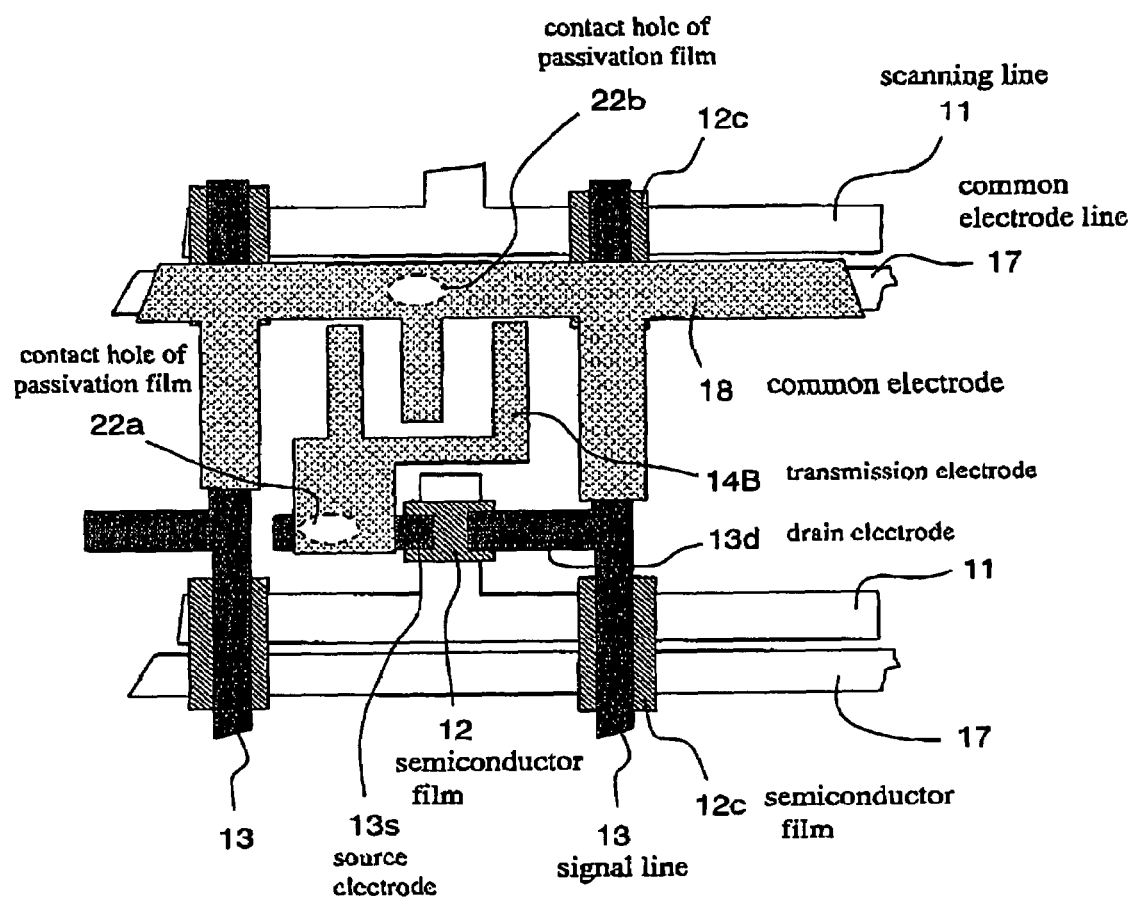
FIG. 39 is a partial plan view showing the method of fabricating the TFT array substrate used for the LCD device according to the fifth embodiment of the invention, which is subsequent to the step of FIG. 38.

Next, an ITO film is formed on the passivation film 22 and patterned by the photolithography and etching method, thereby forming the transmission electrodes 14B and the common electrode 18, as shown in FIG. 39. At this time, the transmission electrodes 14B are contacted with the corresponding source electrodes 13s by way of the corresponding contact holes 22a of the passivation film 22. The common electrode 18 is contacted with the common electrode lines 17 by way of the corresponding contact holes 22b of the passivation film 22. In this way, the transmission electrodes 14B are electrically connected to the source electrodes 13s, and the common electrode 18 is electrically connected to the common electrode lines 17.

In this state, since the end of the transmission electrode 14B is apart from the scanning line 11 adjacent to the said pixel region P (which is located on the opposite side to the TFT 25 (on the upper side in FIG. 39)) at a distance corresponding to the width of the common electrode line 17. This means that the end of the said transmission electrode 14B does not overlap with the said scanning line 11. Moreover, the end of the transmission electrode 14B is apart from the signal line 13 corresponding to the said pixel region P (which is located on the right side in FIG. 39) and the signal line 13 adjacent to the said pixel region P (which is located on the left side in FIG. 39) at sufficient distances, also. This means that the end of the said transmission electrode 14B does not overlap with these two signal lines 13.

The common electrode 18 has first parts extending along the common electrode lines 17 and second parts overlapped with the signal lines 13 and extending along the said signal lines 13.

Figure 40:
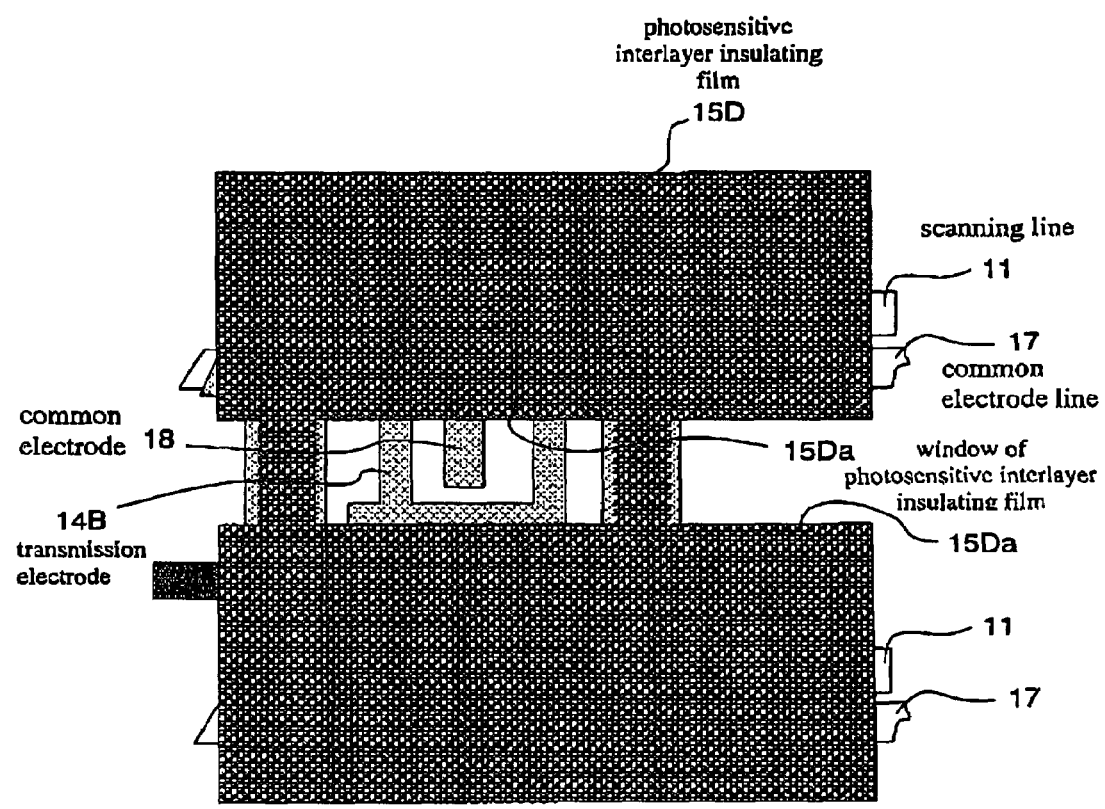
FIG. 40 is a partial plan view showing the method of fabricating the TFT array substrate used for the LCD device according to the fifth embodiment of the invention, which is subsequent to the step of FIG. 39.

Next, a photosensitive organic resin film is formed on the passivation film 22 over the whole surface of the glass plate 10 and is selectively exposed to light and developed, thereby forming a photosensitive interlayer insulating film 15D having protrusions and depressions on its surface, as shown in FIG. 40. The photosensitive interlayer insulating film 15D has approximately rectangular windows 15Da at the corresponding positions to the transmission regions T. The film 15D covers the whole surface of the glass plate 10 except for the windows 15Da. This point is the same as the above-described second embodiment (see FIG. 27). The parts of the film 15D at each side of the window 15Da are belt-shaped and overlaid on the common electrode 18 and the corresponding signal line 13. The dimensional relationship of these parts will be explained later.

Subsequently, a metal film (for example, which is made of Mo or an alloy of Mo) for the barrier metal films 23 is formed on the passivation film 22 over the whole surface of the glass plate 10. On the metal film thus formed, another metal film (for example, which is made of Al or an alloy of Al) for the reflection electrodes 16 is formed over the whole surface of the glass plate 10. Then, after a photoresist film with a predetermined pattern is formed on the metal film for the reflection electrodes 16, these two metal films are patterned with the photoresist film as a mask, thereby forming selectively the barrier metal films 23 and the reflection electrodes 16 on the photosensitive interlayer insulating film 15D, as shown in FIGS. 41 and 42.

The barrier metal films 23 and the reflection electrodes 16 have approximately rectangular planar patterns, which are quite different from the planar pattern of the photosensitive interlayer insulating film 15D. In the said pixel region P, the end of the barrier metal film 23, which is close to the transmission electrode 14B, is in contact with the transmission electrode 14B. Due to this contact, the barrier metal film 23 and the corresponding transmission electrode 14B are electrically interconnected. Moreover, the reflection electrode 16, which is formed on the barrier metal film 23, is in contact with the barrier metal film 23. Thus, the reflection electrode 16 is electrically connected to the corresponding transmission electrode 14 by way of the barrier metal film 23.

Since protrusions and depressions are formed on the surface of the photosensitive interlayer insulating film 15D, each of the reflection electrodes 16 has similar protrusions and depressions in accordance with the protrusions and depressions of the film 15D.

In the above-described manner, the TFT array substrate used for the semi-transmissive type LCD device according to the fifth embodiment is completed. The TFT array substrate thus fabricated is joined to an opposite substrate (not shown) and then, a liquid crystal layer is placed in the gap between these two substrates and sealed, resulting in a liquid-crystal panel. Furthermore, a backlight unit is built in the panel. In this way, the semi-transmissive type LCD device of the fifth embodiment is fabricated.

With the semi-transmissive type LCD device according to the fifth embodiment, a signal voltage is applied across the pixel electrode (i.e., the transmission electrode 14B and the reflection electrode 16) and the common electrode 18 to change the alignment direction of the liquid crystal molecules in the liquid crystal layer in a plane approximately parallel to the TFT array substrate, thereby displaying desired images. This is because this device is of the IPS type. In the transmission mode, images are displayed by causing the light emitted from the backlight unit to pass through the liquid crystal layer by way of the transmission electrodes 14B. In the reflection mode, images are displayed by causing the ambient light reflected by the reflection electrodes 16 to pass through the liquid crystal layer.

FIG. 42 is a cross-sectional view along the line XXXXII-XXXXII in FIG. 41. According to the inventors' research, it was found that the distance E in FIG. 42, which is half (½) of the difference between the width of the second part of the common electrode 18 (which is made of ITO) extending along the signal line 13 and the width of the signal line 13 overlapped with the common electrode 18, needs to be 2 μm or greater. This is the same as the distance B.

Moreover, it was found that the distance D in FIG. 42, which is half (½) of the difference between the width of the belt-shaped overlapped part of the photosensitive interlayer insulating film 15D overlapped with the signal line 13 and the width of the signal line 13, needs to be 0 μm or greater. At the same time, it was found that it is necessary that the belt-shaped overlapped part of the film 15D does not protrude laterally to the outside from the common electrode 18 (along the horizontal direction in FIG. 42) as well. In other words, it is necessary that the width of the belt-shaped overlapped part of the film 15D is equal to or greater than the width of the signal line 13 and that the said overlapped part of the film 15D does not protrude laterally from the common electrode 18 (i.e., the second part of the common electrode 18).

The processes of forming the barrier metal films 23 and the reflection electrodes 16 are carried out in the same way as explained in the first embodiment (see FIGS. 22 and 23). However, the cracks 30 are likely to be formed in the thick metal film 23a for the barrier metal films 23 due to the large thickness of the film 23a. According to the inventors' research, it was found that the portions where a cell corrosion reaction similar to the reaction referred in the first to fourth embodiments tends to occur due to the cracks 30 are the vicinities of the signal lines 13 (i.e., the vicinities of the steps or level differences caused by the signal lines 13). This is different from the first to fourth embodiments. Accordingly, the above-described distances D and E in the overlapped position where the common electrode 18 and the signal line 13 are overlapped were determined as described above.

With the semi-transmissive type LCD device according to the fifth embodiment, in this way, in the overlapped position where the common electrode 18 and the scanning line 13 are overlapped, the distance E between the edge of the common electrode 18 (i.e., the second part thereof) and the corresponding edge of the signal line 13 is set to be 2 μm or greater, the distance D between the edge of the belt-shaped part of the photosensitive interlayer insulating film 15D and the corresponding edge of the signal line 13 is set to be 0 μm or greater, and the belt-shaped overlapped part of the film 15D is formed not to protrude laterally from the common electrode 18 (i.e., the second part thereof).

Therefore, there is no possibility that a cell circuit is formed by the reflection electrode 16, the common electrode 18, and the developer solution. As a result, the reduction and corrosion of the common electrode 18 (not the transmission electrode 14B) is surely prevented and thus, the formation of failed pixels termed the "point defects" is surely prevented.

OTHER EMBODIMENTS

The above-described first to fifth embodiments are concrete examples of the present invention. Therefore, needless to say, the present invention is not limited to these embodiments and any modification is applicable to them.

For example, although the transmission electrode or common electrode is formed by an ITO film in the above-described embodiments, the invention is not limited to this. Any other transparent conducive material (e.g., IZO) than ITO may be used for forming the transmission electrode or common electrode if a cell reaction may occur.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A semi-transmissive type liquid-crystal display device comprising:
    scanning lines formed to extend along a first direction and arranged at predetermined intervals along a second direction perpendicular to the first direction on a substrate;
    signal lines formed to extend along the second direction and arranged at predetermined intervals along the first direction on the substrate;
    pixel regions defined on the substrate by the scanning lines and the signal lines;
    transmission electrodes and reflection electrodes arranged in the respective pixel regions in such a way that one of the transmission electrodes and a corresponding one of the reflection electrodes are located in each of the pixel regions; and
    each of the reflection electrodes being disposed over the substrate in such a way that an interlayer insulating film and a barrier metal film intervene between the said reflection electrode and the substrate, and being electrically connected to the corresponding transmission electrode by way of the barrier metal film;
    wherein in each of the pixel regions, one of the transmission electrodes and a corresponding one of the scanning lines are arranged at a distance of 2 μm or greater.

2. The device according to claim 1, wherein the distance between the one of the transmission electrodes and the corresponding one of the scanning lines is 3 μm or greater.

3. The device according to claim 1, wherein in each of the pixel regions, one of the transmission electrodes and a corresponding one of the signal lines are arranged at a distance of 2 μm or greater.

4. The device according to claim 1, wherein the interlayer insulating films are formed in such a way as to cover the respective scanning lines, where gaps between the transmission electrodes and the corresponding scanning lines are covered with the interlayer insulating films.

5. The device according to claim 4, wherein the interlayer insulating films for the respective pixel regions are united with each other in such a way as to cover the whole substrate except for belt-shaped openings extending along the scanning lines, where each of the openings has a width corresponding to one of transmission regions that expose a corresponding one of the transmission electrodes.

6. A semi-transmissive type liquid-crystal display device comprising:
    scanning lines formed to extend along a first direction and arranged at predetermined intervals along a second direction perpendicular to the first direction on a substrate;
    signal lines formed to extend along the second direction and arranged at predetermined intervals along the first direction on the substrate;
    pixel regions defined on the substrate by the scanning lines and the signal lines;
    transmission electrodes and reflection electrodes arranged in the respective pixel regions in such a way that one of the transmission electrodes and a corresponding one of the reflection electrodes are located in each of the pixel regions; and
    each of the reflection electrodes being disposed over the substrate in such a way that an interlayer insulating film and a barrier metal film intervene between the said reflection electrode and the substrate, and being electrically connected to the corresponding transmission electrode by way of the barrier metal film;
    wherein in each of the pixel regions, one of the transmission electrodes and a corresponding one of the scanning lines are arranged to be partially overlapped with each other or arranged at a distance less than 2 μm; and
    the interlayer insulating films for the respective pixel regions are formed to cover the scanning lines, thereby covering gaps between the scanning lines and the corresponding transmission electrodes.

7. The device according to claim 6, wherein the interlayer insulating films for the respective pixel regions are united with each other in such a way as to cover the whole substrate except for windows, where the windows define transmission regions by exposing the corresponding transmission electrodes from the interlayer insulating films united.

8. A semi-transmissive type liquid-crystal display device comprising:
    scanning lines formed to extend along a first direction and arranged at predetermined intervals along a second direction perpendicular to the first direction on a substrate;
    signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions;

each of the reflection electrodes being disposed over the substrate in such a way that an interlayer insulating film and a barrier metal film intervene between the said reflection electrode and the substrate, and being electrically connected to the corresponding transmission electrode by way of the barrier metal film;

wherein in each of the pixel regions, a gap between one of the transmission electrodes and a corresponding one of the scanning lines is covered with a semiconductor film; and the semiconductor film is overlapped with the corresponding scanning line and extended along the said scanning line.

9. The device according to claim 8, wherein in each of the pixel regions, the interlayer insulating film is formed to cover a corresponding one of the scanning lines, thereby covering a corresponding one of the gaps between the transmission electrodes and the scanning lines.

10. A semi-transmissive type liquid-crystal display device comprising:
scanning lines formed to extend along a first direction and arranged at predetermined intervals along a second direction perpendicular to the first direction on a substrate;
common electrode lines formed to be adjacent to the respective scanning lines and to extend along the said scanning lines;
signal lines formed to extend along the second direction and arranged at predetermined intervals along the first direction on the substrate;
pixel regions defined on the substrate by the scanning lines and the signal lines;
transmission electrodes and reflection electrodes arranged in the respective pixel regions in such a way that one of the transmission electrodes and a corresponding one of the reflection electrodes are located in each of the pixel regions;
a common electrode having first parts extending along the common electrode lines and second parts overlapped with the signal lines and extending along the said signal lines;
each of the reflection electrodes being disposed over the substrate in such a way that an interlayer insulating film and a barrier metal film intervene between the reflection electrodes and the substrate, and being electrically connected to the corresponding transmission electrode by way of the barrier metal film;
wherein the interlayer insulating films for the respective pixel regions are united with each other in such a way as to cover the whole substrate except for windows, through which the transmission electrodes are respectively exposed to define transmission regions; and
the interlayer insulating films comprise overlapped regions overlapped with the respective second parts of the common electrode, each of the overlapped regions having a width greater than a width of a corresponding one of the signal lines and equal to or less than a width of the corresponding second part; and
the width of the corresponding second part of the common electrode is greater than the width of the corresponding signal line overlapped with the said second part in such a way that a width difference of 2 μm or greater is allocated to each side of the said second part.

11. A method of fabricating a semi-transmissive type liquid-crystal display device, said device comprising:
scanning lines formed to extend along a first direction and arranged at predetermined intervals along a second direction perpendicular to the first direction on a substrate;
signal lines formed to extend along the second direction and arranged at predetermined intervals along the first direction on the substrate;
pixel regions defined on the substrate by the scanning lines and the signal lines;
transmission electrodes and reflection electrodes arranged in the respective pixel regions in such a way that one of the transmission electrodes and a corresponding one of the reflection electrodes are located in each of the pixel regions; and
each of the reflection electrodes being disposed over the substrate in such a way that an interlayer insulating film and a barrier metal film intervene between the said reflection electrode and the substrate, and being electrically connected to the corresponding transmission electrode by way of the barrier metal film;
the method comprising the steps of:
forming a conductive film for the transmission electrodes on the substrate; and
patterning the conductive film in such a way that one of the transmission electrodes and a corresponding one of the scanning lines are arranged at a distance of 2 μm or greater in each of the pixel regions.

12. The method according to claim 11, wherein the distance between the one of the transmission electrodes and the corresponding one of the scanning lines is 3 μm or greater.

13. The method according to claim 11, wherein in each of the pixel regions, one of the transmission electrodes and a corresponding one of the signal lines are arranged at a distance of 2 μm or greater.

14. The method according to claim 11, further comprising a step of forming the interlayer insulating film to cover a corresponding one of the scanning lines, thereby covering gaps between the transmission electrodes and the corresponding scanning lines with the interlayer insulating films.

15. The method according to claim 14, wherein in the step of forming the interlayer insulating film to cover a corresponding one of the scanning lines, the interlayer insulating film is patterned to have a width corresponding to one of transmission regions that expose the transmission electrodes and to have belt-shaped openings extending along the scanning lines.

16. A method of fabricating a semi-transmissive type liquid-crystal display device, the device comprising:
scanning lines formed to extend along a first direction and arranged at predetermined intervals along a second direction perpendicular to the first direction on a substrate;
signal lines formed to extend along the second direction and arranged at predetermined intervals along the first direction on the substrate;
pixel regions defined on the substrate by the scanning lines and the signal lines;
transmission electrodes and reflection electrodes arranged in the respective pixel regions in such a way that one of the transmission electrodes and a corresponding one of the reflection electrodes are located in each of the pixel regions; and each of the reflection electrodes being disposed over the substrate in such a way that an interlayer insulating film and a barrier metal film intervene between the said reflection electrode and the substrate, and being electrically connected to the corresponding transmission electrode by way of the barrier metal film;

the method comprising the steps of:

forming a conductive film for the transmission electrodes on the substrate;

patterning the conductive film in such a way that one of the transmission electrodes and a corresponding one of the scanning lines are arranged to be partially overlapped with each other or arranged at a distance less than 2 μm in each of the pixel regions; and forming the interlayer insulating films for the respective pixel regions to cover the scanning lines, thereby covering gaps between the scanning lines and the corresponding transmission electrodes.

17. The method according to claim 16, wherein the interlayer insulating films for the respective pixel regions are united with each other in such a way as to cover the whole substrate except for windows, where the windows define transmission regions by exposing the corresponding transmission electrodes from the interlayer insulating films united.

18. A method of fabricating a semi-transmissive type liquid-crystal display device, the device comprising:

scanning lines formed to extend along a first direction and arranged at predetermined intervals along a second direction perpendicular to the first direction on a substrate;

signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions; and each of the reflection electrodes being disposed over the substrate in such a way that an interlayer insulating film and a barrier metal film intervene between the said reflection electrode and the substrate, and being electrically connected to the corresponding transmission electrode by way of the barrier metal film;

the method comprising the steps of:

forming a semiconductor film on the substrate; and patterning the semiconductor film in such a way that in each of the pixel regions, a gap between one of the transmission electrodes and a corresponding one of the scanning lines is covered with the semiconductor film and that the semiconductor film is overlapped with the corresponding scanning line and extended along the said scanning line.

19. The method according to claim 18, further comprising a step of forming the interlayer insulating film to overlap with a corresponding one of the scanning lines in each of the pixel regions, thereby coveting a corresponding one of the gaps between the transmission electrodes and the scanning lines.

20. A method of fabricating a semi-transmissive type liquid-crystal display device, the device comprising:

scanning lines formed to extend along a first direction and arranged at predetermined intervals along a second direction perpendicular to the first direction on a substrate;

common electrode lines formed to be adjacent to the respective scanning lines and to extend along the said scanning lines;

signal lines formed to extend along the second direction and arranged at predetermined intervals along the first direction on the substrate;

pixel regions defined on the substrate by the scanning lines and the signal lines;

transmission electrodes and reflection electrodes arranged in the respective pixel regions in such a way that one of the transmission electrodes and a corresponding one of the reflection electrodes are located in each of the pixel regions;

common electrode having first parts extending along the common electrode lines and second parts overlapped with the signal lines and extending along the said signal lines; and each of the reflection electrodes being disposed over the substrate in such a way that an interlayer insulating film and a barrier metal film intervene between the reflection electrode and the substrate, and being electrically connected to the corresponding transmission electrode by way of the barrier metal film;

the method comprising the steps of:

forming a conductive film for the common electrode on or over the substrate;

patterning the conductive film for the common electrode in such a way that the common electrode has first parts extending along the common electrode lines and second parts overlapped with the signal lines and extending along the said signal lines;

forming an insulating film for the interlayer insulating films over the substrate; and patterning the insulating film for the interlayer insulating films in such a way as to cover the whole substrate except for windows through which the transmission electrodes are exposed to define transmission regions;

wherein in the step of patterning the conductive film for the common electrode, the interlayer insulating films comprise overlapped regions overlapped with the respective second parts of the common electrode, each of the overlapped regions having a width greater than a width of a corresponding one of the signal lines and equal to or less than a width of the corresponding second part; and in the step of patterning the insulating film for the interlayer insulating films, the width of the corresponding second part of the common electrode is greater than the width of the corresponding signal line overlapped with the said second part in such a way that a width difference of 2 μm or greater is allocated to each side of the said second part.

* * * * *